US008259323B2

(12) United States Patent
Miwa

(10) Patent No.: US 8,259,323 B2
(45) Date of Patent: Sep. 4, 2012

(54) MOBILE PRINT PLANNING SYSTEM, MOBILE PRINT PLANNING PROGRAM, AND MOBILE PRINT PLANNING METHOD

(75) Inventor: Shinji Miwa, Hokuto (JP)

(73) Assignee: Seiko Epson Corporation (JP)

( * ) Notice: Subject to any disclaimer, the term of this patent is extended or adjusted under 35 U.S.C. 154(b) by 1409 days.

(21) Appl. No.: 11/644,028

(22) Filed: Dec. 21, 2006

(65) Prior Publication Data

US 2007/0146780 A1 Jun. 28, 2007

(30) Foreign Application Priority Data

| | | |
|---|---|---|
| Dec. 28, 2005 | (JP) | 2005-377154 |
| Feb. 9, 2006 | (JP) | 2006-031989 |
| Feb. 9, 2006 | (JP) | 2006-031994 |

(51) Int. Cl.
*G06F 3/12* (2006.01)

(52) U.S. Cl. ........................ 358/1.15; 358/1.1; 358/1.13

(58) Field of Classification Search ................. 358/1.15, 358/1.13, 1.9
See application file for complete search history.

(56) References Cited

U.S. PATENT DOCUMENTS

2003/0051622 A1* 3/2003 Tanaka et al. ................. 101/480
2007/0152049 A1* 7/2007 Bar et al. ...................... 235/385

FOREIGN PATENT DOCUMENTS

| | | |
|---|---|---|
| JP | 2002-318758 | 10/2002 |
| JP | 2002-373200 | 12/2002 |
| JP | 2003-081001 | 3/2003 |
| JP | 2003-267553 | 9/2003 |
| JP | 2004-274093 | 9/2004 |
| JP | 2005-284937 | 10/2005 |

OTHER PUBLICATIONS

English translation JP2005284937.*

* cited by examiner

*Primary Examiner* — King Poon
*Assistant Examiner* — Iriana Cruz
(74) *Attorney, Agent, or Firm* — Harness, Dickey & Pierce, P.L.C.

(57) ABSTRACT

There is provided a mobile print planning system for making a mobile print plan, in which a plurality of mobile objects having an operation execution unit performing a printing or post-printing operation are communicably connected to each other and the mobile print plan allows the plurality of mobile objects to perform the printing or post-printing operation. The system includes a delivery instruction information acquisition unit acquiring delivery instruction information including a specification of the printing or post-printing operation; and a management unit making a movement plan and an operation execution plan for the plurality of mobile objects on the basis of the delivery instruction information acquired by the delivery instruction information acquisition unit.

13 Claims, 33 Drawing Sheets

```
500 <PrintJob>
504   <DELIVERY SPECIFICATION>
        <ORDER RECEIVING DATE: 2005-12-20 11:00/>
        <CONTENTS DELIVERY DEADLINE: 2005-12-20 11:00/>
        <PRODUCT DELIVERY DEADLINE: 2005-12-20 12:00/>
        <DELIVERY DESTINATION SITE: ○× POST OFFICE/>
        <AMOUNT: 400/>
504   </DELIVERY SPECIFICATION>
506   <OPERATION 1>
        <DETAILS OF OPERATION: PRINTING/>
        <SHEET SIZE: A6/>
        <SHEET TYPE: THICK GLOSSY SHEET/>
        <FINISHING SIZE: A6/>
        <PRINT CONTENTS: http://some.server/content.pdf/>
        <OUTPUT DESTINATION: OPERATION 1 OUTPUT/>
506   </OPERATION 1>
508   <OPERATION 2>
        <DETAILS OF OPERATION: VARIABLE PRINTING/>
        <SHEET SIZE: A6 ENVELOPE/>
        <SHEET TYPE: HIGH QUALITY ENVELOPE/>
        <PRINT CONTENTS: http://some.server/addressing.csv/>
        <OUTPUT DESTINATION: OPERATION 2 OUTPUT/>
508   </OPERATION 2>
510   <OPERATION 3>
        <DETAILS OF OPERATION: CASE SEALING/>
        <ENVELOPE SIZE: A6 ENVELOPE/>
        <ENVELOPE SOURCE: OPERATION 2 OUTPUT/>
        <CONTENT SIZE: A6/>
        <CONTENT SOURCE: OPERATION 1 OUTPUT/>
        <OUTPUT DESTINATION: OPERATION 3 OUTPUT/>
510   </OPERATION 3>
502 </PrintJpb>
```

FIG. 4

400

| EXECUTION RESOURCE | PROCESSING CAPABILITY |
|---|---|
| MOBILE PRINTING VEHICLE A | 16 PAGES PER MINUTE |
| MOBILE PRINTING VEHICLE B | 20 PAGES PER MINUTE |
| MOBILE BOOKBINDING VEHICLE C | 16 SETS PER MINUTE |
| | |

FIG. 5

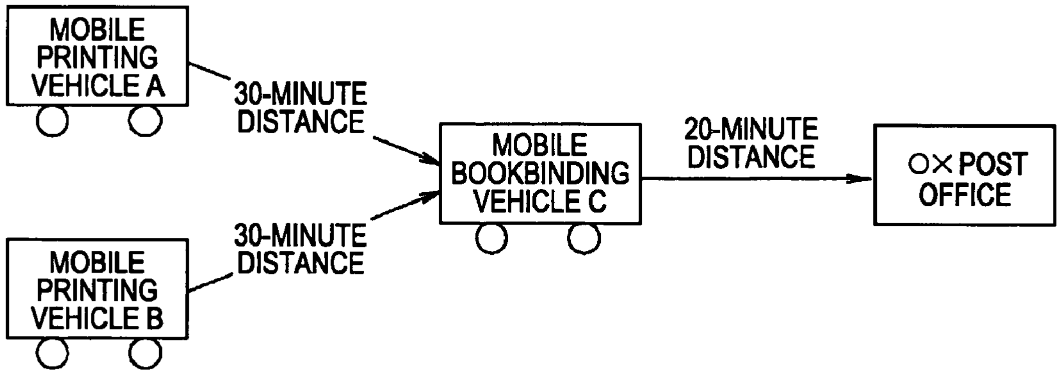

FIG. 8

| PRINTING OPERATION 1 | PRINTING OPERATION 2 | BOOKBINDING OPERATION |
|---|---|---|
| MOBILE PRINTING VEHICLE A | MOBILE PRINTING VEHICLE A | MOBILE BOOKBINDING VEHICLE C |
| MOBILE PRINTING VEHICLE A | MOBILE PRINTING VEHICLE B | MOBILE BOOKBINDING VEHICLE C |
| MOBILE PRINTING VEHICLE B | MOBILE PRINTING VEHICLE A | MOBILE BOOKBINDING VEHICLE C |
| MOBILE PRINTING VEHICLE B | MOBILE PRINTING VEHICLE B | MOBILE BOOKBINDING VEHICLE C |

FIG. 9

| PRINTING OPERATION 1 | | PRINTING OPERATION 2 | | BOOKBINDING OPERATION | |
|---|---|---|---|---|---|
| START | END | START | END | START | END |
| MOBILE PRINTING VEHICLE A | | MOBILE PRINTING VEHICLE A | | MOBILE BOOKBINDING VEHICLE C | |
| 11:00 | 11:25 | 11:25 | 11:50 | 11:50 | 12:25 |
| MOBILE PRINTING VEHICLE A | | MOBILE PRINTING VEHICLE B | | MOBILE BOOKBINDING VEHICLE C | |
| 11:00 | 11:25 | 11:00 | 11:20 | 11:30 | 11:55 |
| MOBILE PRINTING VEHICLE B | | MOBILE PRINTING VEHICLE A | | MOBILE BOOKBINDING VEHICLE C | |
| 11:00 | 11:20 | 11:00 | 11:25 | 11:30 | 11:55 |
| MOBILE PRINTING VEHICLE B | | MOBILE PRINTING VEHICLE B | | MOBILE BOOKBINDING VEHICLE C | |
| 11:00 | 11:20 | 11:20 | 11:40 | 11:40 | 12:05 |

FIG.10

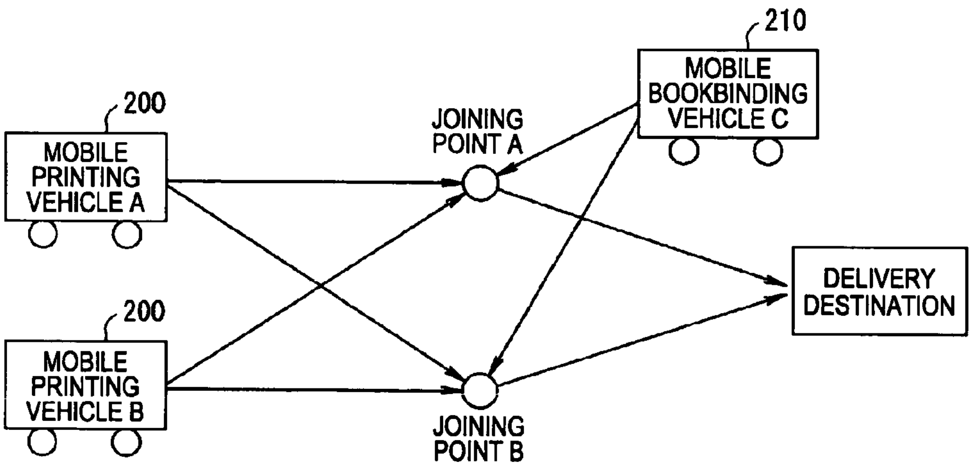

FIG.11

| PRINTING OPERATION 1 | | PRINTING OPERATION 2 | | JOINING POINT | BOOKBINDING OPERATION | |
|---|---|---|---|---|---|---|
| START | END | START | END | | START | END |
| MOBILE PRINTING VEHICLE A | | MOBILE PRINTING VEHICLE B | | JOINING POINT A | MOBILE BOOKBINDING VEHICLE C | |
| 11:00 | 11:25 | 11:00 | 11:20 | | 11:30 | 11:55 |
| MOBILE PRINTING VEHICLE A | | MOBILE PRINTING VEHICLE B | | ○× POST OFFICE | MOBILE BOOKBINDING VEHICLE C | |
| 11:00 | 11:25 | 11:00 | 11:20 | | 11:50 | 12:15 |

500a <PrintJob>
504a <DELIVERY SPECIFICATION>
<ORDER RECEIVING DATE: 2005-12-20 11:00/>
<CONTENTS DELIVERY DEADLINE: 2005-12-20 11:00/>
<PRODUCT DELIVERY DEADLINE: 2005-12-20 12:00/>
<DELIVERY DESTINATION SITE: ○× POST OFFICE/>
<AMOUNT: 400/>
504a </DELIVERY SPECIFICATION>
506a <OPERATION 1>
<DETAILS OF OPERATION: PRINTING/>
<SHEET SIZE: A6/>
<SHEET TYPE: THICK GLOSSY SHEET/>
<FINISHING SIZE: A6/>
<PRINT CONTENTS: http://some.server/content.pdf/>
<OUTPUT DESTINATION: OPERATION 1 OUTPUT/>
506a </OPERATION 1>
508a <OPERATION 2>
<DETAILS OF OPERATION: VARIABLE PRINTING/>
<SHEET SIZE: A6 ENVELOPE/>
<SHEET TYPE: HIGH QUALITY ENVELOPE/>
<PRINT CONTENTS: http://some.server/addressing.csv/>
<OUTPUT DESTINATION: OPERATION 2 OUTPUT/>
508a </OPERATION 2>
510a <OPERATION 3>
<DETAILS OF OPERATION: CASE SEALING/>
<ENVELOPE SIZE: A6 ENVELOPE/>
<ENVELOPE SOURCE: OPERATION 2 OUTPUT/>
<CONTENT SIZE: A6/>
<CONTENT SOURCE: OPERATION 1 OUTPUT/>
<OUTPUT DESTINATION: OPERATION 3 OUTPUT/>
510a </OPERATION 3>
502a </PrintJpb>

FIG. 19

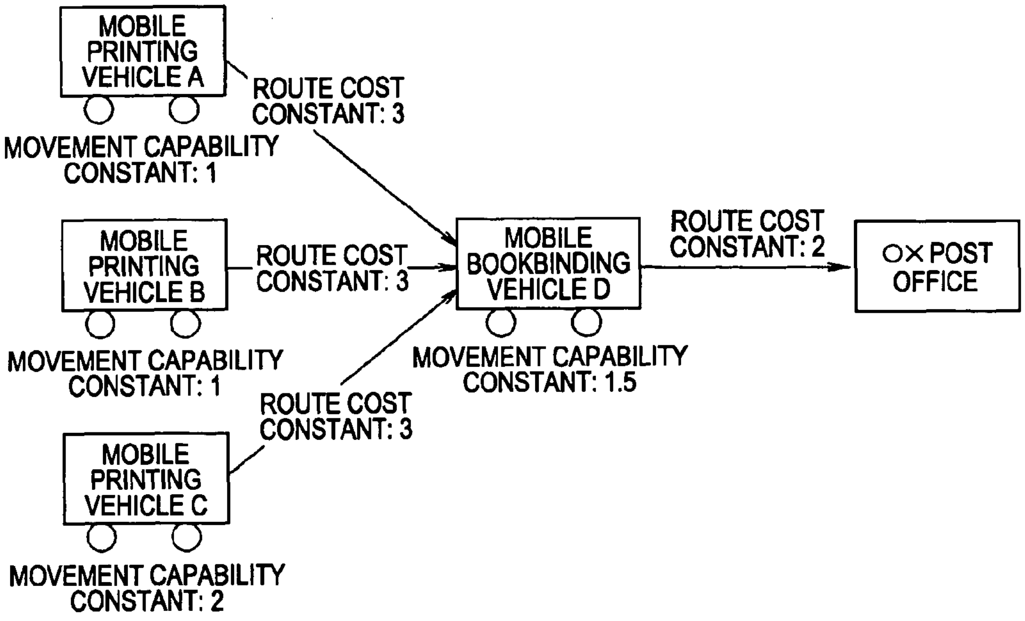

FIG.22

| PRINTING OPERATION 1 | PRINTING OPERATION 2 | BOOKBINDING OPERATION |
|---|---|---|
| MOBILE PRINTING VEHICLE A | MOBILE PRINTING VEHICLE B | MOBILE BOOKBINDING VEHICLE D |
| MOBILE PRINTING VEHICLE B | MOBILE PRINTING VEHICLE A | MOBILE BOOKBINDING VEHICLE D |
| MOBILE PRINTING VEHICLE A | MOBILE PRINTING VEHICLE C | MOBILE BOOKBINDING VEHICLE D |
| MOBILE PRINTING VEHICLE C | MOBILE PRINTING VEHICLE A | MOBILE BOOKBINDING VEHICLE D |
| MOBILE PRINTING VEHICLE B | MOBILE PRINTING VEHICLE C | MOBILE BOOKBINDING VEHICLE D |
| MOBILE PRINTING VEHICLE C | MOBILE PRINTING VEHICLE B | MOBILE BOOKBINDING VEHICLE D |

FIG.23

| PRINTING OPERATION 1 | PRINTING OPERATION 2 | BOOKBINDING OPERATION | |
|---|---|---|---|
| MOVEMENT COST | MOVEMENT COST | MOVEMENT COST | SUM |
| MOBILE PRINTING VEHICLE A | MOBILE PRINTING VEHICLE B | MOBILE BOOKBINDING VEHICLE D | |
| 3 | 3 | 3 | 9 |
| MOBILE PRINTING VEHICLE B | MOBILE PRINTING VEHICLE A | MOBILE BOOKBINDING VEHICLE D | |
| 3 | 3 | 3 | 9 |
| MOBILE PRINTING VEHICLE A | MOBILE PRINTING VEHICLE C | MOBILE BOOKBINDING VEHICLE D | |
| 3 | 6 | 3 | 12 |
| MOBILE PRINTING VEHICLE C | MOBILE PRINTING VEHICLE A | MOBILE BOOKBINDING VEHICLE D | |
| 6 | 3 | 3 | 12 |
| MOBILE PRINTING VEHICLE B | MOBILE PRINTING VEHICLE C | MOBILE BOOKBINDING VEHICLE D | |
| 3 | 6 | 3 | 12 |
| MOBILE PRINTING VEHICLE C | MOBILE PRINTING VEHICLE B | MOBILE BOOKBINDING VEHICLE D | |
| 6 | 3 | 3 | 12 |

FIG.24

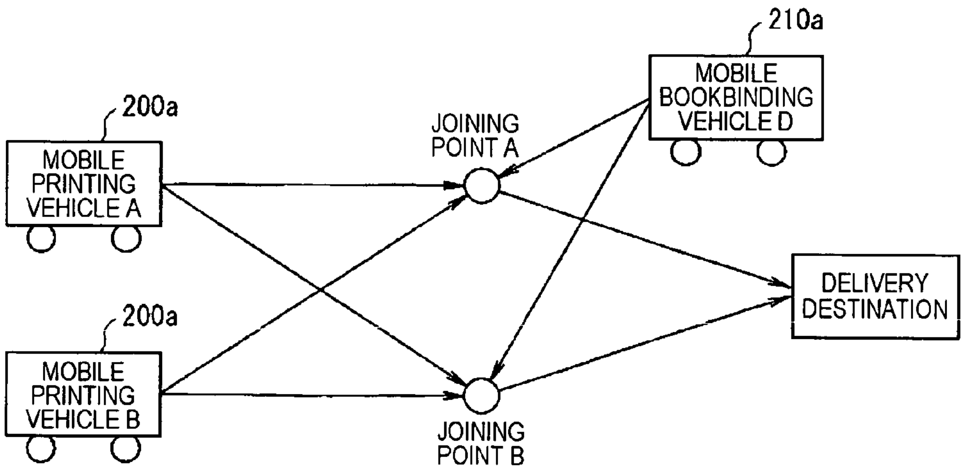

FIG.25

| PRINTING OPERATION 1 | PRINTING OPERATION 2 | JOINING POINT | BOOKBINDING OPERATION | |
|---|---|---|---|---|
| MOVEMENT COST | MOVEMENT COST | | MOVEMENT COST | SUM |
| MOBILE PRINTING VEHICLE A | MOBILE PRINTING VEHICLE B | JOINING POINT A | MOBILE BOOKBINDING VEHICLE D | |
| 3 | 3 | | 6 | 12 |
| MOBILE PRINTING VEHICLE A | MOBILE PRINTING VEHICLE B | ○× POST OFFICE | MOBILE BOOKBINDING VEHICLE D | |
| 5 | 5 | | 0 | 10 |

```
500b  <PrintJob>
504b    <DELIVERY SPECIFICATION>
          <ORDER RECEIVING DATE: 2005-12-20 11:00/>
          <CONTENTS DELIVERY DEADLINE: 2005-12-20 11:00/>
          <PRODUCT DELIVERY DEADLINE: 2005-12-20 12:00/>
          <DELIVERY DESTINATION SITE: ○× POST OFFICE/>
          <AMOUNT: 400/>
504b    </DELIVERY SPECIFICATION>
506b    <OPERATION 1>
          <DETAILS OF OPERATION: PRINTING/>
          <SHEET SIZE: A6/>
          <SHEET TYPE: THICK GLOSSY SHEET/>
          <FINISHING SIZE: A6/>
          <PRINT CONTENTS: http://some.server/content.pdf/>
          <OUTPUT DESTINATION: OPERATION 1 OUTPUT/>
506b    </OPERATION 1>
508b    <OPERATION 2>
          <DETAILS OF OPERATION: VARIABLE PRINTING/>
          <SHEET SIZE: A6 ENVELOPE/>
          <SHEET TYPE: HIGH QUALITY ENVELOPE/>
          <PRINT CONTENTS: http://some.server/addressing.csv/>
          <OUTPUT DESTINATION: OPERATION 2 OUTPUT/>
508b    </OPERATION 2>
510b    <OPERATION 3>
          <DETAILS OF OPERATION: CASE SEALING/>
          <ENVELOPE SIZE: A6 ENVELOPE/>
          <ENVELOPE SOURCE: OPERATION 2 OUTPUT/>
          <CONTENT SIZE: A6/>
          <CONTENT SOURCE: OPERATION 1 OUTPUT/>
          <OUTPUT DESTINATION: OPERATION 3 OUTPUT/>
510b    </OPERATION 3>
502b  </PrintJpb>
```

FIG.33

400b

| MATERIAL | THICK GLOSSY A6 SHEET | HIGH QUALITY A6 ENVELOPE | A3 MAT SHEET | A4 MAT SHEET |
|---|---|---|---|---|
| MOBILE PRINTING VEHICLE A | 300 | 500 | 2000 | 5000 |
| | | | | |

FIG.34

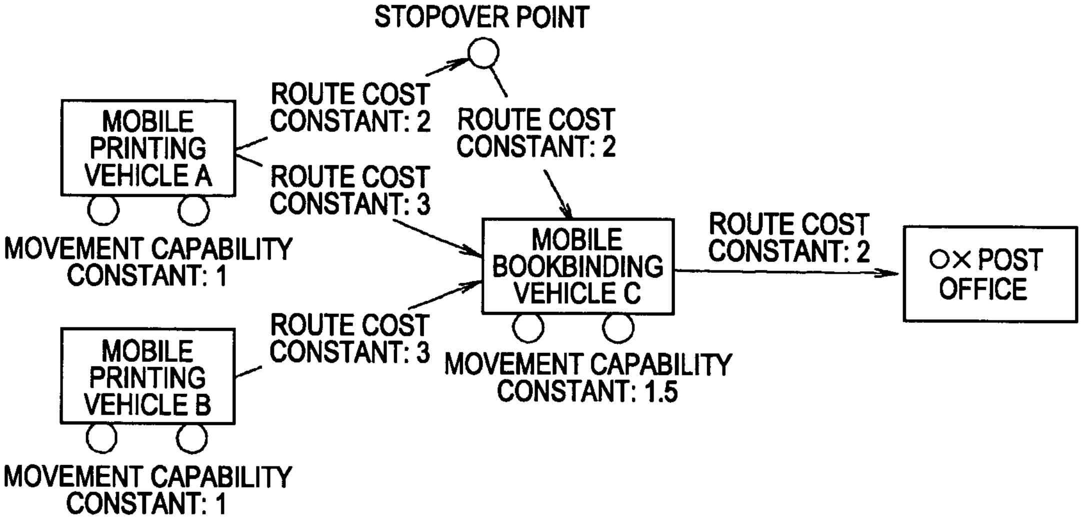

FIG.37

| PRINTING OPERATION 1 | PRINTING OPERATION 2 | BOOKBINDING OPERATION |
|---|---|---|
| MOBILE PRINTING VEHICLE A | MOBILE PRINTING VEHICLE A | MOBILE BOOKBINDING VEHICLE C |
| MOBILE PRINTING VEHICLE A | MOBILE PRINTING VEHICLE B | MOBILE BOOKBINDING VEHICLE C |
| MOBILE PRINTING VEHICLE B | MOBILE PRINTING VEHICLE A | MOBILE BOOKBINDING VEHICLE C |
| MOBILE PRINTING VEHICLE B | MOBILE PRINTING VEHICLE B | MOBILE BOOKBINDING VEHICLE C |

FIG.38

| PRINTING OPERATION 1 | PRINTING OPERATION 2 | BOOKBINDING OPERATION | |
|---|---|---|---|
| MOVEMENT COST | MOVEMENT COST | MOVEMENT COST | SUM |
| MOBILE PRINTING VEHICLE A | MOBILE PRINTING VEHICLE A | MOBILE BOOKBINDING VEHICLE C | |
| 4 | – | 3 | 7 |
| MOBILE PRINTING VEHICLE A | MOBILE PRINTING VEHICLE B | MOBILE BOOKBINDING VEHICLE C | |
| 4 | 3 | 3 | 10 |
| MOBILE PRINTING VEHICLE B | MOBILE PRINTING VEHICLE A | MOBILE BOOKBINDING VEHICLE C | |
| 3 | 4 | 3 | 10 |
| MOBILE PRINTING VEHICLE B | MOBILE PRINTING VEHICLE B | MOBILE BOOKBINDING VEHICLE C | |
| 3 | – | 3 | 6 |

FIG.39

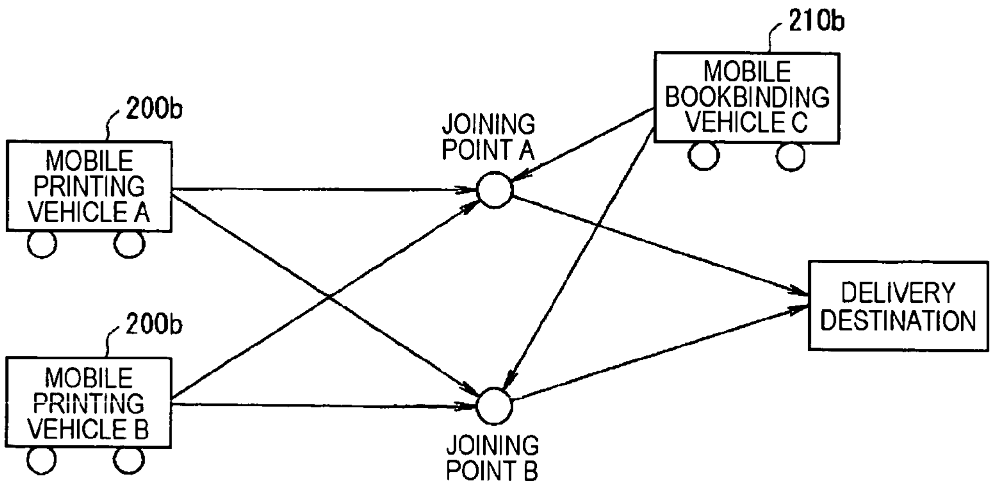

FIG.40

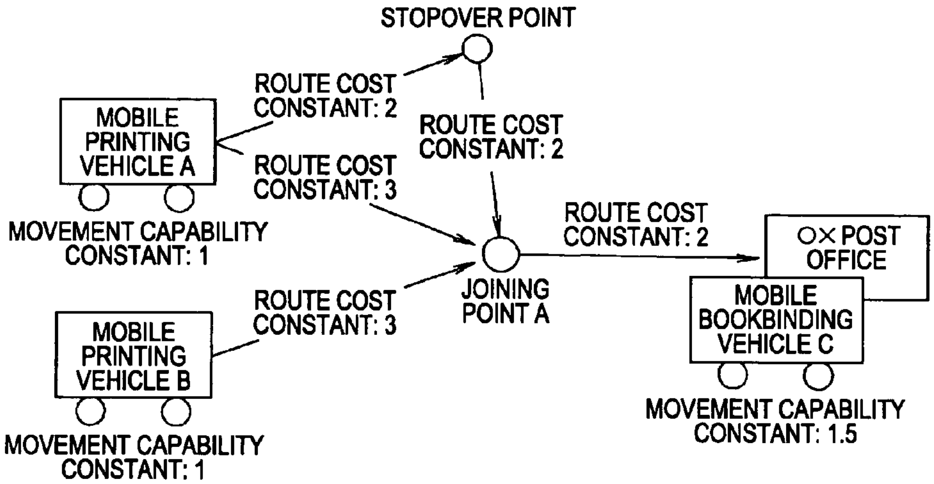

FIG.43

| PRINTING OPERATION 1 | PRINTING OPERATION 2 | JOINING POINT | BOOKBINDING OPERATION | |
|---|---|---|---|---|
| MOVEMENT COST | MOVEMENT COST | | MOVEMENT COST | SUM |
| MOBILE PRINTING VEHICLE A | MOBILE PRINTING VEHICLE A | JOINING POINT A | MOBILE BOOKBINDING VEHICLE C | |
| 4 | – | | 6 | 10 |
| MOBILE PRINTING VEHICLE A | MOBILE PRINTING VEHICLE B | JOINING POINT A | MOBILE BOOKBINDING VEHICLE C | |
| 4 | 3 | | 6 | 13 |
| MOBILE PRINTING VEHICLE B | MOBILE PRINTING VEHICLE B | JOINING POINT A | MOBILE BOOKBINDING VEHICLE C | |
| 3 | – | | 6 | 9 |
| MOBILE PRINTING VEHICLE A | MOBILE PRINTING VEHICLE A | ○× POST OFFICE | MOBILE BOOKBINDING VEHICLE C | |
| 6 | – | | 0 | 6 |
| MOBILE PRINTING VEHICLE A | MOBILE PRINTING VEHICLE B | ○× POST OFFICE | MOBILE BOOKBINDING VEHICLE C | |
| 6 | 5 | | 0 | 11 |
| MOBILE PRINTING VEHICLE B | MOBILE PRINTING VEHICLE B | ○× POST OFFICE | MOBILE BOOKBINDING VEHICLE C | |
| 5 | – | | 0 | 5 |

FIG.44

MOBILE PRINT PLANNING SYSTEM, MOBILE PRINT PLANNING PROGRAM, AND MOBILE PRINT PLANNING METHOD

BACKGROUND

1. Technical Field

The present invention relates to a system, a program, and a method of making a mobile print plan for allowing a mobile object to perform a printing operation or a bookbinding operation during movement of the mobile object, and more particularly, to a mobile print planning system, a mobile print planning program and a mobile print planning method, which are suitable for efficiently performing a printing operation or a bookbinding operation at low cost.

2. Related Art

JP-A-2003-81001 discloses a technology in which a vehicle having a printing device mounted thereon moves to a destination and performs a printing operation.

In the technology disclosed in JP-A-2003-81001, an image data processing unit processing image data and a printing device performing a printing operation on the basis of print data produced by the image data processing unit are installed in a mobile printing vehicle. The mobile printing vehicle is driven to an event site and the image data acquired on the event site is edited by the image data processing unit, whereby the printing operation is performed.

In a service where the printing operation and the bookbinding operation are performed in accordance with a request of a purchaser, delivery instructions such as the number of copies and deadline of the delivery are received from the purchaser, the printing operation and the bookbinding operation are performed in accordance with the delivery instruction, and then the vehicle moves to a specified delivery destination in order to distribute the bookbinded matters. When printing a large number of copies, there may be cases in which the printing operation is not completed by the delivery deadline. Therefore, it is desirable to perform the printing operation and the bookbinding operation in a quick and efficient manner. It is conceivable to increase the efficiency by performing the printing operation during the movement of the vehicle by using a mobile printing vehicle disclosed in JP-A-2003-81001.

First Problem

According to the technology disclosed in JP-A-2003-81001, it is possible to allocate a time period during the movement to the printing operation. However, there is a certain limit in the case of using only one printing device. When a plurality of printing devices are installed in one mobile printing vehicle, it may be impossible to cope with a large number of distribution works. In addition, providing a plurality of mobile printing vehicles having a plurality of printing devices installed therein in order to cope with the large number of distribution works may increase equipment cost.

Second Problem

In addition, when the printing operation and the bookbinding operation are performed by a plurality of mobile printing vehicles, it may be possible to efficiently perform the printing operation and the bookbinding operation. However, moving the plurality of mobile printing vehicle may increase movement cost.

Third Problem

In addition, when the printing operation and the bookbinding operation are performed by a plurality of mobile printing vehicles, it is conceivable to make a movement plan so that the printing operation and the bookbinding operation are allocated to the plurality of mobile printing vehicles.

However, when materials or fuel required for the printing operation or the bookbinding operation are insufficient or defects are found in the mobile printing vehicle, it is necessary to visit a supply depot or a maintenance shop before heading to the delivery destination for the purpose of maintenance or supplement of the materials or the fuel. Therefore, it may be impossible to efficiently make the movement plan when the allocating operation is merely performed without consideration of such a situation.

The above-mentioned problems may be found not only in the case of providing a service where the printing operation and the bookbinding operation are performed in accordance with a request of a purchaser but also in the case of providing a service where either of the printing operation or the bookbinding operation is performed.

SUMMARY

An advantage of an aspect of the invention is that it is to provide a mobile print planning system, a mobile print planning program and a mobile print planning method which are suitable for efficiently performing a printing operation or a bookbinding operation at low cost. An advantage of another aspect of the invention is that it is to provide a mobile print planning system, a mobile print planning program and a mobile print planning method which are suitable for efficiently performing a printing operation or a bookbinding operation with reduction in equipment cost and movement cost. An advantage of a further aspect of the invention is that it is to provide a mobile print planning system, a mobile print planning program and a mobile print planning method which are suitable for efficiently performing a printing operation or a bookbinding operation and making a movement plan with reduction in equipment cost.

Aspect 1

According to Aspect 1 of a mobile print planning system, there is provided a mobile print planning system for making a mobile print plan, in which a plurality of mobile objects having an operation execution unit performing a printing or post-printing operation are communicably connected to each other and the mobile print plan allows the plurality of mobile objects to perform the printing or post-printing operation, the system comprising a delivery instruction information acquisition unit acquiring delivery instruction information including a specification of the printing or post-printing operation, and a management unit making a movement plan and an operation execution plan for the plurality of mobile objects on the basis of the delivery instruction information acquired by the delivery instruction information acquisition unit.

In this arrangement, the delivery instruction information including a specification of the printing or post-printing operation is acquired by the delivery instruction information acquisition unit acquiring, whereby the management unit makes the movement plan and the operation execution plan for the plurality of mobile objects on the basis of the acquired delivery instruction information.

Therefore, since the printing or post-printing operation is performed by the plurality of mobile objects while moving cooperative with each other on the basis of the movement plan and the operation execution plan, it is possible to perform the printing or post-printing operation more efficiently than before. In addition, since a plurality of mobile objects having the operation execution unit are used rather than using the mobile object having a plurality of operation execution units, it is only necessary to provide a required number of mobile objects in accordance with the content of the delivery instruction. When a number of distribution works are performed in parallel with each other, it is possible to reduce cost and efficiently manage the mobile objects.

In this case, the mobile object means an object capable of moving in a physical space and examples of the mobile object include a vehicle, a ship, an airplane and a special machine. Moreover, examples of the vehicle include an automobile, a two-wheeled vehicle, a special automobile and a railroad vehicle. In addition, examples of the special machine include a carrier device constituted by a belt conveyer and a cradle mounted on the belt conveyer, a truck carried by an external power and a cradle mounted on a movable vehicle. The above statement is similarly applicable to the mobile print planning system according to Aspect 2, the mobile print planning program according to Aspect 7 and 8 and the mobile print planning method according to Aspect 13 and 14.

Examples of the operations related to the printing or post-printing operation include printing, overprinting, foil stamping, varnishing, laminating, folding, binding, sheet gathering, trimming and case sealing. The above statement is similarly applicable to the mobile print planning system according to Aspect 2, the mobile print planning program according to Aspect 7 and 8 and the mobile print planning method according to Aspect 13 and 14.

As far as the delivery instruction information acquisition unit can acquire the delivery instruction information, the delivery instruction information unit may be constructed in an arbitrary form. For example, the delivery instruction information may be input by an input device, the delivery instruction information may be obtained or received from an external device, and the delivery instruction information may be read from a storage device or a storage medium. Therefore, the acquisition includes at least inputting, obtaining, receiving and reading. The concept of the acquisition is similarly applicable to the following descriptions.

In addition, the system of the aspect of the invention may be embodied as a single device, a terminal or other equipments, and the system of the aspect of the invention may be embodied as a network system in which a plurality of devices, terminals or other equipments are communicably connected to each other. In the latter case, as far as each component is communicably connected to each other, the system of the aspect of the invention may belong to any of the plurality of components. The above statement is similarly applicable to the mobile print planning system according to Aspect 2.

Aspect 2

According to Aspect 2 of a mobile print planning system, there is provided a mobile print planning system for making a mobile print plan, in which a first mobile object having a first operation execution unit performing a first operation of printing or post-printing is communicably connected to a second mobile object having a second operation execution unit performing a second operation of printing or post-printing which is subsequent to the first operation, and the mobile print plan allows the first mobile object to perform the first operation and to transfer the execution result of the first mobile object to the second mobile object and allows the second mobile object to perform the second operation and to deliver the execution result of the second mobile object to a predetermined delivery destination, the system comprising a delivery instruction information acquisition unit acquiring delivery instruction information including specifications of the printing or post-printing operations, a location of the delivery destination and a delivery deadline, and a management unit making a movement plan and an operation execution plan for the first mobile object and the second mobile object on the basis of the delivery instruction information acquired by the delivery instruction information acquisition unit.

In this arrangement, the delivery instruction information including specifications of the printing or post-printing operations, the location of the delivery destination and the delivery deadline is acquired by the delivery instruction information acquisition unit, whereby the management unit makes the movement plan and the operation execution plan for the first mobile object and the second mobile object on the basis of the acquired delivery instruction information.

Therefore, since the printing or post-printing operation is performed by the first mobile object and the second mobile object while moving cooperative with each other on the basis of the movement plan and the operation execution plan, it is possible to perform the printing or post-printing operation more efficiently than before. In addition, since a plurality of mobile objects having the first operation execution unit and the second operation execution unit are used rather than using the mobile object having a plurality of first operation execution units and a plurality of second operation execution units, it is only necessary to provide a required number of mobile objects in accordance with the content of the delivery instruction. When a number of distribution works are performed in parallel with each other, it is possible to reduce cost and efficiently manage the mobile objects.

In the invention, the first operation may constitute a part of the printing operation, the entire part of printing operation or the entire part of printing operation plus a part of the post-printing operation. The above statement is similarly applicable to the mobile print planning program according to Aspect 8 and the mobile print planning method according to Aspect 14.

As far as the second operation is performed after the first operation, the second operation may be performed right after the first operation and the second operation may be performed right after an intermediate operation that is performed between the first operation and the second operation. In the former case, for example, when the first operation constitutes a part of the printing operation, the second operation may constitute the remaining part of the printing operation and the entire part of the post-printing operation. When the first operation constitutes the entire part of the printing operation, the second operation may constitute the entire part of the post-printing operation. When the first operation constitutes the entire part of the printing operation plus a part of the post-printing operation, the second operation constitutes the remaining part of the post-printing operation. The above statement is similarly applicable to the mobile print planning program according to Aspect 8 and the mobile print planning method according to Aspect 14.

The delivery deadline means not only the date or time for completing the delivery but also the time period between the starting point of the delivery and the ending point of the delivery. The above statement is similarly applicable to the mobile print planning program according to Aspect 8 and the mobile print planning method according to Aspect 14.

Aspect 3

A mobile print planning system according to Aspect 3 is the mobile print planning system according to Aspect 2, wherein the system further comprises a location information acquisition unit acquiring location information representing the locations of the first mobile object and the second mobile object, and a processing capability information acquisition unit acquiring processing capability information representing the processing capabilities of the first and second operation execution units, wherein the management unit makes the movement plan and the operation execution plan, on the basis of the delivery instruction information, the location information acquired by the location information acquisition unit and the processing capability information acquired by the processing capability information acquisition unit.

In this arrangement, the location information representing the locations of the first mobile object and the second mobile object is acquired by the location information acquisition unit, and the processing capability information representing the processing capabilities of the first and second operation execution units are acquired by the processing capability information acquisition unit. Then, the management unit makes the movement plan and the operation execution plan, on the basis of the delivery instruction information, the location information and the processing capability information.

Therefore, since it is possible to more delicately make the movement plan and the operation execution plan, it is possible to further efficiently perform the printing or post-printing operation.

Aspect 4

A mobile print planning system according to Aspect 4 is the mobile print planning system according to Aspect 2 or 3, wherein the system further comprises a map information acquisition unit acquiring map information including routes from the locations of the first mobile object and the second mobile object to the delivery destination, wherein the management unit makes the movement plan and the operation execution plan, on the basis of the delivery instruction information and the map information acquired by the map information acquisition unit.

In this arrangement, the map information including routes from the locations of the first mobile object and the second mobile object to the delivery destination is acquired by the map information acquisition unit. Then, the management unit makes the movement plan and the operation execution plan, on the basis of the acquired delivery instruction information and the acquired map information.

Therefore, since it is possible to more delicately make the movement plan and the operation execution plan, it is possible to further efficiently perform the printing or post-printing operation.

Aspect 5

A mobile print planning system according to Aspect 5 is the mobile print planning system according to Aspect 3, wherein a plurality of first mobile objects are communicably connected to each other, and wherein the management unit includes a first movement time calculating unit calculating a movement time required for the first mobile objects to move to a joining point with the second mobile object on the basis of the location information, a first operation execution processing time calculating unit calculating a first operation execution processing time required for the first mobile objects to complete the first operation execution process for obtaining the execution result of the first mobile objects on the basis of the processing capability information, a second movement time calculating unit calculating a movement time required for the second mobile object to move from the joining point to the delivery destination, a second operation execution processing time calculating unit calculating a second operation execution processing time required for the second mobile object to complete the second operation execution process for obtaining the execution result of the second mobile object on the basis of the processing capability information, a calculation result acquisition unit acquiring the calculation results from the first movement time calculating unit, the first operation execution processing time calculating unit, the second movement time calculating unit and the second operation execution processing time calculating unit, with respect to all the combinations of the first mobile objects and the second mobile object to which the first operation execution process or the second operation execution process is allocated, and a plan determining unit determining the combination of the first mobile objects and the second mobile object capable of completing the first operation execution process and the second operation execution process before the delivery deadline on the basis of the calculation results acquired by the calculation result acquisition unit and the delivery instruction information and determining the movement plan and the operation execution plan with respect to the determined combination.

In this arrangement, the movement time-required for the first mobile objects to move to a joining point is calculated by the first movement time calculating unit on the basis of the location information, and the first operation execution processing time required for the first mobile objects to complete the first operation execution process for obtaining the execution result of the first mobile objects is calculated by the first operation execution processing time calculating unit on the basis of the processing capability information. Moreover, the movement time required for the second mobile object to move from the joining point to the delivery destination is calculated by the second movement time calculating unit, and the second operation execution processing time required for the second mobile object to complete the second operation execution process for obtaining the execution result of the second mobile object is calculated by the second operation execution processing time calculating unit on the basis of the processing capability information. In addition, the calculation results from the first movement time calculating unit, the first operation execution processing time calculating unit, the second movement time calculating unit and the second operation execution processing time calculating unit are acquired by the calculation result acquisition unit, with respect to all the combinations of the first mobile objects and the second mobile object to which the first operation execution process or the second operation execution process is allocated.

When the calculation results are acquired, the combination of the first mobile objects and the second mobile object capable of completing the first operation execution process and the second operation execution process before the delivery deadline is determined by the plan determining unit on the basis of the calculation results acquired by the calculation result acquisition unit and the delivery instruction information, whereby the movement plan and the operation execution plan are determined with respect to the determined combination.

Therefore, since it is possible to more delicately make the movement plan and the operation execution plan, it is possible to further efficiently perform the printing or post-printing operation.

In this case, the calculation results from the first movement time calculating unit, the first operation execution processing time calculating unit, the second movement time calculating unit and the second operation execution processing time calculating unit are acquired with respect to all the combinations of the first mobile objects and the second mobile object to which the first operation execution process or the second operation execution process is allocated. However, the first movement time calculating unit, the first operation execution processing time calculating unit, the second movement time calculating unit and the second operation execution processing time calculating unit do not always have to perform their calculating operations with respect to all the combinations of the first mobile objects and the second mobile object. For example, when a plurality of first mobile objects or a plurality of second mobile objects are located at the same location, the first movement time calculating unit or the second movement time calculating unit may need to perform its calculating operation only once. Moreover, when there is only one first operation execution process and the plurality of first mobile objects have the same processing capability, or when there is only one second operation execution process and the plurality of second mobile objects have the same processing capability, the first operation execution processing time calculating unit or the second operation execution processing time calculating unit may need to perform its calculating operation only once.

The first operation execution processing time includes not only the time period between the starting point of the first operation execution process and the ending point of the first operation execution process but also the date or time for completing the first operation execution process. The same is applicable to the second operation execution processing time. The above statement is similarly applicable to the mobile print planning system according to Aspect 6, the mobile print planning program according to Aspect 11 and 12 and the mobile print planning method according to Aspect 17 and 18.

Aspect 6

A mobile print planning system according to Aspect 6 is the mobile print planning system according to Aspect 3, wherein a plurality of first mobile objects are communicably connected to each other, and wherein the management unit includes: a first movement time calculating unit calculating a movement time required for the first mobile objects to move to a joining point with the second mobile object on the basis of the location information, a first operation execution processing time calculating unit calculating a first operation execution processing time required for the first mobile objects to complete the first operation execution process for obtaining the execution result of the first mobile objects on the basis of the processing capability information, a second movement time calculating unit calculating a movement time required for the second mobile object to move to the joining point on the basis of the location information, a third movement time calculating unit calculating a movement time required for the second mobile object to move from the joining point to the delivery destination, a second operation execution processing time calculating unit calculating a second operation execution processing time required for the second mobile object to complete the second operation execution process for obtaining the execution result of the second mobile object on the basis of the processing capability information, a calculation result acquisition unit acquiring the calculation results from the first movement time calculating unit, the first operation execution processing time calculating unit, the second movement time calculating unit, the third movement time calculating unit and the second operation execution processing time calculating unit, with respect to all the combinations of a plurality of joining points and the first mobile objects and the second mobile object to which the first operation execution process or the second operation execution process is allocated, and a plan determining unit determining the combination of the plurality of the joining points and the first mobile objects and the second mobile object capable of completing the first operation execution process and the second operation execution process before the delivery deadline on the basis of the calculation results acquired by the calculation result acquisition unit and the delivery instruction information and determining the movement plan and the operation execution plan with respect to the determined combination.

In this arrangement, the movement time required for the first mobile objects to move to a joining point is calculated by the first movement time calculating unit on the basis of the location information, and the first operation execution processing time required for the first mobile objects to complete the first operation execution process for obtaining the execution result of the first mobile objects is calculated by the first operation execution processing time calculating unit on the basis of the processing capability information. Moreover, the movement time required for the second mobile object to move to the joining point is calculated by the second movement time calculating unit on the basis of the location information, the movement time required for the second mobile object to move from the joining point to the delivery destination is calculated by the third movement time calculating unit, and the second operation execution processing time required for the second mobile object to complete the second operation execution process for obtaining the execution result of the second mobile object is calculated by the second operation execution processing time calculating unit on the basis of the processing capability information. In addition, the calculation results from the first movement time calculating unit, the first operation execution processing time calculating unit, the second movement time calculating unit, the third movement time calculating unit and the second operation execution processing time calculating unit are acquired by the calculation result acquisition unit, with respect to all the combinations of a plurality of joining points and the first mobile objects and the second mobile object to which the first operation execution process or the second operation execution process is allocated.

When the calculation results are acquired, the combination of the plurality of the joining points and the first mobile objects and the second mobile object capable of completing the first operation execution process and the second operation execution process before the delivery deadline is determined by the plan determining unit, on the basis of the calculation results acquired by the calculation result acquisition unit and the delivery instruction information and determining the movement plan and the operation execution plan with respect to the determined combination.

Therefore, since it is possible to more delicately make the movement plan and the operation execution plan, it is possible to further efficiently perform the printing or post-printing operation.

In this case, the calculation results from the first movement time calculating unit, the first operation execution processing time calculating unit, the second movement time calculating unit, the third movement time calculating unit and the second operation execution processing time calculating unit are acquired with respect to all the combinations of the plurality of joining points and the first mobile objects and the second mobile object to which the first operation execution process or the second operation execution process is allocated. However, the first movement time calculating unit, the first operation execution processing time calculating unit, the second movement time calculating unit, the third movement time calculating unit and the second operation execution processing time calculating unit do not always have to perform their calculating operations with respect to all the combinations of the joining points and the first mobile objects and the second mobile object. For example, when a plurality of first mobile objects or a plurality of second mobile objects are located at the same location, the first movement time calculating unit or the second movement time calculating unit and the third movement time calculating unit may need to perform its calculating operation only once with respect to each of the joining points. Moreover, when there is only one first operation execution process and the plurality of first mobile objects have the same processing capability, or when there is only one second operation execution process and the plurality of second mobile objects have the same processing capability, the first operation execution processing time calculating unit or the second operation execution processing time calculating unit may need to perform its calculating operation only once.

Aspect 7

According to Aspect 7 of a mobile print planning program, there is provided a mobile print planning program for causing a computer to execute operations for making a mobile print plan, in which a plurality of mobile objects having an operation execution unit performing a printing or post-printing operation are communicably connected to each other and the mobile print plan allows the plurality of mobile objects to perform the printing or post-printing operation, the program comprising, a delivery instruction information acquisition step for acquiring delivery instruction information including a specification of the printing or post-printing operation, and a management step for making a movement plan and an operation execution plan for the plurality of mobile objects on the basis of the delivery instruction information acquired by the delivery instruction information acquisition step.

In this arrangement, by allowing the computer to read the program and execute operations in accordance with the read program, it is possible to obtain the same functions and advantages as those obtainable in the mobile print planning system according to Aspect 1.

Aspect 8

According to Aspect 8 of a mobile print planning program, there is provided a mobile print planning program for causing a computer to execute operations for making a mobile print plan, in which a first mobile object having a first operation execution unit performing a first operation of printing or post-printing operation is communicably connected to a second mobile object having a second operation execution unit performing a second operation of printing or post-printing operation which is subsequent to the first operation, and the mobile print plan allows the first mobile object to perform the first operation and to transfer the execution result of the first mobile object to the second mobile object and allows the second mobile object to perform the second operation and to deliver the execution result of the second mobile object to a predetermined delivery destination, the program comprising, a delivery instruction information acquisition step for acquiring delivery instruction information including specifications of the printing or post-printing operations, a location of the delivery destination and a delivery deadline, and a management step for making a movement plan and an operation execution plan for the first mobile object and the second mobile object on the basis of the delivery instruction information acquired by the delivery instruction information acquisition step.

In this arrangement, by allowing the computer to read the program and execute operations in accordance with the read program, it is possible to obtain the same functions and advantages as those obtainable in the mobile print planning system according to Aspect 2.

Aspect 9

A mobile print planning program according to Aspect 9 is the mobile print planning program according to Aspect 8, wherein the program further comprises a sub-program for allowing a computer to execute operations including a location information acquisition step for acquiring location information representing the locations of the first mobile object and the second mobile object, and a processing capability information acquisition step for acquiring processing capability information representing the processing capabilities of the first and second operation execution units, wherein the management step makes the movement plan and the operation execution plan, on the basis of the delivery instruction information, the location information acquired by the location information acquisition step and the processing capability information acquired by the processing capability information acquisition step.

In this arrangement, by allowing the computer to read the program and execute operations in accordance with the read program, it is possible to obtain the same functions and advantages as those obtainable in the mobile print planning system according to Aspect 3.

Aspect 10

A mobile print planning program according to Aspect 10 is the mobile print planning program according to Aspect 8 or 9, wherein the program further comprises a sub-program for allowing a computer to execute operations including a map information acquisition step for acquiring map information including routes from the locations of the first mobile object and the second mobile object to the delivery destination, wherein the management step makes the movement plan and the operation execution plan, on the basis of the delivery instruction information and the map information acquired by the map information acquisition step.

In this arrangement, by allowing the computer to read the program and execute operations in accordance with the read program, it is possible to obtain the same functions and advantages as those obtainable in the mobile print planning system according to Aspect 4.

Aspect 11

A mobile print planning program according to Aspect 11 is the mobile print planning program according to Aspect 9, wherein a plurality of first mobile objects are communicably connected to each other, and wherein the management step includes: a first movement time calculating step for calculating a movement time required for the first mobile objects to move to a joining point with the second mobile object on the basis of the location information, a first operation execution processing time calculating step for calculating a first operation execution processing time required for the first mobile objects to complete the first operation execution process for obtaining the execution result of the first mobile objects on the basis of the processing capability information, a second movement time calculating step for calculating a movement time required for the second mobile object to move from the joining point to the delivery destination, a second operation execution processing time calculating step for calculating a second operation execution processing time required for the second mobile object to complete the second operation execution process for obtaining the execution result of the second mobile object on the basis of the processing capability information, a calculation result acquisition step for acquiring the calculation results from the first movement time calculating step, the first operation execution processing time calculating step, the second movement time calculating step and the second operation execution processing time calculating step, with respect to all the combinations of the first mobile objects and the second mobile object to which the first operation execution process or the second operation execution process is allocated, and a plan determining step determining the combination of the first mobile objects and the second mobile object capable of completing the first operation execution process and the second operation execution process before the delivery deadline on the basis of the calculation results acquired by the calculation result acquisition step and the delivery instruction information and determining the movement plan and the operation execution plan with respect to the determined combination.

In this arrangement, by allowing the computer to read the program and execute operations in accordance with the read program, it is possible to obtain the same functions and advantages as those obtainable in the mobile print planning system according to Aspect 5.

In this case, the calculation results from the first movement time calculating step, the first operation execution processing time calculating step, the second movement time calculating step and the second operation execution processing time calculating step are acquired with respect to all the combinations of the first mobile objects and the second mobile object to which the first operation execution process or the second operation execution process is allocated. However, the first movement time calculating step, the first operation execution processing time calculating step, the second movement time calculating step and the second operation execution processing time calculating step do not always have to perform their calculating operations with respect to all the combinations of the first mobile objects and the second mobile object. For example, when a plurality of first mobile objects or a plurality of second mobile objects are located at the same location, the first movement time calculating step or the second movement time calculating step may need to perform its calculating operation only once. Moreover, when there is only one first operation execution process and the plurality of first mobile objects have the same processing capability, or when there is only one second operation execution process and the plurality of second mobile objects have the same processing capability, the first operation execution processing time calculating step or the second operation execution processing time calculating step may need to perform its calculating operation only once. The above statement is similarly applicable to the mobile print planning method according to Aspect 17.

Aspect 12

A mobile print planning program according to Aspect 12 is the mobile print planning program according to Aspect 9, wherein a plurality of first mobile objects are communicably connected to each other, and wherein the management step includes: a first movement time calculating step for calculating a movement time required for the first mobile objects to move to a joining point with the second mobile object on the basis of the location information, a first operation execution processing time calculating step for calculating a first operation execution processing time required for the first mobile objects to complete the first operation execution process for obtaining the execution result of the first mobile objects on the basis of the processing capability information, a second movement time calculating step for calculating a movement time required for the second mobile object to move to the joining point on the basis of the location information, a third movement time calculating step for calculating a movement time required for the second mobile object to move from the joining point to the delivery destination, a second operation execution processing time calculating step for calculating a second operation execution processing time required for the second mobile object to complete the second operation execution process for obtaining the execution result of the second mobile object on the basis of the processing capability information, a calculation result acquisition step for acquiring the calculation results from the first movement time calculating step, the first operation execution processing time calculating step, the second movement time calculating step, the third movement time calculating step and the second operation execution processing time calculating step, with respect to all the combinations of a plurality of joining points and the first mobile objects and the second mobile object to which the first operation execution process or the second operation execution process is allocated, and a plan determining step determining the combination of the plurality of the joining points and the first mobile objects and the second mobile object capable of completing the first operation execution process and the second operation execution process before the delivery deadline on the basis of the calculation results acquired by the calculation result acquisition step and the delivery instruction information and determining the movement plan and the operation execution plan with respect to the determined combination.

In this arrangement, by allowing the computer to read the program and execute operations in accordance with the read program, it is possible to obtain the same functions and advantages as those obtainable in the mobile print planning system according to Aspect 6.

In this case, the calculation results from the first movement time calculating step, the first operation execution processing time calculating step, the second movement time calculating step, the third movement time calculating step and the second operation execution processing time calculating step are acquired with respect to all the combinations of a plurality of joining points and the first mobile objects and the second mobile object to which the first operation execution process or the second operation execution process is allocated. However, the first movement time calculating step, the first operation execution processing time calculating step, the second movement time calculating step, the third movement time calculating step and the second operation execution processing time calculating step do not always have to perform their calculating operations with respect to all the combinations of a plurality of joining points and the first mobile objects and the second mobile object. For example, when a plurality of first mobile objects or a plurality of second mobile objects are located at the same location, the first movement time calculating step or the second movement time calculating step and the third movement time calculating step may need to perform its calculating operation only once with respect to each of the joining points. Moreover, when there is only one first operation execution process and the plurality of first mobile objects have the same processing capability, or when there is only one second operation execution process and the plurality of second mobile objects have the same processing capability, the first operation execution processing time calculating step or the second operation execution processing time calculating step may need to perform its calculating operation only once. The above statement is similarly applicable to the mobile print planning method according to Aspect 18.

Aspect 13

According to Aspect 13 of a mobile print planning method, there is provided a mobile print planning method for making a mobile print plan, in which a plurality of mobile objects having an operation execution unit performing a printing or post-printing operation are communicably connected to each other and the mobile print plan allows the plurality of mobile objects to perform the printing or post-printing operation, the method comprising, a delivery instruction information acquisition step for acquiring delivery instruction information including a specification of the printing or post-printing operation, and a management step for making a movement plan and an operation execution plan for the plurality of mobile objects on the basis of the delivery instruction information acquired by the delivery instruction information acquisition step.

With this arrangement, it is possible to obtain the same advantage as those obtainable from the mobile print planning system according to Aspect 1.

Aspect 14

According to Aspect 14 of a mobile print planning method, there is provided a mobile print planning method for making a mobile print plan, in which a first mobile object having a first operation execution unit performing a first operation of printing or post-printing operation is communicably connected to a second mobile object having a second operation execution unit performing a second operation of printing or post-printing operation which is subsequent to the first operation, and the mobile print plan allows the first mobile object to perform the first operation and to transfer the execution result of the first mobile object to the second mobile object and allows the second mobile object to perform the second operation and to deliver the execution result of the second mobile object to a predetermined delivery destination, the method comprising, a delivery instruction information acquisition step for acquiring delivery instruction information including specifications of the printing or post-printing operations, a location of the delivery destination and a delivery deadline, and a management step for making a movement plan and an operation execution plan for the first mobile object and the second mobile object on the basis of the delivery instruction information acquired by the delivery instruction information acquisition step.

With this arrangement, it is possible to obtain the same advantage as those obtainable from the mobile print planning system according to Aspect 2.

Aspect 15

A mobile print planning method according to Aspect 15 is the mobile print planning method according to Aspect 14, wherein the method further comprises a location information acquisition step for acquiring location information representing the locations of the first mobile object and the second mobile object, and a processing capability information acquisition step for acquiring processing capability information representing the processing capabilities of the first and second operation execution units, wherein the management step makes the movement plan and the operation execution plan, on the basis of the delivery instruction information, the location information acquired by the location information acquisition step and the processing capability information acquired by the processing capability information acquisition step.

With this arrangement, it is possible to obtain the same advantage as those obtainable from the mobile print planning system according to Aspect 3.

Aspect 16

A mobile print planning method according to Aspect 16 is the mobile print planning method according to Aspect 14 or 15, wherein the method further comprises a map information acquisition step for acquiring map information including routes from the locations of the first mobile object and the second mobile object to the delivery destination, wherein the management step makes the movement plan and the operation execution plan, on the basis of the delivery instruction information and the map information acquired by the map information acquisition step.

With this arrangement, it is possible to obtain the same advantage as those obtainable from the mobile print planning system according to Aspect 4.

Aspect 17

A mobile print planning method according to Aspect 17 is the mobile print planning method according to Aspect 15, wherein a plurality of first mobile objects are communicably connected to each other, and wherein the management step includes: a first movement time calculating step for calculating a movement time required for the first mobile objects to move to a joining point with the second mobile object on the basis of the location information, a first operation execution processing time calculating step for calculating a first operation execution processing time required for the first mobile objects to complete the first operation execution process for obtaining the execution result of the first mobile objects on the basis of the processing capability information, a second movement time calculating step for calculating a movement time required for the second mobile object to move from the joining point to the delivery destination, a second operation execution processing time calculating step for calculating a second operation execution processing time required for the second mobile object to complete the second operation execution process for obtaining the execution result of the second mobile object on the basis of the processing capability information, a calculation result acquisition step for acquiring the calculation results from the first movement time calculating step, the first operation execution processing time calculating step, the second movement time calculating step and the second operation execution processing time calculating step, with respect to all the combinations of the first mobile objects and the second mobile object to which the first operation execution process or the second operation execution process is allocated, and a plan determining step determining the combination of the first mobile objects and the second mobile object capable of completing the first operation execution process and the second operation execution process before the delivery deadline on the basis of the calculation results acquired by the calculation result acquisition step and the delivery instruction information and determining the movement plan and the operation execution plan with respect to the determined combination.

With this arrangement, it is possible to obtain the same advantage as those obtainable from the mobile print planning system according to Aspect 5.

Aspect 18

A mobile print planning method according to Aspect 18 is the mobile print planning method according to Aspect 15, wherein a plurality of first mobile objects are communicably connected to each other, and wherein the management step includes: a first movement time calculating step for calculating a movement time required for the first mobile objects to move to a joining point with the second mobile object on the basis of the location information, a first operation execution processing time calculating step for calculating a first operation execution processing time required for the first mobile objects to complete the first operation execution process for obtaining the execution result of the first mobile objects on the basis of the processing capability information, a second movement time calculating step for calculating a movement time required for the second mobile object to move to the joining point on the basis of the location information, a third movement time calculating step for calculating a movement time required for the second mobile object to move from the joining point to the delivery destination, a second operation execution processing time calculating step for calculating a second operation execution processing time required for the second mobile object to complete the second operation execution process for obtaining the execution result of the second mobile object on the basis of the processing capability information, a calculation result acquisition step for acquiring the calculation results from the first movement time calculating step, the first operation execution processing time calculating step, the second movement time calculating step, the third movement time calculating step and the second operation execution processing time calculating step, with respect to all the combinations of a plurality of joining points and the first mobile objects and the second mobile object to which the first operation execution process or the second operation execution process is allocated, and a plan determining step determining the combination of the plurality of the joining points and the first mobile objects and the second mobile object capable of completing the first operation execution process and the second operation execution process before the delivery deadline on the basis of the calculation results acquired by the calculation result acquisition step and the delivery instruction information and determining the movement plan and the operation execution plan with respect to the determined combination.

With this arrangement, it is possible to obtain the same advantage as those obtainable from the mobile print planning system according to Aspect 6.

Aspect 19

A mobile print planning system according to Aspect 19 is the mobile print planning system according to Aspect 1, wherein the system further comprises a movement cost calculating unit calculating movement cost for the plurality of mobile objects, wherein the management unit makes the movement plan and the operation execution plan for the plurality of mobile objects on the basis of the delivery instruction information acquired by the delivery instruction information acquisition unit and the movement cost calculated by the movement cost calculating unit, so that the sum of the movement cost becomes small.

In this arrangement, the delivery instruction information including the specification of the printing or post-printing operation is acquired from the delivery instruction information acquisition unit, and the movement cost for the plurality of mobile objects are calculated by the movement cost calculating unit. Then, the management unit makes the movement plan and the operation execution plan for the plurality of mobile objects on the basis of the acquired delivery instruction information and the calculated movement cost by the management unit, so that the sum of the movement cost becomes small.

With this arrangement, since the printing or post-printing operation is performed by the plurality of mobile objects while moving cooperative with each other on the basis of the movement plan and the operation execution plan, it is possible to perform the printing or post-printing operation more efficiently than before. In addition, since a plurality of mobile objects having the operation execution unit are used rather than using the mobile object having a plurality of operation execution units, it is only necessary to provide a required number of mobile objects in accordance with the content of the delivery instruction. When a number of distribution works are performed in parallel with each other, it is possible to reduce equipment cost and efficiently manage the mobile objects. In addition, since the movement plan and the operation execution plan are determined so that the sum of the movement cost becomes small, it is possible to reduce the movement cost.

In this case, the mobile object means an object capable of moving in a physical space and examples of the mobile object include a vehicle, a ship, an airplane and a special machine. Moreover, examples of the vehicle include an automobile, a two-wheeled vehicle, a special automobile and a railroad vehicle. In addition, examples of the special machine include a carrier device constituted by a belt conveyer and a cradle mounted on the belt conveyer, a truck carried by an external power and a cradle mounted on a movable vehicle. The above statement is similarly applicable to the mobile print planning system according to Aspect 20, the mobile print planning program according to Aspect 25 and 26 and the mobile print planning method according to Aspect 31 and 32.

Examples of the operations related to the printing or post-printing operation include printing, overprinting, foil stamping, varnishing, laminating, folding, binding, sheet gathering, trimming and case sealing. The above statement is similarly applicable to the mobile print planning system according to Aspect 20, the mobile print planning program according to Aspect 25 and 26 and the mobile print planning method according to Aspect 31 and 32.

In addition, the movement cost includes the cost required for the movement and an environmental load incurred in connection with the movement. The above statement is similarly applicable to the mobile print planning system according to Aspect 20, the mobile print planning program according to Aspect 25 and 26 and the mobile print planning method according to Aspect 31 and 32.

As far as the delivery instruction information acquisition unit can acquire the delivery instruction information, the delivery instruction information unit may be constructed in an arbitrary form. For example, the delivery instruction information may be input by an input device, the delivery instruction information may be obtained or received from an external device, and the delivery instruction information may be read from a storage device or a storage medium. Therefore, the acquisition includes at least inputting, obtaining, receiving and reading. The concept of the acquisition is similarly applicable to the following descriptions.

In addition, the system of the aspect of the invention may be embodied as a single device, a terminal or other equipments, and the system of the aspect of the invention may be embodied as a network system in which a plurality of devices, terminals or other equipments are communicably connected to each other. In the latter case, as far as each component is communicably connected to each other, the system of the aspect of the invention may belong to any of the plurality of components. The above statement is similarly applicable to the mobile print planning system according to Aspect 20.

Aspect 20

A mobile print planning system according to Aspect 20 is the mobile print planning system according to Aspect 2, wherein the system further comprises a movement cost calculating unit calculating movement cost for the first mobile object and the second mobile object, wherein the management unit makes the movement plan and the operation execution plan for the first mobile object and the second mobile object on the basis of the delivery instruction information acquired by the delivery instruction information acquisition unit and the movement cost calculated by the movement cost calculating unit, so that the sum of the movement cost becomes small.

In this arrangement, the delivery instruction information including specifications of the printing or post-printing operations and a location of the delivery destination is acquired by the delivery instruction information acquisition unit, and the movement cost for the first mobile object and the second mobile object is calculated by the movement cost calculating unit. Then, the management unit makes the movement plan and the operation execution plan for the first mobile object and the second mobile object on the basis of the acquired delivery instruction information and the calculated movement cost, so that the sum of the movement cost becomes small.

Therefore, since the printing or post-printing operation is performed by the first mobile object and the second mobile object while moving cooperative with each other on the basis of the movement plan and the operation execution plan, it is possible to perform the printing or post-printing operation more efficiently than before. In addition, since a plurality of mobile objects having the first operation execution unit and the second operation execution unit are used rather than using the mobile object having a plurality of first operation execution units and a plurality of second operation execution units, it is only necessary to provide a required number of mobile objects in accordance with the content of the delivery instruction. When a number of distribution works are performed in parallel with each other, it is possible to reduce equipment cost and efficiently manage the mobile objects. In addition, since the movement plan and the operation execution plan are determined so that the sum of the movement cost becomes small, it is possible to reduce the movement cost.

In the invention, the first operation may constitute a part of the printing operation, the entire part of printing operation or the entire part of printing operation plus a part of the post-printing operation. The above statement is similarly applicable to the mobile print planning program according to Aspect 26 and the mobile print planning method according to Aspect 32.

As far as the second operation is performed after the first operation, the second operation may be performed right after the first operation and the second operation may be performed right after an intermediate operation that is performed between the first operation and the second operation. In the former case, for example, when the first operation constitutes a part of the printing operation, the second operation may constitute the remaining part of the printing operation and the entire part of the post-printing operation. When the first operation constitutes the entire part of the printing operation, the second operation may constitute the entire part of the post-printing operation. When the first operation constitutes the entire part of the printing operation plus a part of the post-printing operation, the second operation constitutes the remaining part of the post-printing operation. The above statement is similarly applicable to the mobile print planning program according to Aspect 26 and the mobile print planning method according to Aspect 32.

Aspect 21

A mobile print planning system according to Aspect 21 is the mobile print planning system according to Aspect 20, wherein a plurality of first mobile objects are communicably connected to each other, wherein the movement cost calculating unit includes a first movement cost calculating unit calculating the movement cost required for the first mobile objects to move to the joining point with the second mobile object, and a second movement cost calculating unit calculating the movement cost required for the second mobile objects to move from the joining point to the delivery destination, and wherein the management unit includes a calculation result acquisition unit acquiring the calculation results from the first movement cost calculation unit and the second movement cost calculation unit with respect to all the combinations of the first mobile objects and the second mobile object to which the first operation execution process for obtaining the execution results of the first mobile objects or the second operation execution process for obtaining the execution result of the second mobile object, and a plan determining unit determining the combination of the first mobile objects and the second mobile object capable of producing a minimum sum of the movement cost, on the basis of the calculation result acquired by the calculation result acquisition unit and determining the movement plan and the operation execution plan with respect to the determined combination.

In this arrangement, the movement cost required for the first mobile objects to move to the joining point is calculated by the first movement cost calculating unit, and the movement cost required for the second mobile objects to move from the joining point to the delivery destination is calculated by the second movement cost calculating unit. Moreover, the calculation results from the first movement cost calculation unit and the second movement cost calculation unit are acquired by the calculation result acquisition unit, with respect to all the combinations of the first mobile objects and the second mobile object to which the first operation execution process or the second operation execution process is allocated.

When the calculation results are acquired, the combination of the first mobile objects and the second mobile object capable of producing a minimum sum of the movement cost is determined by the plan determining unit on the basis of the acquired calculation result, whereby the movement plan and the operation execution plan are determined with respect to the determined combination.

With this arrangement, since the movement plan and the operation execution plan are determined with respect to the combination of the first mobile objects and the second mobile object capable of producing a minimum sum of the movement cost, it is possible to further efficiently reduce the movement cost.

In this case, the calculation results from the first movement cost calculating unit and the second movement cost calculating unit are acquired with respect to all the combinations of the first mobile objects and the second mobile object to which the first operation execution process or the second operation execution process is allocated. However, the first movement cost calculating unit and the second movement cost calculating unit do not always have to perform their calculating operations with respect to all the combinations of the first mobile objects and the second mobile object.

Aspect 22

A mobile print planning system according to Aspect 22 is the mobile print planning system according to Aspect 21, wherein the system further comprises a first route cost information acquisition unit acquiring route cost information representing the route cost required for movement along the route from the location of the first mobile objects to the joining point, a second route cost information acquisition unit acquiring route cost information representing the route cost required for movement along the route from the joining point to the delivery destination, a first movement capability information acquisition unit acquiring movement capability information representing the movement capability of the first mobile objects, and a second movement capability information acquisition unit acquiring movement capability information representing the movement capability of the second mobile object, wherein the first movement cost calculating unit calculates the movement cost for the first mobile objects on the basis of the route cost information acquired by the first route cost information acquisition unit and the movement capability information acquired by the first movement capability information acquisition unit, and wherein the second movement cost calculating unit calculates the movement cost for the second mobile objects on the basis of the route cost information acquired by the second route cost information acquisition unit and the movement capability information acquired by the second movement capability information acquisition unit.

In this arrangement, the route cost information representing the route cost required for movement along the route from the location of the first mobile objects to the joining point is acquired by the first route cost information acquisition unit, and the movement capability information representing the movement capability of the first mobile objects is acquired by the first movement capability information acquisition unit.

Moreover, the movement cost for the first mobile objects is calculated by the first movement cost calculating unit on the basis of the acquired route cost information and the acquired movement capability information.

In addition, the route cost information representing the route cost required for movement along the route from the joining point to the delivery destination is acquired by the second route cost information acquisition unit, and the movement capability information representing the movement capability of the second mobile object is acquired by the second movement capability information acquisition unit. Moreover, the movement cost for the second mobile objects is calculated by the second movement cost calculating unit on the basis of the acquired route cost information and the acquired movement capability information.

With this arrangement, since it is possible to more delicately calculate the movement cost, it is possible to further efficiently reduce the movement cost.

Aspect 23

A mobile print planning system according to Aspect 23 is the mobile print planning system according to Aspect 20, wherein a plurality of first mobile objects are communicably connected to each other, wherein the movement cost calculating unit includes a first movement cost calculating unit calculating the movement cost required for the first mobile objects to move to the joining point with the second mobile object, a second movement cost calculating unit calculating the movement cost required for the second mobile object to move to the joining point, and a third movement cost calculating unit calculating the movement cost required for the second mobile object to move from the joining point to the delivery destination, and wherein the management unit includes a calculation result acquisition unit acquiring the calculation result from the first movement cost calculation unit, the second movement cost calculation unit and the third movement cost calculation unit with respect to all the combinations of a plurality of joining points and the first mobile objects and the second mobile object to which the first operation execution process for obtaining the execution results of the first mobile objects or the second operation execution process for obtaining the execution result of the second mobile object, and a plan determining unit determining the combination of the joining points and the first mobile objects and the second mobile object capable of producing a minimum sum of the movement cost, on the basis of the calculation result acquired by the calculation result acquisition unit and determining the movement plan and the operation execution plan with respect to the determined combination.

In this arrangement, the movement cost required for the first mobile objects to move to the joining point is calculated by the first movement cost calculating unit. Moreover, the movement cost required for the second mobile objects to move to the joining point is calculated by the second movement cost calculating unit, and the movement cost required for the second mobile object to move from the joining point to the delivery destination is calculated by the third movement cost calculating unit. In addition, the calculation results from the first movement cost calculation unit, the second movement cost calculation unit and the third movement cost calculation unit are acquired by the calculation result acquisition unit with respect to all the combinations of a plurality of joining points and the first mobile objects and the second mobile object to which the first operation execution process or the second operation execution process is allocated.

When the calculation results are acquired, the combination of the joining points and the first mobile objects and the second mobile object capable of producing a minimum sum of the movement cost is determined by the plan determining unit on the basis of the acquired calculation result, whereby the movement plan and the operation execution plan are determined with respect to the determined combination.

With this arrangement, since the movement plan and the operation execution plan are determined with respect to the combination of the joining points and the first mobile objects and the second mobile object capable of producing-a minimum sum of the movement cost, it is possible to further efficiently reduce the movement cost.

In this case, the calculation results from the first movement cost calculating unit, the second movement cost calculating unit and the third movement cost calculating unit are acquired with respect to all the combinations of the plurality of joining points and the first mobile objects and the second mobile object to which the first operation execution process or the second operation execution process is allocated. However, the first movement cost calculating unit, the second movement cost calculating unit and the third movement cost calculating unit do not always have to perform their calculating operations with respect to all the combinations of the joining points and the first mobile objects and the second mobile object.

Aspect 24

A mobile print planning system according to Aspect 24 is the mobile print planning system according to Aspect 23, wherein the system further comprises a first route cost information acquisition unit acquiring route cost information representing the route cost required for movement along the route from the location of the first mobile objects to the joining point, a second route cost information acquisition unit acquiring route cost information representing the route cost required for movement along the route from the location of the second mobile object to the joining point, a third route cost information acquisition unit acquiring route cost information representing the route cost required for movement along the route from the joining point to the delivery destination, a first movement capability information acquisition unit acquiring the movement capability information representing the movement capability of the first mobile objects, and a second movement capability information acquisition unit acquiring the movement capability information representing the movement capability of the second mobile objects, wherein the first movement cost calculating unit calculates the movement cost for the first mobile objects on the basis of the route cost information acquired by the first route cost information acquisition unit and the movement capability information acquired by the first movement capability information acquisition unit, wherein the second movement cost calculating unit calculates the movement cost for the second mobile objects on the basis of the route cost information acquired by the second route cost information acquisition unit and the movement capability information acquired by the second movement capability information acquisition unit, and wherein the third movement cost calculating unit calculates the movement cost for the second mobile objects on the basis of the route cost information acquired by the third route cost information acquisition unit and the movement capability information acquired by the second movement capability information acquisition unit.

In this arrangement, the route cost information representing the route cost required for movement along the route from the location of the first mobile objects to the joining point is acquired by the first route cost information acquisition unit, and the movement capability information representing the movement capability of the first mobile objects is acquired by the first movement capability information acquisition unit.

Moreover, the movement cost for the first mobile objects is calculated by the first movement cost calculating unit on the basis of the acquired route cost information and the acquired movement capability information.

In addition, the route cost information representing the route cost required for movement along the route from the location of the second mobile object to the joining point is acquired by the second route cost information acquisition unit, and the movement capability information representing the movement capability of the second mobile object is acquired by the second movement capability information acquisition unit. Moreover, the movement cost for the second mobile object is calculated by the second movement cost calculating unit on the basis of the acquired route cost information and the acquired movement capability information.

In addition, the route cost information representing the route cost required for movement along the route from the joining point to the delivery destination is acquired by the third route cost information acquisition unit. Moreover, the movement cost for the second mobile object is calculated by the third movement cost calculating unit on the basis of the acquired route cost information and the acquired movement capability information.

With this arrangement, since it is possible to more delicately calculate the movement cost, it is possible to further efficiently reduce the movement cost.

Aspect 25

A mobile print planning program according to Aspect 25 is the mobile print planning program according to Aspect 7, wherein the program further comprises a sub-program for allowing a computer to execute operations including a movement cost calculating step for calculating movement cost for the plurality of mobile objects, wherein the management step makes the movement plan and the operation execution plan for the plurality of mobile objects on the basis of the delivery instruction information acquired by the delivery instruction information acquisition step and the movement cost calculated by the movement cost calculating step, so that the sum of the movement cost becomes small.

In this arrangement, by allowing the computer to read the program and execute operations in accordance with the read program, it is possible to obtain the same functions and advantages as those obtainable in the mobile print planning system according to Aspect 19.

Aspect 26

A mobile print planning program according to Aspect 26 is the mobile print planning program according to Aspect 8, wherein the program further comprises a sub-program for allowing a computer to execute operations including a movement cost calculating step for calculating movement cost for the first mobile object and the second mobile object, wherein the management step makes the movement plan and the operation execution plan for the first mobile object and the second mobile object on the basis of the delivery instruction information acquired by the delivery instruction information acquisition step and the movement cost acquired by the movement cost calculating step, so that the sum of the movement cost becomes small.

In this arrangement, by allowing the computer to read the program and execute operations in accordance with the read program, it is possible to obtain the same functions and advantages as those obtainable in the mobile print planning system according to Aspect 20.

Aspect 27

A mobile print planning program according to Aspect 27 is the mobile print planning program according to Aspect 26, wherein a plurality of first mobile objects are communicably connected to each other, wherein the movement cost calculating step includes a first movement cost calculating step for calculating the movement cost required for the first mobile objects to move to the joining point with the second mobile object, and a second movement cost calculating step for calculating the movement cost required for the second mobile object to move from the joining point to the delivery destination, and wherein the management step includes a calculation result acquisition step for acquiring the calculation result from the first movement cost calculation step and the second movement cost calculation step with respect to all the combinations of the first mobile objects and the second mobile object to which the first operation execution process for obtaining the execution results of the first mobile objects or the second operation execution process for obtaining the execution result of the second mobile object, and a plan determining step for determining the combination of the first mobile objects and the second mobile object capable of producing a minimum sum of the movement cost, on the basis of the calculation result acquired by the calculation result acquisition step and determining the movement plan and the operation execution plan with respect to the determined combination.

In this arrangement, by allowing the computer to read the program and execute operations in accordance with the read program, it is possible to obtain the same functions and advantages as those obtainable in the mobile print planning system according to Aspect 21.

In this case, the calculation results from the first movement cost calculating step and the second movement cost calculating step are acquired with respect to all the combinations of the first mobile objects and the second mobile object to which the first operation execution process or the second operation execution process is allocated. However, the first movement cost calculating step and the second movement cost calculating step do not always have to perform their calculating operations with respect to all the combinations of the first mobile objects and the second mobile object. The above statement is similarly applicable to the mobile print planning method according to Aspect 33.

Aspect 28

A mobile print planning program according to Aspect 28 is the mobile print planning program according to Aspect 27, wherein the program further comprises a sub-program for allowing a computer to execute operations including, a first route cost information acquisition step for acquiring route cost information representing the route cost required for movement along the route from the location of the first mobile objects to the joining point, a second route cost information acquisition step for acquiring route cost information representing the route cost required for movement along the route from the joining point to the delivery destination, a first movement capability information acquisition step for acquiring movement capability information representing the movement capability of the first mobile objects, and a second movement capability information acquisition step for acquiring movement capability information representing the movement capability of the second mobile object, wherein the first movement cost calculating step calculates the movement cost for the first mobile objects on the basis of the route cost information acquired by the first route cost information acquisition step and the movement capability information acquired by the first movement capability information acquisition step, and wherein the second movement cost calculating step calculates the movement cost for the second mobile objects on the basis of the route cost information acquired by the second route cost information acquisition step and the movement capability information acquired by the second movement capability information acquisition step.

In this arrangement, by allowing the computer to read the program and execute operations in accordance with the read program, it is possible to obtain the same functions and advantages as those obtainable in the mobile print planning system according to Aspect 22.

Aspect 29

A mobile print planning program according to Aspect 29 is the mobile print planning program according to Aspect 26, wherein a plurality of first mobile objects are communicably connected to each other, wherein the movement cost calculating step includes a first movement cost calculating step for calculating the movement cost required for the first mobile objects to move to the joining point with the second mobile object, a second movement cost calculating step for calculating the movement cost required for the second mobile object to move to the joining point, and a third movement cost calculating step for calculating the movement cost required for the second mobile object to move from the joining point to the delivery destination, and wherein the management step includes a calculation result acquisition step for acquiring the calculation result from the first movement cost calculation step, the second movement cost calculation step and the third movement cost calculation step with respect to all the combinations of a plurality of joining points and the first mobile objects and the second mobile object to which the first operation execution process for obtaining the execution results of the first mobile objects or the second operation execution process for obtaining the execution result of the second mobile object is allocated, and a plan determining step for determining the combination of the joining points and the first mobile objects and the second mobile object capable of producing a minimum sum of the movement cost, on the basis of the calculation result acquired by the calculation result acquisition step and determining the movement plan and the operation execution plan with respect to the determined combination.

In this arrangement, by allowing the computer to read the program and execute operations in accordance with the read program, it is possible to obtain the same functions and advantages as those obtainable in the mobile print planning system according to Aspect 23.

In this case, the calculation results from the first movement cost calculating step, the second movement cost calculating step and the third movement cost calculating step are acquired with respect to all the combinations of the plurality of joining points and the first mobile objects and the second mobile object to which the first operation execution process or the second operation execution process is allocated. However, the first movement cost calculating step, the second movement cost calculating step and the third movement cost calculating step do not always have to perform their calculating operations with respect to all the combinations of the joining points and the first mobile objects and the second mobile object. The above statement is similarly applicable to the mobile print planning method according to Aspect 35.

Aspect 30

A mobile print planning program according to Aspect 30 is the mobile print planning program according to Aspect 29, wherein the program further comprises a sub-program for allowing a computer to execute operations including, a first route cost information acquisition step for acquiring route cost information representing the route cost required for movement along the route from the location of the first mobile objects to the joining point, a second route cost information acquisition step for acquiring route cost information representing the route cost required for movement along the route from the location of the second mobile object to the joining point, a third route cost information acquisition step for acquiring route cost information representing the route cost required for movement along the route from the joining point to the delivery destination, a first movement capability information acquisition step for acquiring the movement capability information representing the movement capability of the first mobile objects, and a second movement capability information acquisition step for acquiring the movement capability information representing the movement capability of the second mobile object, wherein the first movement cost calculating step calculates the movement cost for the first mobile objects on the basis of the route cost information acquired by the first route cost information acquisition step and the movement capability information acquired by the first movement capability information acquisition step, wherein the second movement cost calculating step calculates the movement cost for the second mobile object on the basis of the route cost information acquired by the second route cost information acquisition step and the movement capability information acquired by the second movement capability information acquisition step, and wherein the third movement cost calculating unit calculates the movement cost for the second mobile object on the basis of the route cost information acquired by the third route cost information acquisition unit and the movement capability information acquired by the second movement capability information acquisition unit.

In this arrangement, by allowing the computer to read the program and execute operations in accordance with the read program, it is possible to obtain the same functions and advantages as those obtainable in the mobile print planning system according to Aspect 24.

Aspect 31

A mobile print planning method according to Aspect 31 is the mobile print planning method according to Aspect 13, wherein the method further comprises a movement cost calculating step for calculating movement cost for the plurality of mobile objects, wherein the management step makes the movement plan and the operation execution plan for the plurality of mobile objects on the basis of the delivery instruction information acquired by the delivery instruction information acquisition step and the movement cost acquired by the movement cost calculating step, so that the sum of the movement cost becomes small.

With this arrangement, it is possible to obtain the same advantage as those obtainable from the mobile print planning system according to Aspect 19.

Aspect 32

A mobile print planning method according to Aspect 32 is the mobile print planning method according to Aspect 14, wherein the method further comprises a movement cost calculating step for calculating movement cost for the first mobile object and the second mobile object, wherein the management step makes the movement plan and the operation execution plan for the first mobile object and the second mobile object on the basis of the delivery instruction information acquired by the delivery instruction information acquisition step and the movement cost acquired by the movement cost calculating step, so that the sum of the movement cost becomes small.

With this arrangement, it is possible to obtain the same advantage as those obtainable from the mobile print planning system according to Aspect 20.

Aspect 33

A mobile print planning method according to Aspect 33 is the mobile print planning method according to Aspect 32, wherein the method further comprises wherein a plurality of first mobile objects are communicably connected to each other, wherein the movement cost calculating step includes a first movement cost calculating step for calculating the movement cost required for the first mobile objects to move to the joining point with the second mobile object, and a second movement cost calculating step for calculating the movement cost required for the second mobile object to move from the joining point to the delivery destination, and wherein the management step includes a calculation result acquisition step for acquiring the calculation result from the first movement cost calculation step and the second movement cost calculation step with respect to all the combinations of the first mobile objects and the second mobile object to which the first operation execution process for obtaining the execution results of the first mobile objects or the second operation execution process for obtaining the execution result of the second mobile object, and a plan determining step for determining the combination of the first mobile objects and the second mobile object capable of producing a minimum sum of the movement cost, on the basis of the calculation result acquired by the calculation result acquisition step and determining the movement plan and the operation execution plan with respect to the determined combination.

With this arrangement, it is possible to obtain the same advantage as those obtainable from the mobile print planning system according to Aspect 21.

Aspect 34

A mobile print planning method according to Aspect 34 is the mobile print planning method according to Aspect 33, wherein the method further comprises a first route cost information acquisition step for acquiring route cost information representing the route cost required for movement along the route from the location of the first mobile objects to the joining point, a second route cost information acquisition step for acquiring route cost information representing the route cost required for movement along the route from the joining point to the delivery destination, a first movement capability information acquisition step for acquiring movement capability information representing the movement capability of the first mobile objects, and a second movement capability information acquisition step for acquiring movement capability information representing the movement capability of the second mobile object, wherein the first movement cost calculating step calculates the movement cost for the first mobile objects on the basis of the route cost information acquired by the first route cost information acquisition step and the movement capability information acquired by the first movement capability information acquisition step, and wherein the second movement cost calculating step calculates the movement cost for the second mobile object on the basis of the route cost information acquired by the second route cost information acquisition step and the movement capability information acquired by the second movement capability information acquisition step.

With this arrangement, it is possible to obtain the same advantage as those obtainable from the mobile print planning system according to Aspect 22.

Aspect 35

A mobile print planning method according to Aspect 35 is the mobile print planning method according to Aspect 32, wherein the method further comprises wherein a plurality of first mobile objects are communicably connected to each other, wherein the movement cost calculating step includes a first movement cost calculating step for calculating the movement cost required for the first mobile objects to move to the joining point with the second mobile object, a second movement cost calculating step for calculating the movement cost required for the second mobile object to move to the joining point, and a third movement cost calculating step for calculating the movement cost required for the second mobile object to move from the joining point to the delivery destination, and wherein the management step includes a calculation result acquisition step for acquiring the calculation result from the first movement cost calculation step, the second movement cost calculation step and the third movement cost calculation step with respect to all the combinations of a plurality of joining points and the first mobile objects and the second mobile object to which the first operation execution process for obtaining the execution results of the first mobile objects or the second operation execution process for obtaining the execution result of the second mobile object, and a plan determining step for determining the combination of the joining points and the first mobile objects and the second mobile object capable of producing a minimum sum of the movement cost, on the basis of the calculation result acquired by the calculation result acquisition step and determining the movement plan and the operation execution plan with respect to the determined combination.

With this arrangement, it is possible to obtain the same advantage as those obtainable from the mobile print planning system according to Aspect 23.

Aspect 36

A mobile print planning method according to Aspect 36 is the mobile print planning method according to Aspect 35, wherein the method further comprises a first route cost information acquisition step for acquiring route cost information representing the route cost required for movement along the route from the location of the first mobile objects to the joining point, a second route cost information acquisition step for acquiring route cost information representing the route cost required for movement along the route from the location of the second mobile object to the joining point, a third route cost information acquisition step for acquiring route cost information representing the route cost required for movement along the route from the joining point to the delivery destination, a first movement capability information acquisition step for acquiring the movement capability information representing the movement capability of the first mobile objects, and a second movement capability information acquisition step for acquiring the movement capability information representing the movement capability of the second mobile object, wherein the first movement cost calculating step calculates the movement cost for the first mobile objects on the basis of the route cost information acquired by the first route cost information acquisition step and the movement capability information acquired by the first movement capability information acquisition step, wherein the second movement cost calculating step calculates the movement cost for the second mobile object on the basis of the route cost information acquired by the second route cost information acquisition step and the movement capability information acquired by the second movement capability information acquisition step, and wherein the third movement cost calculating unit calculates the movement cost for the second mobile object on the basis of the route cost information acquired by the third route cost information acquisition unit and the movement capability information acquired by the second movement capability information acquisition unit.

With this arrangement, it is possible to obtain the same advantage as those obtainable from the mobile print planning system according to Aspect 24.

Aspect 37

A mobile print planning system according to Aspect 37 is the mobile print planning system according to Aspect 1, wherein the system further comprises a stopover determining unit determining whether the mobile objects has to move to a stopover point, wherein the management unit makes the operation execution plan for the plurality of mobile objects on the basis of the delivery instruction information acquired by the delivery instruction information acquisition unit and makes the movement plan for the plurality of mobile objects on the basis of the determination result of the stopover determining unit.

In this arrangement, the delivery instruction information including a specification of the printing or post-printing operation is acquired by the delivery instruction information acquisition unit acquiring, and it is determined by the stopover determining unit whether the mobile objects has to move to a stopover point. Then, the management unit makes the operation execution plan for the plurality of mobile objects on the basis of the acquired delivery instruction information and makes the movement plan for the plurality of mobile objects on the basis of the determination result of the stopover determining unit.

Therefore, since the printing or post-printing operation is performed by the plurality of mobile objects while moving cooperative with each other on the basis of the movement plan and the operation execution plan, it is possible to perform the printing or post-printing operation more efficiently than before. In addition, since a plurality of mobile objects having the operation execution unit are used rather than using the mobile object having a plurality of operation execution units, it is only necessary to provide a required number of mobile objects in accordance with the content of the delivery instruction. When a number of distribution works are performed in parallel with each other, it is possible to reduce equipment cost and efficiently manage the mobile objects. In addition, since the movement plan is made in consideration of whether the plurality of mobile objects has to move to a stopover point, it is possible to efficiently make the movement plan.

In this case, the mobile object means an object capable of moving in a physical space and examples of the mobile object include a vehicle, a ship, an airplane and a special machine. Moreover, examples of the vehicle include an automobile, a two-wheeled vehicle, a special automobile and a railroad vehicle. In addition, examples of the special machine include a carrier device constituted by a belt conveyer and a cradle mounted on the belt conveyer, a truck carried by an external power and a cradle mounted on a movable vehicle. The above statement is similarly applicable to the mobile print planning system according to Aspect 38, the mobile print planning program according to Aspect 45 and 46 and the mobile print planning method according to Aspect 53 and 54.

Examples of the operations related to the printing or post-printing operation include printing, overprinting, foil stamping, varnishing, laminating, folding, binding, sheet gathering, trimming and case sealing. The above statement is similarly applicable to the mobile print planning system according to Aspect 38, the mobile print planning program according to Aspect 45 and 46 and the mobile print planning method according to Aspect 53 and 54.

In addition, examples of the stopover point include a stopover point for supplying materials required for the execution of operations related to the printing or post-printing operation, a stopover point for supplying fuel to the mobile object, a stopover point for the maintenance of the mobile object and a stopover point for checking or transferring the execution result of the mobile object. The above statement is similarly applicable to the mobile print planning system according to Aspect 38, the mobile print planning program according to Aspect 45 and 46 and the mobile print planning method according to Aspect 53 and 54.

As far as the delivery instruction information acquisition unit can acquire the delivery instruction information, the delivery instruction information unit may be constructed in an arbitrary form. For example, the delivery instruction information may be input by an input device, the delivery instruction information may be obtained or received from an external device, and the delivery instruction information may be read from a storage device or a storage medium. Therefore, the acquisition includes at least inputting, obtaining, receiving and reading. The concept of the acquisition is similarly applicable to the following descriptions.

In addition, the system of the aspect of the invention may be embodied as a single device, a terminal or other equipments, and the system of the aspect of the invention may be embodied as a network system in which a plurality of devices, terminals or other equipments are communicably connected to each other. In the latter case, as far as each component is communicably connected to each other, the system of the aspect of the invention may belong to any of the plurality of components. The above statement is similarly applicable to the mobile print planning system according to Aspect 38.

Aspect 38

A mobile print planning system according to Aspect 38 is the mobile print planning system according to Aspect 2, wherein the system further comprises a stopover determining unit determining whether the first mobile object or the second mobile object has to move to a stopover point, wherein the management unit makes the operation execution plan for the first and second mobile objects on the basis of the delivery instruction information acquired by the delivery instruction information acquisition unit and makes the movement plan for the first and second mobile objects on the basis of the delivery instruction information acquired by the delivery instruction information acquisition unit and the determination result of the stopover determining unit.

In this arrangement, the delivery instruction information including specifications of the printing or post-printing operations and a location of the delivery destination is acquired by the delivery instruction information acquisition unit, and it is determined by the stopover determining unit whether the first mobile object or the second mobile object has to move to a stopover point. Then, the management unit makes the operation execution plan for the first and second mobile objects on the basis of the acquired delivery instruction information and makes the movement plan for the first and second mobile objects on the basis of the acquired delivery instruction information and the determination result of the stopover determining unit.

Therefore, since the printing or post-printing operation is performed by the first mobile object and the second mobile object while moving cooperative with each other on the basis of the movement plan and the operation execution plan, it is possible to perform the printing or post-printing operation more efficiently than before. In addition, since a plurality of mobile objects having the first operation execution unit and the second operation execution unit are used rather than using the mobile object having a plurality of first operation execution units and a plurality of second operation execution units, it is only necessary to provide a required number of mobile objects in accordance with the content of the delivery instruction. When a number of distribution works are performed in parallel with each other, it is possible to reduce equipment cost and efficiently manage the mobile objects. In addition, since the movement plan is made in consideration of whether the first mobile object or the second mobile object has to move to a stopover point, it is possible to efficiently make the movement plan.

In the invention, the first operation may constitute a part of the printing operation, the entire part of printing operation or the entire part of printing operation plus a part of the post-printing operation. The above statement is similarly applicable to the mobile print planning program according to Aspect 46 and the mobile print planning method according to Aspect 54.

As far as the second operation is performed after the first operation, the second operation may be performed right after the first operation and the second operation may be performed right after an intermediate operation that is performed between the first operation and the second operation. In the former case, for example, when the first operation constitutes a part of the printing operation, the second operation may constitute the remaining part of the printing operation and the entire part of the post-printing operation. When the first operation constitutes the entire part of the printing operation, the second operation may constitute the entire part of the post-printing operation. When the first operation constitutes the entire part of the printing operation plus a part of the post-printing operation, the second operation constitutes the remaining part of the post-printing operation. The above statement is similarly applicable to the mobile print planning program according to Aspect 46 and the mobile print planning method according to Aspect 54.

Aspect 39

A mobile print planning system according to Aspect 39 is the mobile print planning system according to Aspect 38, wherein the system further comprises a material information acquisition unit acquiring material information about the material contained by the first mobile objects, wherein the stopover determining unit determines whether the first mobile objects contain the material required for execution of the first operation, on the basis of the delivery instruction information acquired by the delivery instruction information acquisition unit and the material information acquired by the material information acquisition unit, and wherein, when the stopover determining unit has determined that the required material is not contained, the management unit makes the movement plan for movement to the stopover point capable of supplying the required material.

In this arrangement, the material information about the material contained by the first mobile object is acquired by the material information acquisition unit, and it is determined by the stopover determining unit whether the first mobile objects contain the material required for execution of the first operation on the basis of the acquired delivery instruction information and the acquired material information. When it is determined that the required material is not contained, the management unit makes the movement plan for movement to the stopover point capable of supplying the required material.

With this arrangement, it is possible to efficiently make the movement plan when the first mobile object does not contain the required material.

Aspect 40

A mobile print planning system according to Aspect 40 is the mobile print planning system according to Aspect 39, wherein a plurality of first mobile objects are communicably connected to each other, wherein the movement cost calculating unit includes a first movement cost calculating unit calculating the movement cost required for the first mobile objects to move to the joining point with the second mobile object, a second movement cost calculating unit calculating the movement cost required for the second mobile object to move from the joining point to the delivery destination, and a third movement cost calculating unit calculating the movement cost required for the first mobile objects to move to the joining point via the stopover point, and wherein the management unit includes a calculation result acquisition unit acquiring the calculation results from the first movement cost calculation unit and the second movement cost calculation unit when the stopover determining unit has determined that the required material is contained and acquiring the calculation result from the third movement cost calculation unit and the second movement cost calculation unit when the stopover determining unit has determined that the required material is not contained, with respect to all the combinations of the first mobile objects and the second mobile object to which the first operation execution process for obtaining the execution results of the first mobile objects or the second operation execution process for obtaining the execution result of the second mobile object is allocated, and a plan determining unit determining the combination of the first mobile objects and the second mobile object capable of producing a minimum sum of the movement cost, on the basis of the calculation result acquired by the calculation result acquisition unit and determining the movement plan and the operation execution plan with respect to the determined combination.

In this arrangement, the movement cost required for the first mobile objects to move to the joining point are calculated by the first movement cost calculating unit, and the movement cost required for the second mobile object to move from the joining point to the delivery destination is calculated by the second movement cost calculating unit. Moreover, the movement cost required for the first mobile objects to move to the joining point via the stopover point is calculated by the third movement cost calculating unit.

When it is determined that the first mobile object contains the required material, the calculation results from the first movement cost calculation unit and the second movement cost calculation unit are acquired by the calculation result acquisition unit, with respect to all the combinations of the first mobile objects and the second mobile object to which the first operation execution process or the second operation execution process is allocated. To the contrary, when it is determined that the first mobile object does not contain the required material, the calculation results from the third movement cost calculation unit and the second movement cost calculation unit are acquired by the calculation result acquisition unit.

When the calculation results are acquired, the combination of the first mobile objects and the second mobile object capable of producing a minimum sum of the movement cost is determined by the plan determining unit on the basis of the acquired calculation result, whereby the movement plan and the operation execution plan are determined with respect to the determined combination.

With this arrangement, since the movement plan and the operation execution plan are determined with respect to the combination of the first mobile objects and the second mobile object capable of producing a minimum sum of the movement cost, it is possible to reduce the movement cost.

In this case, the calculation results from the first movement cost calculating unit, the second movement cost calculating unit or the third movement cost calculating unit are acquired with respect to all the combinations of the first mobile objects and the second mobile object to which the first operation execution process or the second operation execution process is allocated. However, the first movement cost calculating unit, the second movement cost calculating unit and the third movement cost calculating unit do not always have to perform their calculating operations with respect to all the combinations of the first mobile objects and the second mobile object. The above statement is similarly applicable to the mobile print planning system according to Aspect 43.

In addition, the movement cost includes the cost required for the movement and an environmental load incurred in connection with the movement. The above statement is similarly applicable to the mobile print planning system according to Aspect 41, 43 and 44, the mobile print planning program according to Aspect 48, 49, 51 and 52 and the mobile print planning method according to Aspect 56, 57, 59 and 60.

Aspect 41

A mobile print planning system according to Aspect 41 is the mobile print planning system according to Aspect 39, wherein a plurality of first mobile objects are communicably connected to each other, wherein the movement cost calculating unit includes a first movement cost calculating unit calculating the movement cost required for the first mobile objects to move to the joining point with the second mobile object, a second movement cost calculating unit calculating the movement cost required for the second mobile object to move to the joining point, a third movement cost calculating unit calculating the movement cost required for the second mobile object to move from the joining point to the delivery destination, and a fourth movement cost calculating unit calculating the movement cost required for the first mobile objects to move to the joining point via the stopover point, and wherein the management unit includes a calculation result acquisition unit acquiring the calculation result from the first movement cost calculation unit, the second movement cost calculation unit and the third movement cost calculation unit when the stopover determining unit has determined that the required material is contained and acquiring the calculation result from the fourth movement cost calculation unit, the second movement cost calculation unit and the third movement cost calculation unit when the stopover determining unit has determined that the required material is not contained, with respect to all the combinations of a plurality of joining points, the first mobile objects and the second mobile object to which the first operation execution process for obtaining the execution results of the first mobile objects or the second operation execution process for obtaining the execution result of the second mobile object is allocated, and a plan determining unit determining the combination of the joining points, the first mobile objects and the second mobile object capable of producing a minimum sum of the movement cost, on the basis of the calculation result acquired by the calculation result acquisition unit and determining the movement plan and the operation execution plan with respect to the determined combination.

In this arrangement, the movement cost required for the first mobile objects to move to the joining point is calculated by the first movement cost calculating unit, and the movement cost required for the second mobile object to move to the joining point is calculated by the second movement cost calculating unit. Moreover, the movement cost required for the second mobile object to move from the joining point to the delivery destination is calculated by the third movement cost calculating unit, and the movement cost required for the first mobile objects to move to the joining point via the stopover point is calculated by the fourth movement cost calculating unit.

When it is determined that by the first mobile object contains the required material, the calculation results from the first movement cost calculation unit, the second movement cost calculation unit and the third movement cost calculation unit are acquired by the calculation result acquisition unit, with respect to all the combinations of the plurality of joining points and the first mobile objects and the second mobile object to which the first operation execution process or the second operation execution process is allocated. To the contrary, when it is determined that by the first mobile object does not contain the required material, the calculation results from the fourth movement cost calculation unit, the second movement cost calculation unit and the third movement cost calculation unit are acquired by the calculation result acquisition unit.

When the calculation results are acquired, the combination of the joining points and the first mobile objects and the second mobile object capable of producing a minimum sum of the movement cost is determined by the plan determining unit on the basis of the acquired calculation result, whereby the movement plan and the operation execution plan are determined with respect to the determined combination.

With this arrangement, since the movement plan and the operation execution plan are determined with respect to the combination of the joining points and the first mobile objects and the second mobile object capable of producing a minimum sum of the movement cost, it is possible to further efficiently reduce the movement cost.

In this case, the calculation results from the first movement cost calculating unit, the second movement cost calculating unit, the third movement cost calculating unit or the fourth movement cost calculating unit are acquired with respect to all the combinations of the plurality of joining points and the first mobile objects and the second mobile object to which the first operation execution process or the second operation execution process is allocated. However, the first movement cost calculating unit, the second movement cost calculating unit, the third movement cost calculating unit or the fourth movement cost calculating unit do not always have to perform their calculating operations with respect to all the combinations of the joining points and the first mobile objects and the second mobile object. The above statement is similarly applicable to the mobile print planning system according to Aspect 44.

Aspect 42

A mobile print planning system according to Aspect 42 is the mobile print planning system according to Aspect 38, wherein the system further comprises a material information acquisition unit acquiring material information about the material contained by the second mobile object, wherein the stopover determining unit determines whether the second mobile object contains the material required for execution of the second operation, on the basis of the delivery instruction information acquired by the delivery instruction information acquisition unit and the material information acquired by the material information acquisition unit, and wherein, when the stopover determining unit has determined that the required material is not contained, the management unit makes the movement plan for movement to the stopover point capable of supplying the required material.

In this arrangement, the material information about the material contained by the second mobile object is acquired by the material information acquisition unit, and it is determined by the stopover determining unit whether the second mobile object contains the material required for execution of the second operation on the basis of the acquired delivery instruction information and the acquired material information. When it is determined that the required material is not contained, the management unit makes the movement plan for movement to the stopover point capable of supplying the required material.

With this arrangement, it is possible to efficiently make the movement plan when the second mobile object does not contain the required material.

Aspect 43

A mobile print planning system according to Aspect 43 is the mobile print planning system according to Aspect 42, wherein a plurality of first mobile objects are communicably connected to each other, wherein the system further comprises a first movement cost calculating unit calculating the movement cost required for the first mobile objects to move to the joining point with the second mobile object, a second movement cost calculating unit calculating the movement cost required for the second mobile object to move from the joining point to the delivery destination, and a third movement cost calculating unit calculating the movement cost required for the second mobile object to move from the joining point to the delivery destination via the stopover point, and wherein the management unit includes a calculation result acquisition unit acquiring the calculation results from the first movement cost calculation unit and the second movement cost calculation unit when the stopover determining unit has determined that the required material is contained and acquiring the calculation result from the first movement cost calculation unit and the third movement cost calculation unit when the stopover determining unit has determined that the required material is not contained, with respect to all the combinations of the first mobile objects and the second mobile object to which the first operation execution process for obtaining the execution results of the first mobile objects or the second operation execution process for obtaining the execution result of the second mobile object is allocated, and a plan determining unit determining the combination of the first mobile objects and the second mobile object capable of producing a minimum sum of the movement cost, on the basis of the calculation result acquired by the calculation result acquisition unit and determining the movement plan and the operation execution plan with respect to the determined combination.

In this arrangement, the movement cost required for the first mobile objects to move to the joining point is calculated by the first movement cost calculating unit, and the movement cost required for the second mobile object to move from the joining point to the delivery destination is calculated by the second movement cost calculating unit. Moreover, the movement cost required for the second mobile object to move from the joining point to the delivery destination via the stopover point is calculated by the third movement cost calculating unit.

When it is determined that the second mobile object contains the required material, the calculation results from the first movement cost calculation unit and the second movement cost calculation unit are acquired by the calculation result acquisition unit, with respect to all the combinations of the first mobile objects and the second mobile object to which the first operation execution process or the second operation execution process is allocated. To the contrary, when it is determined that the second mobile object does not contain the required material, the calculation results from the first movement cost calculation unit and the third movement cost calculation unit are acquired by the calculation result acquisition unit.

When the calculation results are acquired, the combination of the first mobile objects and the second mobile object capable of producing a minimum sum of the movement cost is determined by the plan determining unit on the basis of the acquired calculation result, whereby the movement plan and the operation execution plan are determined with respect to the determined combination.

With this arrangement, since the movement plan and the operation execution plan are determined with respect to the combination of the first mobile objects and the second mobile object capable of producing a minimum sum of the movement cost, it is possible to reduce the movement cost.

Aspect 44

A mobile print planning system according to Aspect 44 is the mobile print planning system according to Aspect 42, wherein a plurality of first mobile objects are communicably connected to each other, wherein the system further comprises a first movement cost calculating unit calculating the movement cost required for the first mobile objects to move to the joining point with the second mobile object, a second movement cost calculating unit calculating the movement cost required for the second mobile object to move to the joining point, a third movement cost calculating unit calculating the movement cost required for the second mobile object to move from the joining point to the delivery destination, and a fourth movement cost calculating unit calculating the movement cost required for the second mobile object to move to the joining point or the delivery destination via the stopover point, and wherein the management unit includes a calculation result acquisition unit acquiring the calculation result from the first movement cost calculation unit, the second movement cost calculation unit and the third movement cost calculation unit when the stopover determining unit has determined that the required material is contained and acquiring the calculation result from the first movement cost calculation unit, the fourth movement cost calculation unit and the second or third movement cost calculation unit when the stopover determining unit has determined that the required material is not contained, with respect to all the combinations of a plurality of joining points, the first mobile objects and the second mobile object to which the first operation execution process for obtaining the execution results of the first mobile objects or the second operation execution process for obtaining the execution result of the second mobile object, and a plan determining unit determining the combination of the joining points, the first mobile objects and the second mobile object capable of producing a minimum sum of the movement cost, on the basis of the calculation result acquired by the calculation result acquisition unit and determining the movement plan and the operation execution plan with respect to the determined combination.

In this arrangement, the movement cost required for the first mobile objects to move to the joining point is calculated by the first movement cost calculating unit, and the movement cost required for the second mobile object to move to the joining is calculated by the second movement cost calculating unit. Moreover, the movement cost required for the second mobile object to move from the joining point to the delivery destination is calculated by the third movement cost calculating unit, and the movement cost required for the second mobile object to move to the joining point or the delivery destination via the stopover point is calculated by the fourth movement cost calculating unit.

When it is determined that the first mobile object contains the required material, the calculation results from the first movement cost calculation unit, the second movement cost calculation unit and the third movement cost calculation unit are acquired by the calculation result acquisition unit, with respect to all the combinations of the plurality of joining points and the first mobile objects and the second mobile object to which the first operation execution process or the second operation execution process is allocated. To the contrary, when it is determined that the first mobile object does not contain the required material, the calculation results from the first movement cost calculation unit, the fourth movement cost calculation unit, the second movement cost calculation unit and the third movement cost calculation unit are acquired by the calculation result acquisition unit.

When the calculation results are acquired, the combination of the joining points and the first mobile objects and the second mobile object capable of producing a minimum sum of the movement cost is determined by the plan determining unit on the basis of the acquired calculation result, whereby the movement plan and the operation execution plan are determined with respect to the determined combination.

With this arrangement, since the movement plan and the operation execution plan are determined with respect to the combination of the joining point and the first mobile objects and the second mobile object capable of producing a minimum sum of the movement cost, it is possible to reduce the movement cost.

Aspect 45

A mobile print planning program according to Aspect 45 is the mobile print planning program according to Aspect 7, wherein the program further comprises a sub-program for allowing a computer to execute operations including, a stopover determining step for determining whether the mobile objects have to move to a stopover point, wherein the management step makes the operation execution plan for the plurality of mobile objects on the basis of the delivery instruction information acquired by the delivery instruction information acquisition step and makes the movement plan for the plurality of mobile objects on the basis of the determination result of the stopover determining step.

In this arrangement, by allowing the computer to read the program and execute operations in accordance with the read program, it is possible to obtain the same functions and advantages as those obtainable in the mobile print planning system according to Aspect 37.

Aspect 46

A mobile print planning program according to Aspect 46 is the mobile print planning program according to Aspect 8, wherein the program further comprises a sub-program for allowing a computer to execute operations including, a stopover determining step for determining whether the first mobile object or the second mobile object has to move to a stopover point, wherein the management step makes the operation execution plan for the first and second mobile objects on the basis of the delivery instruction information acquired by the delivery instruction information acquisition step and makes the movement plan for the first and second mobile objects on the basis of the delivery instruction information acquired by the delivery instruction information acquisition step and the determination result of the stopover determining step.

In this arrangement, by allowing the computer to read the program and execute operations in accordance with the read program, it is possible to obtain the same functions and advantages as those obtainable in the mobile print planning system according to Aspect 38.

Aspect 47

A mobile print planning program according to Aspect 47 is the mobile print planning program according to Aspect 46, wherein the program further comprises a sub-program for allowing a computer to execute operations including, a material information acquisition step for acquiring material information about the material contained by the first mobile objects, wherein it is determined in the stopover determining step whether the first mobile objects contain the material required for execution of the first operation, on the basis of the delivery instruction information acquired by the delivery instruction information acquisition step and the material information acquired by the material information acquisition step, and wherein, when it is determined in the stopover determining step that the required material is not contained, the management step makes the movement plan for movement to the stopover point capable of supplying the required material.

In this arrangement, by allowing the computer to read the program and execute operations in accordance with the read program, it is possible to obtain the same advantages as those obtainable in the mobile print planning system according to Aspect 39.

Aspect 48

A mobile print planning program according to Aspect 48 is the mobile print planning program according to Aspect 47, wherein a plurality of first mobile objects are communicably connected to each other, wherein the program comprises a sub-program for allowing a computer to execute operations including a first movement cost calculating step for calculating the movement cost required for the first mobile objects to move to the joining point with the second mobile object, a second movement cost calculating step for calculating the movement cost required for the second mobile object to move from the joining point to the delivery destination, and a third movement cost calculating step for calculating the movement cost required for the first mobile objects to move to the joining point via the stopover point, and wherein the management step includes a calculation results acquisition step for acquiring the calculation result from the first movement cost calculation step and the second movement cost calculation step when the stopover determining step has determined that the required material is contained and acquiring the calculation results from the third movement cost calculation step and the second movement cost calculation step when the stopover determining step has determined that the required material is not contained, with respect to all the combinations of the first mobile objects and the second mobile object to which the first operation execution process for obtaining the execution results of the first mobile objects or the second operation execution process for obtaining the execution result of the second mobile object, and a plan determining step for determining the combination of the first mobile objects and the second mobile object capable of producing a minimum sum of the movement cost, on the basis of the calculation result acquired by the calculation result acquisition step and determining the movement plan and the operation execution plan with respect to the determined combination.

In this arrangement, by allowing the computer to read the program and execute operations in accordance with the read program, it is possible to obtain the same functions and advantages as those obtainable in the mobile print planning system according to Aspect 40.

In this case, the calculation results from the first movement cost calculating step, the second movement cost calculating step or the third movement cost calculating step are acquired with respect to all the combinations of the first mobile objects and the second mobile object to which the first operation execution process or the second operation execution process is allocated. However, the first movement cost calculating step, the second movement cost calculating step or the third movement cost calculating step do not always have to perform their calculating operations with respect to all the combinations of the first mobile objects and the second mobile object. The above statement is similarly applicable to the mobile print planning program according to Aspect 51 and the mobile print planning method according to Aspect 56 and 59.

Aspect 49

A mobile print planning program according to Aspect 49 is the mobile print planning program according to Aspect 47, wherein a plurality of first mobile objects are communicably connected to each other, wherein the program comprises a sub-program for allowing the computer to execute operations including a first movement cost calculating step for calculating the movement cost required for the first mobile objects to move to the joining point with the second mobile object, a second movement cost calculating step for calculating the movement cost required for the second mobile object to move to the joining point, a third movement cost calculating step for calculating the movement cost required for the second mobile object to move from the joining point to the delivery destination, and a fourth movement cost calculating step for calculating the movement cost required for the first mobile objects to move to the joining point via the stopover point, and wherein the management step includes a calculation result acquisition step for acquiring the calculation results from the first movement cost calculation step, the second movement cost calculation step and the third movement cost calculation step when it is determined in the stopover determining step that the required material is contained and acquiring the calculation results from the fourth movement cost calculation step, the second movement cost calculation step and the third movement cost calculation step when it is determined in the stopover determining step that the required material is not contained, with respect to all the combinations of a plurality of joining points, the first mobile objects and the second mobile object to which the first operation execution process for obtaining the execution results of the first mobile objects or the second operation execution process for obtaining the execution result of the second mobile object is allocated, and a plan determining step for determining the combination of the joining points, the first mobile objects and the second mobile object capable of producing a minimum sum of the movement cost, on the basis of the calculation result acquired by the calculation result acquisition step and determining the movement plan and the operation execution plan with respect to the determined combination.

In this arrangement, by allowing the computer to read the program and execute operations in accordance with the read program, it is possible to obtain the same functions and advantages as those obtainable in the mobile print planning system according to Aspect 41.

In this case, the calculation results from the first movement cost calculating step, the second movement cost calculating step, the third movement cost calculating step or the fourth movement calculating step are acquired with respect to all the combinations of the plurality of joining points and the first mobile objects and the second mobile object to which the first operation execution process or the second operation execution process is allocated. However, the first movement cost calculating step, the second movement cost calculating step, the third movement cost calculating step or the fourth movement cost calculating step do not always have to perform their calculating operations with respect to all the combinations of the joining points and the first mobile objects and the second mobile object. The above statement is similarly applicable to the mobile print planning program according to Aspect 52 and the mobile print planning method according to Aspect 57 and 60.

Aspect 50

A mobile print planning program according to Aspect 50 is the mobile print planning program according to Aspect 46, wherein the program further comprises a sub-program for allowing a computer to execute operations including, a material information acquisition step for acquiring material information about the material contained by the second mobile object, wherein the stopover determining step determines whether the second mobile object contains the material required for execution of the second operation, on the basis of the delivery instruction information acquired by the delivery instruction information acquisition step and the material information acquired by the material information acquisition step, and wherein, when it is determined in the stopover determining step that the required material is not contained the management step makes the movement plan for movement to the stopover point capable of supplying the required material.

In this arrangement, by allowing the computer to read the program and execute operations in accordance with the read program, it is possible to obtain the same functions and advantages as those obtainable in the mobile print planning system according to Aspect 42.

Aspect 51

A mobile print planning program according to Aspect 51 is the mobile print planning program according to Aspect 50, wherein a plurality of first mobile objects are communicably connected to each other, wherein the program further comprises a sub-program for allowing a computer to execute operations including a first movement cost calculating step for calculating the movement cost required for the first mobile objects to move to the joining point with the second mobile object, a second movement cost calculating step for calculating the movement cost required for the second mobile object to move from the joining point to the delivery destination, and a third movement cost calculating step for calculating the movement cost required for the second mobile object to move from the joining point to the delivery destination via the stopover point, and wherein the management step includes a calculation result acquisition step for acquiring the calculation results from the first movement cost calculation step and the second movement cost calculation step when it is determined in the stopover determining step that the required material is contained and acquiring the calculation results from the first movement cost calculation step and the third movement cost calculation step when it is determined in the stopover determining step that the required material is not contained, with respect to all the combinations of the first mobile objects and the second mobile object to which the first operation execution process for obtaining the execution results of the first mobile objects or the second operation execution process for obtaining the execution result of the second mobile object, and a plan determining step for determining the combination of the first mobile objects and the second mobile object capable of producing a minimum sum of the movement cost, on the basis of the calculation result acquired by the calculation result acquisition step and determining the movement plan and the operation execution plan with respect to the determined combination.

In this arrangement, by allowing the computer to read the program and execute operations in accordance with the read program, it is possible to obtain the same functions and advantages as those obtainable in the mobile print planning system according to Aspect 43.

Aspect 52

A mobile print planning program according to Aspect 52 is the mobile print planning program according to Aspect 50, wherein a plurality of first mobile objects are communicably connected to each other, wherein the program further comprises a sub-program for allowing a computer to execute operations including a first movement cost calculating step for calculating the movement cost required for the first mobile objects to move to the joining point with the second mobile object, a second movement cost calculating step for calculating the movement cost required for the second mobile object to move to the joining point, a third movement cost calculating step for calculating the movement cost required for the second mobile object to move from the joining point to the delivery destination, and a fourth movement cost calculating step for calculating the movement cost required for the second mobile object to move to the joining point or the delivery destination via the stopover point, and wherein the management step includes a calculation result acquisition step for acquiring the calculation results from the first movement cost calculation step, the second movement cost calculation step and the third movement cost calculation step when it is determined in the stopover determining step that the required material is contained and acquiring the calculation results from the first movement cost calculation step, the fourth movement cost calculation step and the second or third movement cost calculation step when it is determined in the stopover determining step that the required material is not contained, with respect to all the combinations of a plurality of joining points, the first mobile objects and the second mobile object to which the first operation execution process for obtaining the execution results of the first mobile objects or the second operation execution process for obtaining the execution result of the second mobile object is allocated, and a plan determining step for determining the combination of the joining points, the first mobile objects and the second mobile object capable of producing a minimum sum of the movement cost, on the basis of the calculation result acquired by the calculation result acquisition step and determining the movement plan and the operation execution plan with respect to the determined combination.

In this arrangement, by allowing the computer to read the program and execute operations in accordance with the read program, it is possible to obtain the same functions and advantages as those obtainable in the mobile print planning system according to Aspect 44.

Aspect 53

A mobile print planning method according to Aspect 53 is the mobile print planning method according to Aspect 13, wherein the method further comprises a stopover determining step for determining whether the mobile objects have to move to a stopover point, wherein the management step makes the operation execution plan for the plurality of mobile objects on the basis of the delivery instruction information acquired by the delivery instruction information acquisition step and makes the movement plan for the plurality of mobile objects on the basis of the determination result of the stopover determining step.

With this arrangement, it is possible to obtain the same advantage as those obtainable from the mobile print planning system according to Aspect 37.

Aspect 54

A mobile print planning method according to Aspect 54 is the mobile print planning method according to Aspect 14, wherein the method further comprises a stopover determining step for determining whether the first mobile object or the second mobile object has to move to a stopover point, wherein the management step makes the operation execution plan for the first and second mobile objects on the basis of the delivery instruction information acquired by the delivery instruction information acquisition step and makes the movement plan for the first and second mobile objects on the basis of the delivery instruction information acquired by the delivery instruction information acquisition step and the determination result of the stopover determining step.

With this arrangement, it is possible to obtain the same advantage as those obtainable from the mobile print planning system according to Aspect 38.

Aspect 55

A mobile print planning method according to Aspect 55 is the mobile print planning method according to Aspect 54, wherein the method further comprises a material information acquisition step for acquiring material information about the material contained by the first mobile objects, wherein it is determined in the stopover determining step whether the first mobile objects contain the material required for execution of the first operation, on the basis of the delivery instruction information acquired by the delivery instruction information acquisition step and the material information acquired by the material information acquisition step, and wherein, when it is determined in the stopover determining step that the required material is not contained, the management step makes the movement plan for movement to the stopover point capable of supplying the required material.

With this arrangement, it is possible to obtain the same advantage as those obtainable from the mobile print planning system according to Aspect 39.

Aspect 56

A mobile print planning method according to Aspect 56 is the mobile print planning method according to Aspect 55, wherein the method further comprises wherein a plurality of first mobile objects are communicably connected to each other, wherein the movement cost calculating step includes a first movement cost calculating step for calculating the movement cost required for the first mobile objects to move to the joining point with the second mobile object, a second movement cost calculating step for calculating the movement cost required for the second mobile object to move from the joining point to the delivery destination, and a third movement cost calculating step for calculating the movement cost required for the first mobile objects to move to the joining point via the stopover point, and wherein the management step includes a calculation result acquisition step for acquiring the calculation results from the first movement cost calculation step and the second movement cost calculation step when the stopover determining step has determined that the required material is contained and acquiring the calculation results from the third movement cost calculation step and the second movement cost calculation step when the stopover determining step has determined that the required material is not contained, with respect to all the combinations of the first mobile objects and the second mobile object to which the first operation execution process for obtaining the execution results of the first mobile objects or the second operation execution process for obtaining the execution result of the second mobile object is allocated, and a plan determining step for determining the combination of the first mobile objects and the second mobile object capable of producing a minimum sum of the movement cost, on the basis of the calculation result acquired by the calculation result acquisition step and determining the movement plan and the operation execution plan with respect to the determined combination.

With this arrangement, it is possible to obtain the same advantage as those obtainable from the mobile print planning system according to Aspect 40.

Aspect 57

A mobile print planning method according to Aspect 57 is the mobile print planning method according to Aspect 55, wherein a plurality of first mobile objects are communicably connected to each other, wherein the movement cost calculating step includes a first movement cost calculating step for calculating the movement cost required for the first mobile objects to move to the joining point with the second mobile object, a second movement cost calculating step for calculating the movement cost required for the second mobile object to move to the joining point, a third movement cost calculating step for calculating the movement cost required for the second mobile object to move from the joining point to the delivery destination, and a fourth movement cost calculating step for calculating the movement cost required for the first mobile objects to move to the joining point via the stopover point, and wherein the management step includes a calculation result acquisition step for acquiring the calculation results from the first movement cost calculation step, the second movement cost calculation step and the third movement cost calculation step when it is determined in the stopover determining step that the required material is contained and acquiring the calculation results from the fourth movement cost calculation step, the second movement cost calculation step and the third movement cost calculation step when it is determined in the stopover determining step that the required material is not contained, with respect to all the combinations of a plurality of joining points, the first mobile objects and the second mobile object to which the first operation execution process for obtaining the execution results of the first mobile objects or the second operation execution process for obtaining the execution result of the second mobile object is allocated, and a plan determining step for determining the combination of the joining points, the first mobile objects and the second mobile object capable of producing a minimum sum of the movement cost, on the basis of the calculation result acquired by the calculation result acquisition step and determining the movement plan and the operation execution plan with respect to the determined combination.

With this arrangement, it is possible to obtain the same advantage as those obtainable from the mobile print planning system according to Aspect 41.

Aspect 58

A mobile print planning method according to Aspect 58 is the mobile print planning method according to Aspect 54, wherein the method further comprises a material information acquisition step for acquiring material information about the material contained by the second mobile object, wherein the stopover determining step determines whether the second mobile object contains the material required for execution of the second operation, on the basis of the delivery instruction information acquired by the delivery instruction information acquisition step and the material information acquired by the material information acquisition step, and wherein, when it is determined in the stopover determining step that the required material is not contained, the management step makes the movement plan for movement to the stopover point capable of supplying the required material.

With this arrangement, it is possible to in the same advantage as those obtainable from the mobile print planning system according to Aspect 42.

Aspect 59

A mobile print planning method according to Aspect 59 is the mobile print planning method according to Aspect 58, wherein the method further comprises wherein a plurality of first mobile objects are communicably connected to each other, wherein the movement cost calculating step includes a first movement cost calculating step for calculating the movement cost required for the first mobile objects to move to the joining point with the second mobile object, a second movement cost calculating step for calculating the movement cost required for the second mobile object to move from the joining point to the delivery destination, and a third movement cost calculating step for calculating the movement cost required for the second mobile object to move from the joining point to the delivery destination via the stopover point, and wherein the management step includes a calculation result acquisition step for acquiring the calculation results from the first movement cost calculation step and the second movement cost calculation step when it is determined in the stopover determining step that the required material is contained and acquiring the calculation result from the first movement cost calculation step and the third movement cost calculation step when it is determined in the stopover determining step that the required material is not contained, with respect to all the combinations of the first mobile objects and the second mobile object to which the first operation execution process for obtaining the execution results of the first mobile objects or the second operation execution process for obtaining the execution result of the second mobile object is allocated, and a plan determining step for determining the combination of the first mobile objects and the second mobile object capable of producing a minimum sum of the movement cost, on the basis of the calculation result acquired by the calculation result acquisition step and determining the movement plan and the operation execution plan with respect to the determined combination.

With this arrangement, it is possible to obtain the same advantage as those obtainable from the mobile print planning system according to Aspect 43.

Aspect 60

A mobile print planning method according to Aspect 60 is the mobile print planning method according to Aspect 58, wherein the method further comprises wherein a plurality of first mobile objects are communicably connected to each other, wherein the movement cost calculation step includes a first movement cost calculating step for calculating the movement cost required for the first mobile objects to move to the joining point with the second mobile object, a second movement cost calculating step for calculating the movement cost required for the second mobile object to move to the joining point, a third movement cost calculating step for calculating the movement cost required for the second mobile object to move from the joining point to the delivery destination, and a fourth movement cost calculating step for calculating the movement cost required for the second mobile object to move to the joining point or the delivery destination via the stopover point, and wherein the management step includes a calculation result acquisition step for acquiring the calculation results from the first movement cost calculation step, the second movement cost calculation step and the third movement cost calculation step when it is determined in the stopover determining step that the required material is contained and acquiring the calculation results from the first movement cost calculation step, the fourth movement cost calculation step and the second or third movement cost calculation step when it is determined in the stopover determining step that the required material is not contained, with respect to all the combinations of a plurality of joining points, the first mobile objects and the second mobile object to which the first operation execution process for obtaining the execution results of the first mobile objects or the second operation execution process for obtaining the execution result of the second mobile object is allocated, and a plan determining step for determining the combination of the joining points, the first mobile objects and the second mobile object capable of producing a minimum sum of the movement cost, on the basis of the calculation result acquired by the calculation result acquisition step and determining the movement plan and the operation execution plan with respect to the determined combination.

With this arrangement, it is possible to obtain the same advantage as those obtainable from the mobile print planning system according to Aspect 44.

BRIEF DESCRIPTION OF THE DRAWINGS

The invention will be described with reference to the accompanying drawings, wherein like numbers refer like elements.

FIG. 4 is a diagram showing a data structure of a print job.

FIG. 5 is a diagram showing a data structure of a processing capability information table 400.

FIG. 8 is a diagram showing present locations of the execution resources.

FIG. 9 is a diagram showing a list of execution resources capable of performing a printing operation and a bookbinding operation.

FIG. 10 is a diagram showing a calculation result of a print end time and a bookbinding end time with respect to each of the combinations for the allocation of the printing operation and the bookbinding operation.

FIG. 11 is a diagram for explaining an outline of a second embodiment of the invention.

FIG. 19 is a diagram showing a data structure of a print job.

FIG. 22 is a diagram showing present locations of the execution resources.

FIG. 23 is a diagram showing a list of execution resources capable of performing a printing operation and a bookbinding operation.

FIG. 24 is a diagram showing a result of movement cost calculation with respect to each of the combinations of the execution resources to which the printing operation or the bookbinding operation is allocated.

FIG. 25 is a diagram for explaining an outline of a fourth embodiment of the invention.

FIG. 33 is a diagram showing a data structure of a print job.

FIG. 34 is a diagram showing a data structure of a material information table 400*b*.

FIG. 37 is a diagram showing present locations of the execution resources.

FIG. 38 is a diagram showing a list of execution resources capable of performing a printing operation and a bookbinding operation.

FIG. 39 is a diagram showing a result of movement cost calculation with respect to each of the combinations of the execution resources to which the printing operation or the bookbinding operation is allocated.

FIG. 40 is a diagram for explaining an outline of a sixth embodiment of the invention.

FIG. 43 is a diagram showing present locations of the execution resources.

FIG. 44 is a diagram showing a result of movement cost calculation with respect to each of the combinations of the execution resources to which the printing operation or the bookbinding operation is allocated.

DESCRIPTION OF EXEMPLARY EMBODIMENTS

Hereinafter, a first embodiment of the invention will be described with reference to drawings. FIGS. 1 to 10 show a mobile print planning system, a mobile print planning program and a mobile print planning method in accordance with the first embodiment of the invention.

First, an outline of the present embodiment will be described with reference to FIG. 1.

Figure 1:
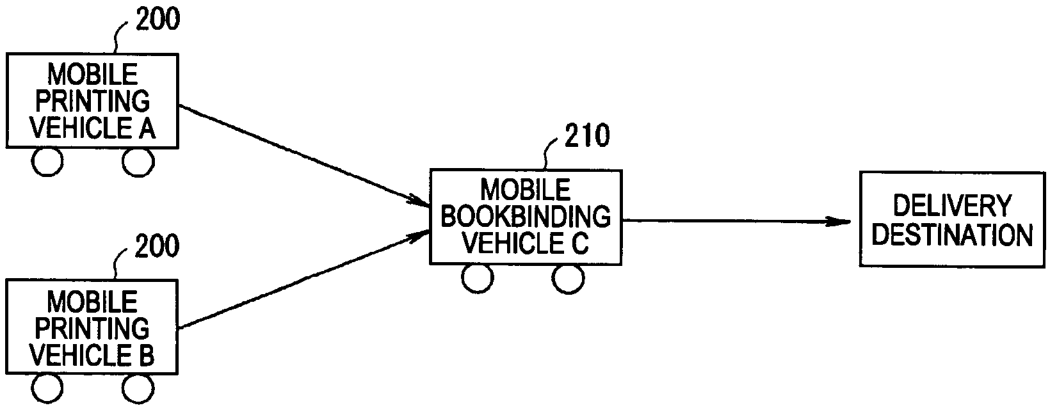
FIG. 1 is a diagram for explaining an outline of a first embodiment of the invention.

The present embodiment provides a mobile printing service by the use of a mobile printing vehicle 200 having a printing device thereon and a mobile bookbinding vehicle 210 having a bookbinding device thereon, as shown in FIG. 1. In the mobile printing service, a plurality of mobile printing vehicles 200 perform printing operations during movement, and results of the printing operations in the mobile printing vehicles 200 are sent to the mobile bookbinding vehicle 210. Then, the mobile bookbinding vehicle 210 performs a bookbinding operation during movement, and result of the bookbinding operation in the mobile bookbinding vehicle 210 is delivered to a predetermined delivery destination. In the present embodiment, a location of the mobile bookbinding vehicle 210 is considered as a joining point.

Then, an outline of functions of a network system to which the invention is applied will be described with reference to FIG. 2 which is a schematic block diagram showing functions of the network system.

Figure 2:
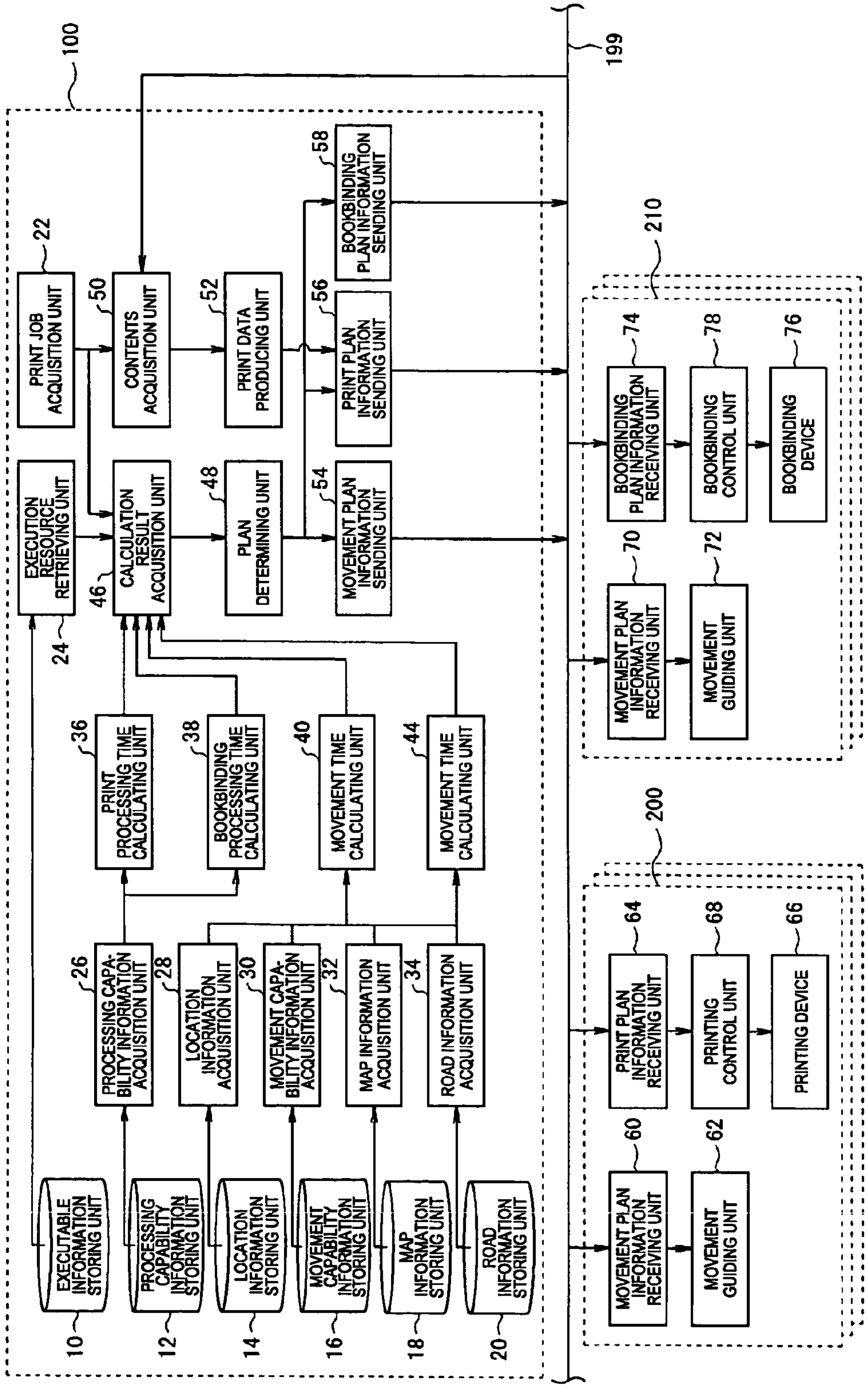
FIG. 2 is a schematic block diagram showing functions of a network system.

As shown in FIG. 2, the network 199 is connected to the mobile printing vehicles 200, the mobile bookbinding vehicles 210, a management server 100 managing the mobile printing vehicles 200 and the mobile bookbinding vehicles 210 (hereinafter, both vehicles 200 and 210 will be collectively referred to as an execution resource unless those vehicles are explicitly differentiated to each other), and a plurality of contents servers (not shown).

The management server 100 includes an executable information storing unit 10 storing executable information representing whether the execution resource can perform the printing operation or the bookbinding operation, a processing capability information storing unit 12 storing processing capability information representing the processing capability of printing device and bookbinding device of the execution resource, a location information storing unit 14 storing location information representing the location of the execution resource, a movement capability information storing unit 16 storing movement capability information representing the movement capability of the execution resource, a map information storing unit 18 storing map information, and a road information storing unit 20 storing road information representing road conditions such as congestion, construction work and traffic regulations.

The management server 100 further includes a print job acquisition unit 22 acquiring a print job including a specification of the printing and bookbinding, location of the delivery destination, deadline of the delivery, and address of contents acquisition site, and an execution resource retrieving unit 24 retrieving for the execution resource capable of performing the printing operation and the bookbinding operation.

The execution resource retrieving unit 24 analyzes the print job (including a specification of the printing and bookbinding) acquired by the print job acquisition unit 22, determines the required printing operation and the required bookbinding operation, and retrieves execution resource capable of performing the determined printing operation and the determined bookbinding operation on the basis of the executable information of the executable information storing unit 10.

The management server 100 further includes a processing capability information acquisition unit 26 acquiring execution capability information of the execution resource (hereinafter will be referred to as a target execution resource) retrieved by the execution resource retrieving unit 24, a location information acquisition unit 28 acquiring location information of the target execution resource, a movement capability information acquisition unit 30 acquiring movement capability information of the target execution resource, a map information acquisition unit 32 acquiring map information including distribution route from the location of the target execution resource to the delivery destination, and a road information acquisition unit 34 acquiring road information of the distribution route.

The management server 100 further includes a print processing time calculating unit 36 calculating a print processing time required for the mobile printing vehicle 200, one of the target execution resources, to complete the printing operation on the basis of the processing capability information acquired by the processing capability information acquisition unit 26, and a bookbinding processing time calculating unit 38 calculating a bookbinding processing time required for the mobile bookbinding vehicle 210, one of the target execution resources, to complete the bookbinding operation on the basis of the processing capability information acquired by the processing capability information acquisition unit 26.

The management server 100 further includes a movement time calculating unit 40 calculating a movement time required for the mobile printing vehicle 200, one of the target execution resources, to move to the joining point on the basis of the location information, the movement capability information, the map information, and the road information acquired by the location information acquisition unit 28, the movement capability information acquisition unit 30, the map information acquisition unit 32 and the road information acquisition unit 34, and a movement time calculating unit 44 calculating a movement time required for the mobile bookbinding vehicle 210, one of the target execution resources, to move from the joining point to the delivery destination on the basis of the location information, the movement capability information, the map information, the road information, and the print job (including location of the delivery destination) acquired by the location information acquisition unit 28, the movement capability information acquisition unit 30, the map information acquisition unit 32, the road information acquisition unit 34, and the print job acquisition unit 22.

The management server 100 further includes a calculation result acquisition unit 46 acquiring calculation results from the print processing time calculating unit 36, the bookbinding processing time calculating unit 38, the movement time calculating unit 40, and the movement time calculating unit 44, with respect to all the combinations of the execution resources among the target execution resources to which the printing operation or the bookbinding operation is allocated, and a plan determining unit 48 determining the combination of the execution resources capable of completing the printing operation and the bookbinding operation before the delivery deadline on the basis of the calculation result and the print job (including the delivery deadline) acquired by the calculation result acquisition unit 46 and the print job acquisition unit 22 and making a movement plan, a print plan and a bookbinding plan with respect to the determined combination of the execution resources.

The management server 100 further includes a contents acquisition unit 50 acquiring contents from the contents server on the basis of the address of the contents acquisition site included in the print job acquired by the print job acquisition unit 22, and a print data producing unit 52 producing print data on the basis of the contents acquired by the contents acquisition unit 50.

The management server 100 further includes a movement plan information sending unit 54 sending movement plan information representing the movement plan determined by the plan determining unit 48 to the execution resource to which the printing operation or the bookbinding operation is allocated, a print plan information sending unit 56 sending print plan information representing the print plan determined by the plan determining unit 48 and print data produced by the print data producing unit 52 to the mobile printing vehicle 200 to which the printing operation is allocated, and a bookbinding plan information sending unit 58 sending bookbinding plan information representing the bookbinding plan determined by the plan determining unit 48 to the mobile bookbinding vehicle 210 to which the bookbinding operation is allocated.

Then, an outline of functions of the mobile printing vehicle 200 will be described.

The mobile printing vehicle 200 is a one-box-type or trailer-type car, for example. Although not depicted in drawing, the mobile printing vehicle 200 has a moving mechanism including a main vehicle body, a plurality of axles rotatably mounted under the main vehicle body, a plurality of wheels mounted on both ends of the axles, an engine, and a power transmission mechanism transmitting power from the engine to the axles. The mobile printing vehicle 200 may be a container towed by another car.

As shown in FIG. 2, a movement plan information receiving unit 60 receiving the movement plan information, a movement guiding unit 62, such as a car navigation system, guiding the movement on the basis of the movement plan information received from the movement plan information receiving unit 60, a print plan information receiving unit 64 receiving the print plan information and the print data, a printing device 66, a printing control unit 68 controlling the printing device 66 on the basis of the print plan information and the print data received from the print plan information receiving unit 64 are mounted on the main vehicle body. Besides, a sheet tray containing print sheets, a discharge tray containing printed sheets and an ink container containing ink used in printing are mounted on the main vehicle body. In addition, in the main vehicle body, a space for an operator to perform the printing operation is reserved within the internal space of the mobile printing vehicle 200.

It is desirable that the mobile printing vehicle 200 is equipped with an electric power generating unit or a battery so as to attract power from internal sources of the mobile printing vehicle 200. However, the mobile printing vehicle 200 may attract power from external sources by plugging into a socket such as on other buildings during stopovers. In addition, if the printing device 66 is a printer that requires water for an offset printing, for example, equipments for supplying water may be incorporated in the mobile printing vehicle 200, or piping equipments for connection with external water lines may be installed in the mobile printing vehicle 200.

The mobile printing vehicle 200 is constructed in such a manner that a door is provided in the vicinity of the discharge tray of the printing device 66 so as to easily pick out the printed matter as the printing result from the mobile printing vehicle 200. In other words, it is desirable to dispose the door to face the discharge tray of the printing device 66 so as to facilitate an access from outside.

Then, an outline of functions of the moving bookbinding vehicle 210 will be described.

The moving bookbinding vehicle 210 has the same moving mechanism as the mobile printing vehicle 200.

As shown in FIG. 2, a movement plan information receiving unit 70 receiving the movement plan information, a movement guiding unit 72, such as a car navigation system, guiding the movement on the basis of the movement plan information received from the movement plan information receiving unit 70, a bookbinding plan information receiving unit 74 receiving the bookbinding plan information, a bookbinding device 76, a bookbinding control unit 78 controlling the bookbinding device 76 on the basis of the bookbinding plan information received from the bookbinding plan information receiving unit 74 are mounted on the main vehicle body. In addition, in the main vehicle body, a space for an operator to perform the bookbinding operation is reserved within the internal space of the mobile bookbinding vehicle 210.

Examples of a general bookbinding machine includes a folding machine, a saddle-stitch binding machine, an unsewn binding machine, a case binding machine, a trimming machine, and a case sealing machine, but the bookbinding device 76 of the present embodiment may include all types of such machines.

It is desirable that the mobile bookbinding vehicle 210 is equipped with an electric power generating unit or a battery so as to attract power from internal sources of the mobile bookbinding vehicle 210. However, the mobile bookbinding vehicle 210 may attract power from external sources by plugging into a socket such as on other buildings during stopovers.

The mobile bookbinding vehicle 210 is constructed in such a manner that a door is provided in the vicinity of the discharge tray of the bookbinding device 76 so as to easily pick out the bookbinded product as the bookbinding result from the mobile bookbinding vehicle 210. In other words, it is desirable to dispose the door to face the discharge tray of the bookbinding device 76 so as to facilitate an access from outside.

Then, the structure of the management server 100 will be described with reference to FIG. 3 which shows a hardware structure of the management server 100.

Figure 3:
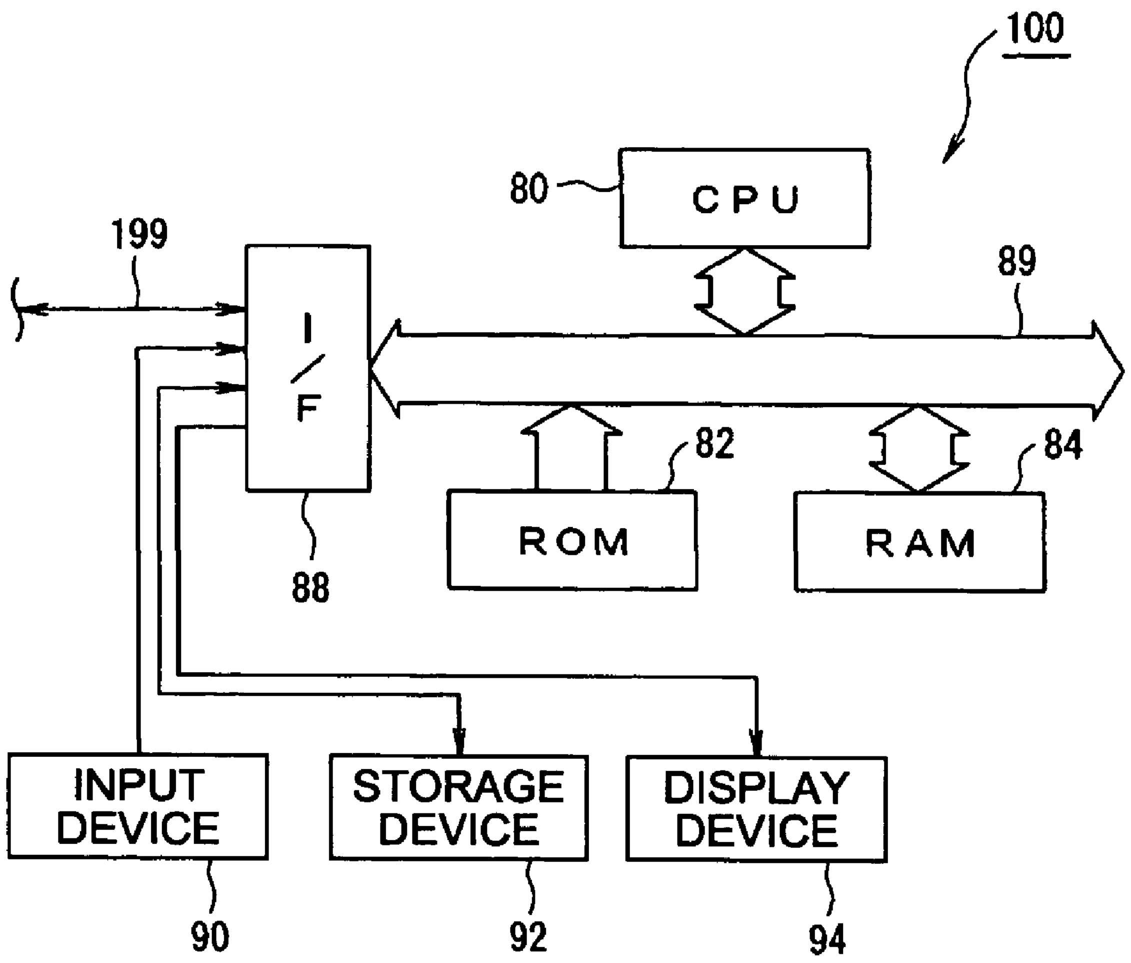
FIG. 3 is a diagram showing a hardware structure of a management server 100.

As shown in FIG. 3, the management server 100 has a CPU 80 performing computation on the basis of a control program and controlling the entire system, an ROM 82 storing the control program and the like of the CPU 80 in a predetermined region, an RAM 84 for storing data read from the ROM 82 and the like and computation results required in the process of the computation in the CPU 80, and an I/F 88 interfacing input and output of data with external devices, which are connected to a bus 89 as a signal line for data transmission so as to exchange data to each other.

The I/F 88 is connected to an input device 90, as an external device, including a keyboard or a mouse, as a human interface, for inputting data, a storage device 92 storing data or tables as a file, a display device 94 displaying a screen on the basis of an image signal, and signal lines for connection to the network 199.

Then, a data structure of the print job will be described with reference to FIG. 4.

As shown in FIG. 4, the print job is expressed in a manner that tag sets such as a starting tag and an ending tag are inserted between a prescribed starting tag 500 and a prescribed ending tag 502, whereby the delivery specification, the printing operation and the bookbinding operation are set.

Tag sets 504 for setting the delivery specification are described between the starting tag 500 and the ending tag 502.

In the tag sets 504, an order receiving date, a contents delivery deadline as the delivery deadline of the contents, a product delivery deadline as the delivery deadline of the product, location of the delivery destination, and the amount of the product are described by corresponding tag sets.

Tag sets 506 and 508 for setting the printing operation and tag sets 510 for setting the bookbinding operation are also described between the starting tag 500 and the ending tag 502.

In the tag sets 506 and 508, details of the printing operation, a sheet size, a sheet type, a finishing size, an address of the contents acquisition site, and an output destination of the printed matter are described by corresponding tag sets.

In the tag sets 510, details of the bookbinding operation, an envelope size corresponding to the sheet size, an envelope destination corresponding to output destination of the printed matter, a content size corresponding to the sheet size, a content destination corresponding to output destination of the printed matter, and an output destination of the bookbinded product are described by corresponding tag sets.

In the example of FIG. 4, it is defined as a printing operation 1 to acquire contents from a contents server specified by a URL (Uniform Resource Locator), "http://some.server/content.pdf" and perform printing on a thick glossy A6 size sheet. In addition, it is defined as a printing operation 2 to acquire CSV (comma separated value) format contents from a contents server specified by a URL, "http://some.server/addressing.csv" and perform variable printing on an A6 size envelope. In addition, it is defined in the printing operation 1 and the printing operation 2 that the contents are prepared on the contents server from 2005-12-20 10:00. In addition, it is described as a bookbinding operation to seal the content printed in the printing operation 1 in the envelope printed in the printing operation 2 and deliver the resulting product in an amount of 400 sets to an OX post office before 2005-12-20 12:00.

Although two printing operations and one bookbinding operation were set in the example of FIG. 4, the number of the printing operation and the bookbinding operation is not limited to this and an arbitrary-number of the printing operation and the bookbinding operation may be set in the print job.

Then, the data structure of the storage device 92 will be described.

The storage device 92 constitutes the executable information storing unit 10, and an executable information table (not shown) in which executable information is registered for each of the execution resources is stored in the storage device 92.

The storage device 92 further constitutes the processing capability information storing unit 12, a processing capability information table 400 in which processing capability information is registered for each of the execution resources is stored in the storage device 92.

FIG. 5 is a diagram showing a data structure of the processing capability information table 400.

As shown in FIG. 5, in the processing capability information table 400, a set of records are registered for each of the execution resources. Each record includes a name of the execution resource and a field for registering the processing capability of the printing device 66 or the bookbinding device 76.

In addition, the storage device 92 constitutes the location information storing unit 14, and location information table (not shown) in which location information is registered for each of the execution resources is stored in the storage device 92. The location information may be acquired, for example, from the execution resources or a base station (not shown) used when the execution resources are communicating with the network 199. Since the location of the execution resources changes successively, it is desirable to acquire the location information periodically or when the movement plan is determined.

In addition, the storage device 92 constitutes the movement capability information storing unit 16, and a movement capability information table (not shown) in which movement capability information is registered for each of the execution resources is stored in the storage device 92.

In addition, the storage device 92 constitutes the map information storing unit 18 and the road information storing unit 20, and the map information and the road information are stored in the storage device 92. The road information may be acquired, for example, from a VICS (Vehicle Information and Communication System) center. Since the road condition changes successively, it is desirable to acquire the road information periodically.

Then, operations performed in the CPU 80 will be described.

Figure 6:
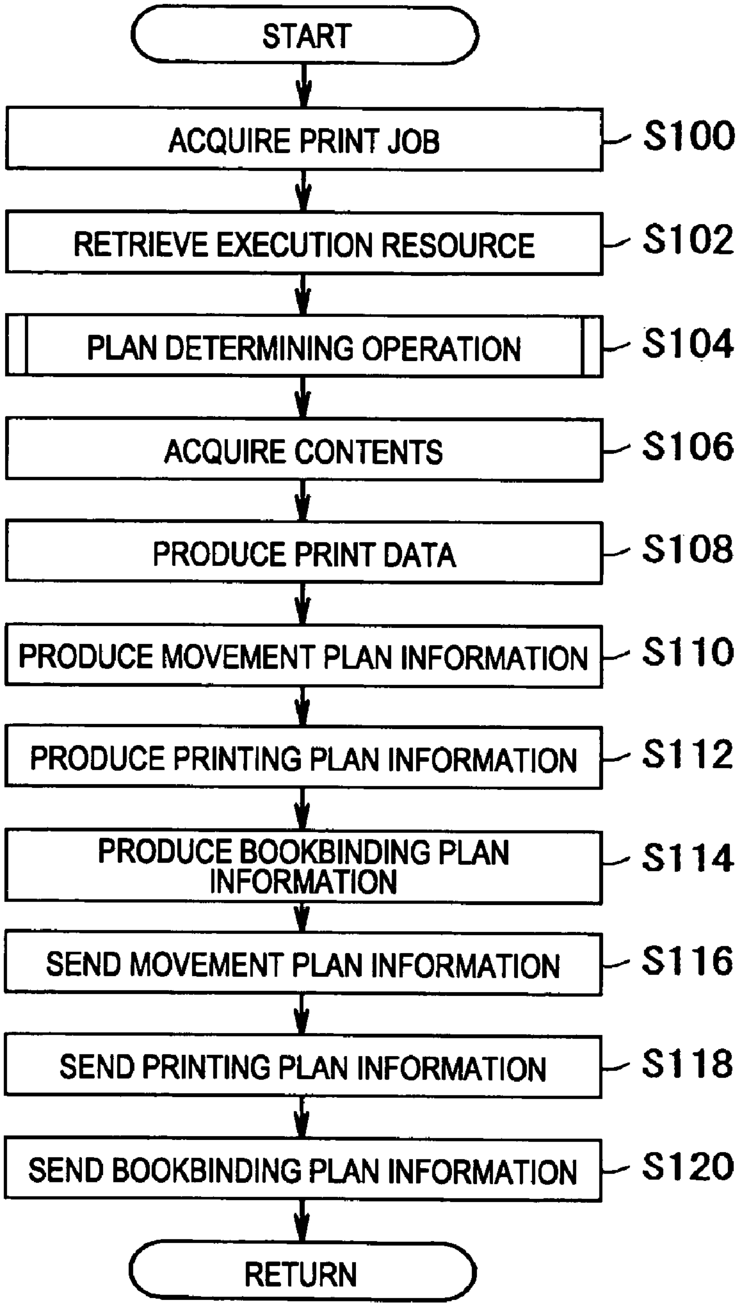
FIG. 6 is a flowchart showing an operation of providing a mobile printing service.

The CPU 80 is constituted by a micro-processing unit and the like, and activates a predetermined program stored in a prescribed region of the ROM 82, thereby performing an operation of providing a mobile printing service shown in the flowchart of FIG. 6 in accordance with the program.

FIG. 6 is a flowchart showing an operation of providing the mobile printing service.

The operation of providing the mobile printing service, when executed by the CPU 80, advances to step S100, as shown in FIG. 6.

A print job is acquired in step S100, and then in step S102, the acquired print job, is analyzed and the printing operation and the bookbinding operation required are determined so as to retrieve the execution resource capable of performing the determined printing operation and the determined bookbinding operation on the basis of the executable information table. Then, an operation of step S104 is performed.

In step S104, a plan determining operation in which a movement plan, a print plan and a bookbinding plan are determined with respect to the combination of the execution resources to which the printing operation or the bookbinding operation is allocated among the retrieved target execution resources. Then, an operation of step S106 is performed.

In step S106, contents are acquired by the contents server on the basis of the address of the acquisition site included in the acquired print job, and then in step S108, print data is produced on the basis of the acquired contents. Then, an operation of step S110 is performed.

In step S110, movement plan information representing the movement plan determined in the plan determining operation in step S104 is produced. For example, the movement plan information includes guide information for guiding the execution resource along the distribution route to joining points or the delivery destination and schedule information representing a departure time and an arrival time. In the embodiment of the invention, the movement plan information may be produced for a plurality of execution resources, or may be produced for each of the execution resources.

Then, in step S112, print plan information representing the print plan determined in the plan determining operation in step S104 is produced. For example, the print plan information includes setting information described by tag sets 506 and 508 of the print job and schedule information representing a print start time and a print end time. The print plan information may be produced for a plurality of mobile printing vehicles 200, or may be produced for each of the mobile printing vehicles 200.

Then, in step S114, bookbinding plan information representing the bookbinding plan determined in the plan determining operation in step S104 is produced. For example, the bookbinding plan information includes setting information described by tag sets 510 of the print job and schedule information representing a bookbinding start time and a bookbinding end time. The bookbinding plan information may be produced for a plurality of mobile bookbinding vehicles 210, or may be produced for each of the mobile bookbinding vehicles 210.

Then, in step S116, the produced movement plan information is sent to the execution resource to which the printing operation or the bookbinding operation is allocated, and then in step S118, the print plan information and the print data produced are sent to the mobile printing vehicle 200 to which the printing operation is allocated. Then, in step S120, the produced bookbinding plan information is sent to the mobile bookbinding vehicle 210 to which the bookbinding operation is allocated, and a series of operations are completed and return to an original operation.

Then, the plan determination operation performed in step S104 will be described with reference to FIG. 7 which shows a flowchart for the plan determination operation in step S104.

Figure 7:
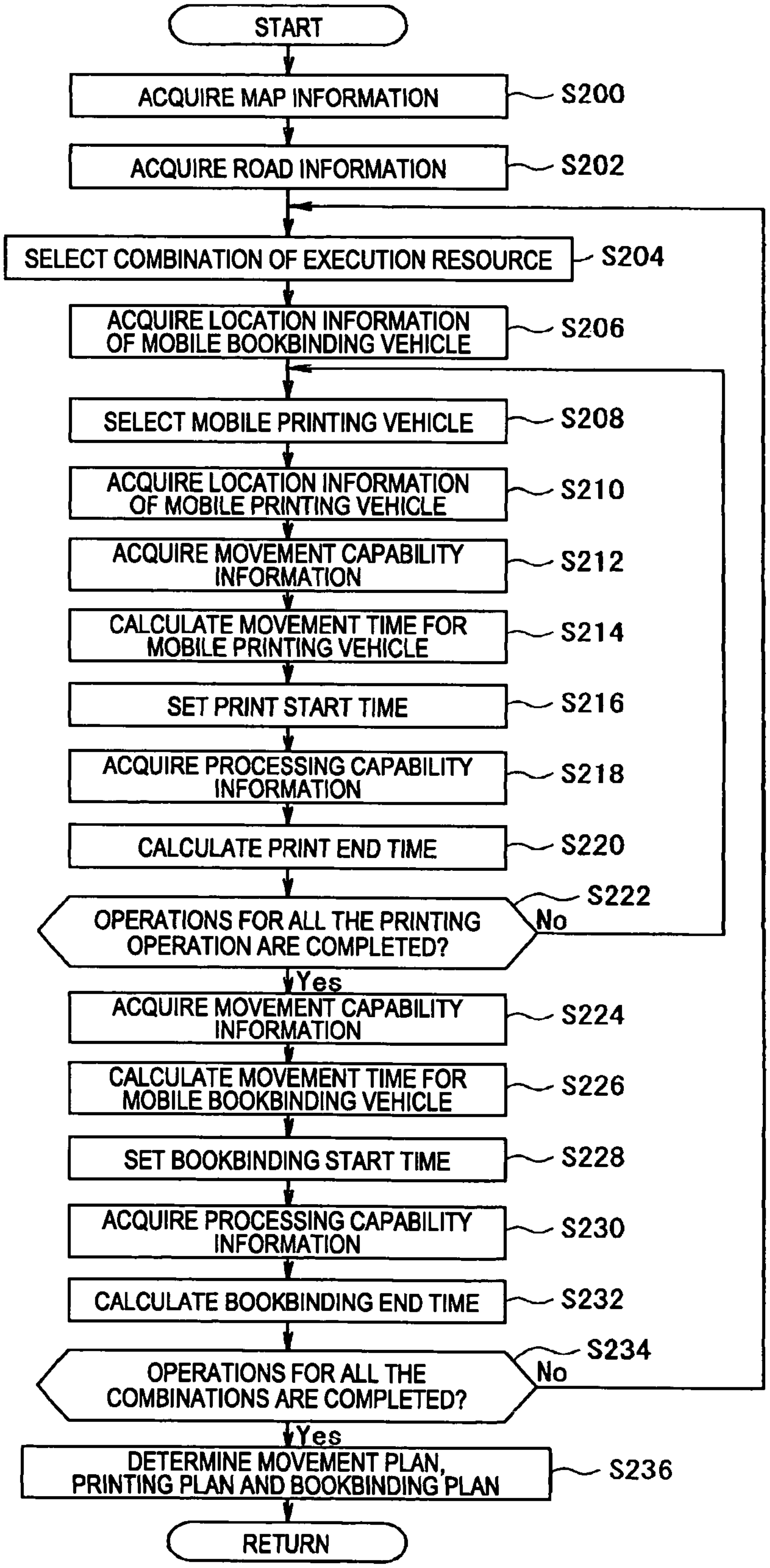
FIG. 7 is a flowchart showing a plan determining operation in step S104.

First, the plan determining operation, when executed in step S104, advances to step S200, as shown in FIG. 7.

In step S200, map information including distribution route from the location of target execution resource to delivery destination is acquired by the storage device 92, and then in step S202, road information of the distribution route is acquired by the storage device 92. Then, an operation of step S204 is performed.

In step S204, a combination of the execution resources to which the printing operation or the bookbinding operation is allocated is selected from the target execution resources, and then in step S206, location information of the mobile bookbinding vehicle 210 relating to the selected combination (hereinafter will be referred to as a selected mobile bookbinding vehicle 210) is acquired by the location information table. Then, an operation of step S208 is performed.

In step S208, one of the mobile printing vehicles 200 relating to the selected combination (hereinafter will be referred to as a selected mobile printing vehicle 200) is selected, and then in step S210, position information of the selected mobile printing vehicle 200 is acquired by the location information table. Then, in step S212, movement capability information of the selected mobile printing vehicle 200 is acquired by the movement capability information table. Then, an operation of step S214 is performed.

In step S214, the distribution route distance from the location of the selected mobile printing vehicle 200 to the joining point is calculated on the basis of the map information and the location information acquired in steps S200, S206 and S210. Moreover, in step S214, the movement time required for the selected mobile printing vehicle 200 to move to the joining point is calculated on the basis of the calculated distribution route distance and the movement capability information acquired in step S212. In addition, in step S214, the calculated movement time is corrected on the basis of the road information acquired in step S202.

Then, in step S216, present time is set as the print start time. In this case, when there is another mobile printing vehicle 200 performing a previous operation of the selected mobile printing vehicle 200, the later one of the print end time and the arrival time of the another mobile printing vehicle 200 is set as the print start time of the selected mobile printing vehicle 200. In addition, when there is a plurality of other mobile printing vehicles 200 performing previous operations of the selected mobile printing vehicle 200, the later one of the print end times and the arrival times of the plurality of other mobile printing vehicles 200 is set as the print start time of the selected mobile printing vehicle 200.

Then, in step S218, processing capability information of the selected mobile printing vehicle 200 is acquired by the processing capability information table 400, and then in step S220, one of unallocated printing operations is allocated to the selected mobile printing vehicle 200, a print processing time required for the selected mobile printing vehicle 200 to complete the allocated printing operation is calculated on the basis of the acquired processing capability information, and the calculated print processing time is added to the print start time, thereby calculating the print end time.

Then, in step S222, it is determined whether the operations in steps S208 to S220 are completed with respect to all the printing operations. When it is determined in step S222 that all the printing operations are completed (i.e., Yes in step S222), an operation of step S224 is performed.

In step S224, the movement capability information of the selected mobile bookbinding vehicle 210 is acquired by the movement capability information table, and an operation of step S226 is performed.

In step S226, the distribution route distance from the joining point to the delivery destination is calculated on the basis of the print job, the map information and the location information acquired in steps S100, S200 and S206. Moreover, in step S226, the movement time required for the selected mobile bookbinding vehicle 210 to move from the joining point to the delivery destination is calculated on the basis of the calculated distribution route distance and the movement capability information acquired in step S224 in addition, in step S226, the calculated movement time is corrected on the basis of the road information acquired in step S202.

Then, in step S228, the print end time or the arrival time of the mobile printing vehicle 200 performing an operation to be transferred to the selected mobile bookbinding vehicle 210, whichever comes later, is set as the bookbinding start time of the selected mobile bookbinding vehicle 210. In addition, when there is a plurality of mobile printing vehicles 200 performing operations to be transferred to the selected mobile bookbinding vehicle 210, the print end times or the arrival times of the plurality of mobile printing vehicles 200, whichever comes later, is set as the bookbinding start time of the selected mobile bookbinding vehicle 200.

Then, in step S230, processing capability information of the selected mobile bookbinding vehicle 210 is acquired by the processing capability information table 400, and then in step S232, a bookbinding processing time required for the selected mobile bookbinding vehicle 210 to complete the bookbinding operation is calculated on the basis of the acquired processing capability information, and the calculated bookbinding processing time is added to the bookbinding start time, thereby calculating the bookbinding end time.

Then, in step S234, it is determined whether the operations in steps S204 to S232 are completed with respect to all the combinations of the execution resources to which the printing operation or the bookbinding operation is allocated. When it is determined in step S234 that the operations are completed with respect to all the combinations (i.e., Yes in step S234), an operation of step S236 is performed.

In step S236, the combination of the execution resources capable of completing the printing operation and the bookbinding operation before the product delivery deadline is determined on the basis of the calculation results in steps S214, S220, S226 and S232 and the print job acquired in step S100, a movement plan, a print plan, and a bookbinding plan are determined with respect to the determined combination of the execution resources, and a series of operations are completed and return to an original operation.

On the other hand, when it is determined in step S234 that the operations are not completed with respect to all the combinations (i.e., No in step S234), an operation of step S204 is performed.

On the other hand, when it is determined in step S222 that all the printing operations are not completed (i.e., No in step S222), an operation of step S208 is performed.

Hereinafter, the operation of the present embodiment will be described.

FIG. 8 is a diagram showing present locations of the execution resources.

As shown in FIG. 8, it is assumed that the mobile printing vehicles A and B are located at a 30-minute distance from the mobile bookbinding vehicle C, and the mobile bookbinding vehicle C is located at a 20-minute distance from the delivery destination.

The management server 100 has acquired the print job through step S100. In the present embodiment, it is assumed that the print job of FIG. 4 is acquired. In addition, the execution resource capable of performing the printing operation and the bookbinding operation is retrieved through step S102.

FIG. 9 is a diagram showing a list of execution resources capable of performing the printing operation and the bookbinding operation.

The analysis of the print job of FIG. 4 shows that the print job requires two printing operations, and one bookbinding operation. As shown in FIG. 9, two mobile printing vehicles A and B and single mobile bookbinding vehicle C are obtained as a retrieval result of the execution resource capable of performing the printing operations and the bookbinding operation.

Then, through steps S200 to S234, the movement time, the print end time and the bookbinding end time are calculated with respect to all the combinations of the execution resources among the target execution resources to which the printing operation or the bookbinding operation is allocated.

FIG. 10 is a diagram showing a calculation result of a print end time and a bookbinding end time with respect to each of the combinations for the allocation of the printing operation and the bookbinding operation.

In the example of FIG. 10, the print start time and the bookbinding start time are set and the print end time and the bookbinding end time are calculated with respect to each of the cases a case where the printing operations 1 and 2 are allocated to the mobile printing vehicle A and the bookbinding operation is allocated to the mobile bookbinding vehicle C, a case where the printing operation 1 is allocated to the mobile printing vehicle A, the printing operation 2 is allocated to the mobile printing vehicle B, and the bookbinding operation is allocated to the mobile bookbinding vehicle C, a case where the printing operation 1 is allocated to the mobile printing vehicle B, the printing operation 2 is allocated to the mobile printing vehicle A, and the bookbinding operation is allocated to the mobile bookbinding vehicle C, and a case where the printing operations 1 and 2 are allocated to the mobile printing vehicle B and the bookbinding operation is allocated to the mobile bookbinding vehicle C.

Then, through step S236, the combination of the execution resources capable of completing the printing operation and the bookbinding operation before the product delivery deadline is determined among each of the combinations of the execution resources, and the movement plan, the print plan and the bookbinding plan are determined with respect to the determined combination of the execution-resources.

Analysis of the print job of FIG. 4 shows that the product delivery deadline is 2005-12-20 12:00. Referring to FIG. 10, since the candidates in the second and third rows can completes the printing operation and the bookbinding operation before the delivery deadline, either one of the candidates in the second and third rows is determined as the combination of the execution resources.

Then, the contents are acquired through steps S106 and S108 from the contents server and print data is produced on the basis of the acquired contents. In addition, through steps S110 to S120, the movement plan information, the print plan information and the bookbinding plan information are produced and sent to the execution resources together with the print data.

In the mobile printing vehicles A and B, when the movement plan information is received at the movement plan information receiving unit 60, the movement guiding unit 62 performs a movement guiding operation on the basis of the received movement plan information. Then, operators drive the mobile printing vehicles A and B to the joining point in accordance with the movement guiding operation. When the print plan information and the print data are received at the print plan information receiving unit 64, the printing control unit 68 controls the printing device 66 to perform the printing operations 1 and 2 on the basis of the received print plan information and the received print data. The printing operations 1 and 2 are performed during the movement of the mobile printing vehicles A and B.

In the mobile bookbinding vehicle C, when results of the printing operations in the mobile printing vehicles A and B are received and the movement plan information is received at the movement plan information receiving unit 70, the movement guiding unit 72 performs a movement guiding operation on the basis of the received movement plan information. Then, an operator drives the mobile bookbinding vehicle C from the joining point to the delivery destination in accordance with the movement guiding operation. When the bookbinding plan information is received at the bookbinding plan information receiving unit 74, the bookbinding control unit 78 controls the bookbinding device 76 to perform the bookbinding operation on the basis of the received bookbinding plan information. The bookbinding operation is performed during the movement of the mobile bookbinding vehicle C.

In the present embodiment, the print job including the specification of the printing operation and the bookbinding operation, the location of the delivery destination and the delivery deadline is acquired, and the movement plan for the execution resources, the print plan for the mobile printing vehicle 200 and the bookbinding plan for the mobile bookbinding vehicle 210 are made on the basis of the acquired print job.

Therefore, since the printing operation and the bookbinding operation are performed by the execution resources while moving cooperative with each other on the basis of the movement plan, the print plan and the bookbinding plan, it is possible to perform the printing operation and the bookbinding operation more efficiently than before. In addition, since a plurality of execution resources having the printing device 66 or the bookbinding device 76 are used rather than using an execution resource having a plurality of printing devices 66 or a plurality of bookbinding devices 76, it is only necessary to provide a required number of execution resources in accordance with the content of the delivery instruction. When a number of distribution works are performed in parallel with each other, it is possible to reduce cost and efficiently manage the execution resources.

In addition, in the present embodiment, the location information representing the location of the execution resource is acquired and the processing capability information representing the processing capability of the printing device 66 and the bookbinding device 76 is acquired, whereby the movement plan, the print plan and the bookbinding plan are made on the basis of the acquired print job, the acquired location information and the acquired processing capability information.

Therefore, since it is possible to more delicately make the movement plan, the print plan and the bookbinding plan, it is possible to further efficiently perform the printing operation and the bookbinding operation.

In addition, in the present embodiment, the map information including the distribution route from the location of the execution resources to the delivery destination is acquired and the movement plan, the print plan and the bookbinding plan are made on the basis of the acquired print job and the acquired map information.

Therefore, since it is possible to more delicately make the movement plan, the print plan and the bookbinding plan, it is possible to further efficiently perform the printing operation and the bookbinding operation.

In addition, in the present embodiment, the movement time required for the mobile printing vehicle 20 to move to the joining point is calculated, the print processing time required for the mobile printing vehicle 200 to complete the printing operation is calculated, the movement time required for the mobile bookbinding vehicle 210 to move from the joining point to the delivery destination is calculated, the bookbinding time required for the mobile bookbinding vehicle 210 to complete the bookbinding operation is calculated, the calculation results of the movement time, the print processing time and the bookbinding processing time are acquired with respect to all the combination of the execution resources to which the printing operation or the bookbinding operation is allocated, the combination of the execution resources capable of completing the printing operation and the bookbinding operation before the delivery deadline is determined on the basis of the acquired calculation result and the acquired print job, and the movement plan, the print plan and the bookbinding plan are determined with respect to the determined combination of the execution resources.

Therefore, since it is possible to more delicately make the movement plan, the print plan and the bookbinding plan, it is possible to further efficiently perform the printing operation and the bookbinding operation.

In the first embodiment, the print job corresponds to the delivery instruction information in Forms 1 to 5, Forms 7 to 11 and Forms 13 to 17, the mobile printing vehicle 200 and the mobile bookbinding vehicle 210 correspond to the mobile object in Aspect 1, 7 or 13, the mobile printing vehicle 200 corresponds to the first mobile object in Forms 2 to 5, Forms 8 to 11 and Forms 14 to 17, and the mobile bookbinding vehicle 210 corresponds to the second mobile object in Forms 2 to 5, Forms 8 to 11 and Forms 14 to 17. The print job acquisition unit 22 and step S100 correspond to the delivery instruction information acquisition unit in Aspect 1 or 2, and step S100 corresponds to the delivery instruction information acquisition step in Aspect 7, 8, 13 or 14.

In addition, in the first embodiment, the units 26 to 48 and step S104 correspond to the management unit in Forms 1 to 5, step S104 corresponds to the management step in Forms 7 to 11 and Forms 13 to 17, the processing capability information acquisition unit 26 and steps S218 and S230 correspond to the processing capability information acquisition unit in Aspect 3. In addition, steps S218 and S230 correspond to the processing capability information acquisition step in Aspect 9 or 15, the location information acquisition unit 28 and steps S206 and S210 correspond to the location information acquisition unit in Aspect 3, and steps S206 and S210 correspond to the location information acquisition step in Aspect 9 or 15.

In addition, in the first embodiment, the map information acquisition unit 32 and step S200 correspond to the map information acquisition unit in Aspect 4, step S200 corresponds to the map information acquisition step in Aspect 10 or 16, and the print processing time calculating unit 36 and step S220 correspond to the first operation processing time calculating unit in Aspect 5. In addition, step S220 corresponds to the first operation processing time calculating step in Aspect 11 or 17, the bookbinding processing time calculating unit 38 and step S232 correspond to the second operation processing time calculating unit in Aspect 5, and step S232 corresponds to the second operation processing time calculating step in Aspect 11 or 17.

In addition, in the first embodiment, the movement time calculating unit 40 and step S214 correspond to the first movement time calculating unit in Aspect 5, step S214 corresponds to the first movement time calculating step in Aspect 11 or 17, the movement time calculating unit 44 and step S226 correspond to the second movement time calculating unit in Aspect 5, and step S226 corresponds to the second movement time calculating step in Aspect 11 or 17. The calculation result acquisition unit 46 and steps S204 and S234 correspond to the calculation result acquisition unit in Aspect 5, and steps S204 and S234 correspond to the calculation result acquisition step in Aspect 11 or 17.

In addition, in the first embodiment, the plan determining unit 48 and step S236 correspond to the plan determining unit in Aspect 5, and step S236 corresponds to the plan determining step in Aspect 11 or 17.

Hereinafter, a second embodiment of the invention will be described with reference to drawings. FIGS. 11 to 15 show a mobile print planning system, a mobile print planning program and a mobile print planning method in accordance with the second embodiment of the invention. In addition, only those parts different from the first embodiment will be described, and the same parts as the first embodiment are denoted by the same reference numerals and will not be described.

First, an outline of the present embodiment will be described with reference to FIG. 11.

Although the present embodiment also provides a mobile printing service by the use of the execution resources as shown in FIG. 11, the present embodiment is different from the first embodiment in that a predetermined place other than the location of the mobile bookbinding vehicle 210 is set as the joining point. The joining point may include the location of the delivery destination.

Then, an outline of functions of a network system to which the invention is applied will be described with reference to FIG. 12 which is a schematic block diagram showing functions of the network system.

Figure 12:
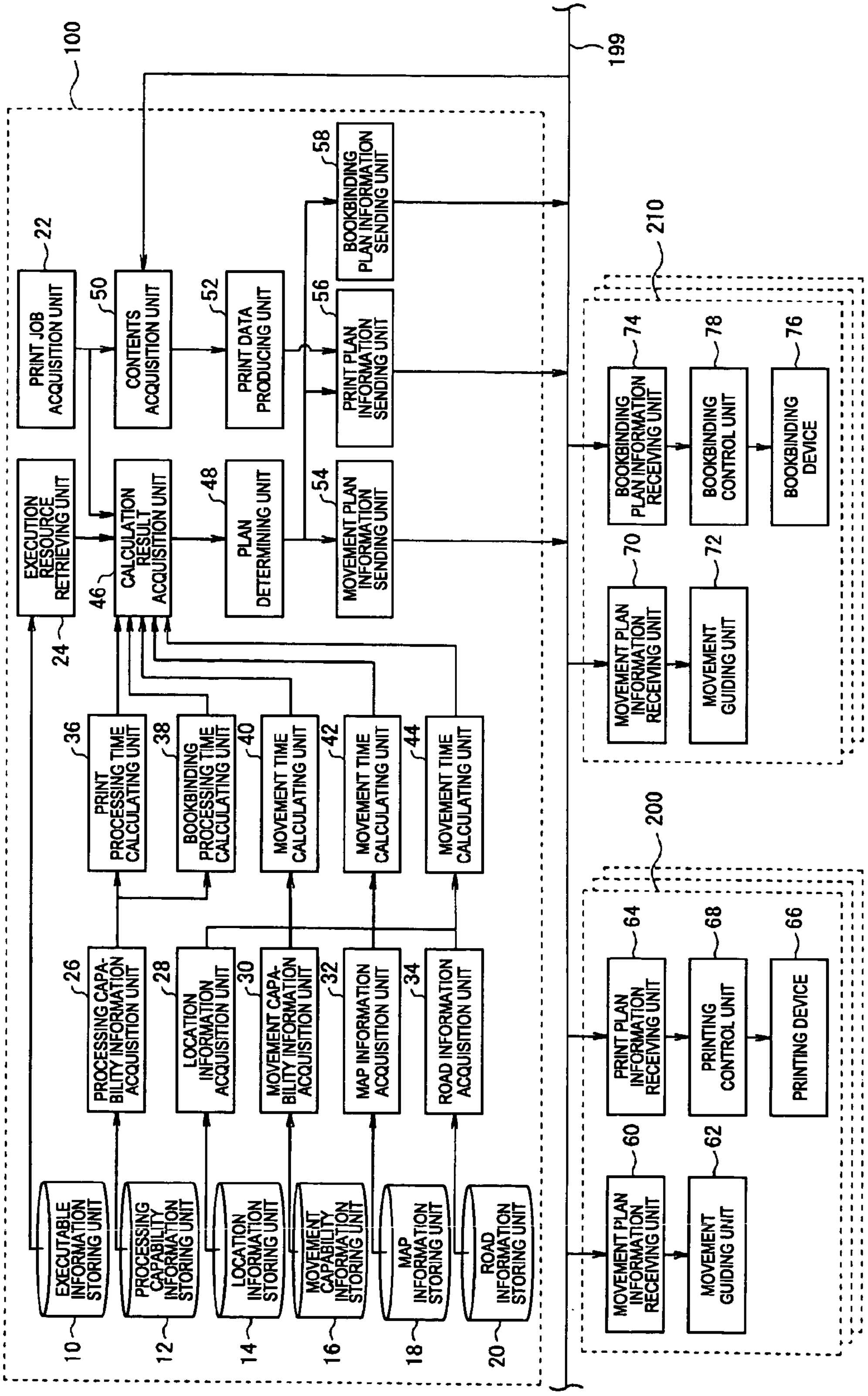
FIG. 12 is a schematic block diagram showing functions of a network system.

As shown in FIG. 12, the management server 100 includes the executable information storing unit 10, the processing capability information storing unit 12, the location information storing unit 14, the movement capability information storing unit 16, the map information storing unit 18, the road information storing unit 20, the print job acquisition unit 22, the execution resource retrieving unit 24, the processing capability information acquisition unit 26, the location information acquisition unit 28, the movement capability information acquisition unit 30, the map information acquisition unit 32, and the road information acquisition unit 34.

The management server 100 further includes the print processing time calculating unit 36, the bookbinding processing time calculating unit 38, the movement time calculating units 40 and 44, the calculation result acquisition unit 46, the plan determining unit 48, the contents acquisition unit 50, the print data producing unit 52, the movement plan information sending unit 54, the print plan information sending unit 56 and the bookbinding plan information sending unit 58.

The management server 100 further includes a movement time calculating unit 42 calculating the movement time required for the mobile bookbinding vehicle 210, which is one of the target execution resources, to move to the joining point on the basis of the location information, the movement capability information, the map information and the road information, acquired by the location information acquisition unit 28, the movement capability information acquisition unit 30, the map information acquisition unit 32, and the road information acquisition unit 34.

The calculation result acquisition unit 46 acquires calculation results from the print processing time calculating unit 36, the bookbinding processing time, calculating unit 38, the movement time calculating unit 40 and the movement time calculating unit 44, with respect to all the combinations of a plurality of joining points and the execution resources among the target execution resources to which the printing operation or the bookbinding operation is allocated.

The plan determining unit 48 determines the combination of the joining points and the execution resource capable of completing the printing operation and the bookbinding operation before the delivery deadline on the basis of the calculation result and the print job (including the delivery deadline) acquired by the calculation result acquisition unit 46 and the print job acquisition unit 22 and determines the movement plan, the print plan, and the bookbinding plan with respect to the determined combination of the joining points and the execution resources.

Then, the data structure of the storage device 92 will be described.

A joining point location information table in which location information is registered for each of the joining points is stored in the storage device 92.

Then, operations performed in the CPU 80 of the management server 100 will be described.

Figure 13:
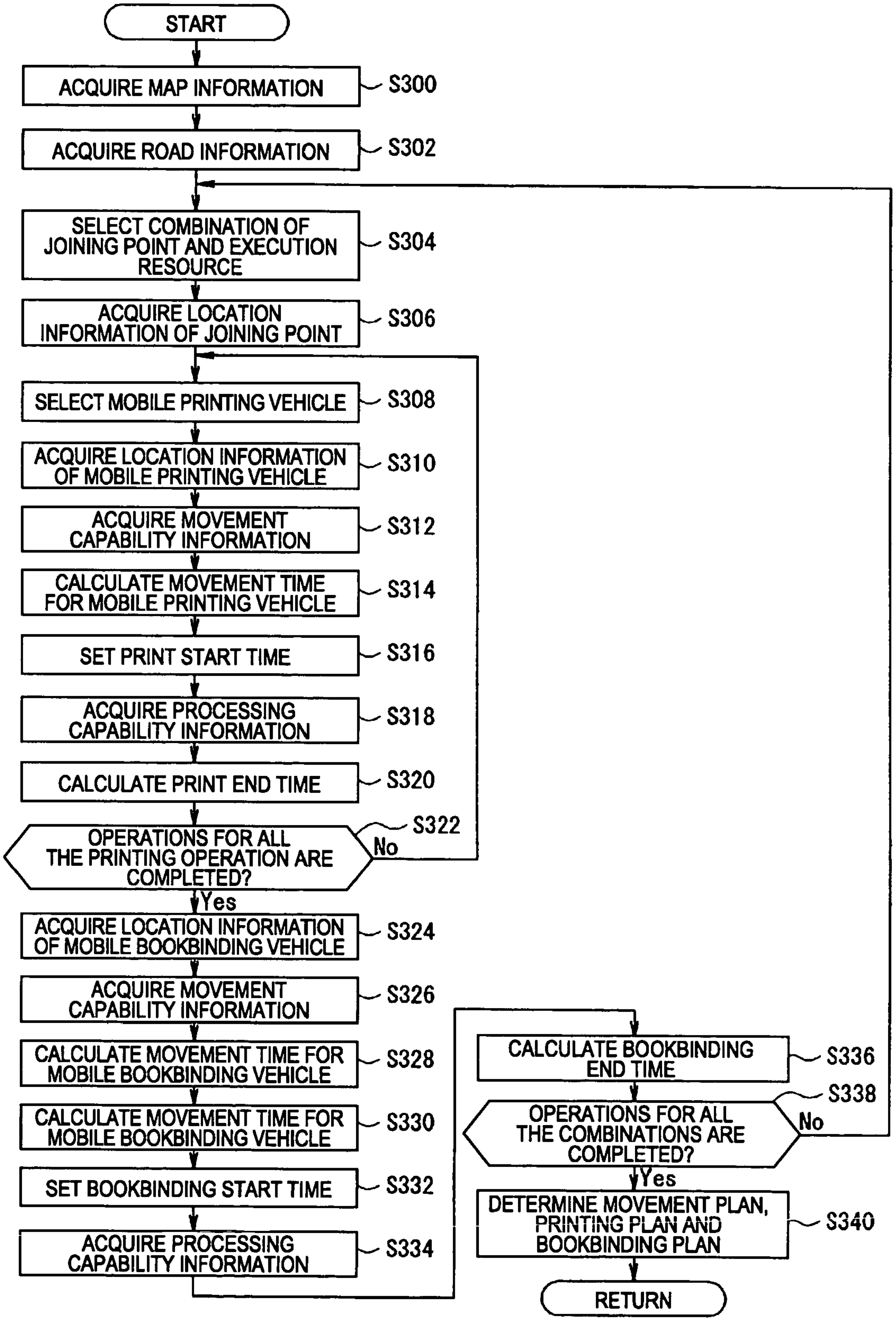
FIG. 13 is a flowchart showing a plan determining operation in step S104.

The CPU 80 performs a plan determining operation shown in the flowchart of FIG. 13 in place of the plan determining operation shown in FIG. 7.

FIG. 13 is a flowchart showing the plan determination operation in step S104.

First, the plan determining operation, when executed in step S104, advances to step S300, as shown in FIG. 13.

Then, the same operations as steps S200 and S202 are performed in steps S300 and S302, and an operation of step S304 is performed.

In step S304, a combination of the joining points and the execution resources to which the printing operation or the bookbinding operation is allocated is selected from the target execution resources and a plurality of joining points, and then in step S306, location information of the joining point relating to the selected combination (hereinafter will be referred to as a selected joining point) is acquired by the joining point location information table. Then, an operation of step S308 is performed.

Then, the same operations as steps S208 to S212 are performed in steps S308 to S312, and an operation of step S314 is performed.

In S314, the distribution route distance from the location of the selected mobile printing vehicle 200 to the selected joining point is calculated on the basis of the map information and the location information acquired in steps S300, S306 and S310. Moreover, in step S314, the movement time required for the selected mobile printing vehicle 204 to move to the selected joining point is calculated on the basis of the calculated distribution route distance and the movement capability information acquired in step S312. In addition, in step S314, the calculated movement time is corrected on the basis of the road information acquired in step S302.

Then, the same operations as steps S216 to S222 are performed in steps S316 to S322, the same operations as steps S206 and S224 are performed in steps S324 and S326, and an operation of step S328 is performed.

In step S328, the distribution route distance from the location of the selected mobile bookbinding vehicle 210 to the selected joining point is calculated on the basis of the map information and the location information acquired in steps S300, S306 and S324. Moreover, in step S328, the movement time required for the selected mobile bookbinding vehicle 210 to move to the selected joining point is calculated on the basis of the calculated distribution route distance and the movement capability information acquired in step S312. In addition, in step S328, the calculated movement time is corrected on the basis of the road information acquired in step S302.

Then, in step S330, the distribution route distance from the selected joining point to the delivery destination is calculated on the basis of the print job, the map information and the location information acquired in steps S100, S300 and S306. Moreover, in step S330, the movement time required for the selected mobile bookbinding vehicle 210 to move from the selected joining point to the delivery destination is calculated on the basis of the calculated distribution route distance and the movement capability information acquired in step S326. In addition, in step S330, the calculated movement time is corrected on the basis of the road information acquired in step S302.

Then, the same operations as steps S228 to S232 are performed in steps S332, to S336, and an operation of step S338 is performed. In step S338, it is determined whether the operations in steps S304 to S336 are completed with respect to all the combinations of a plurality of joining points and the execution resources to which the printing operation or the bookbinding operation is allocated. When it is determined in step S338 that the operations are completed with respect to all the combinations (i.e., Yes in step S338), an operation of step S340 is performed.

In step S340, the combination of the joining points and the execution resources capable of completing the printing operation and the bookbinding operation before the product delivery deadline is determined on the basis of the calculation results in steps S314, S320, S328, S330 and S336 and the print job acquired in step S100, a movement plan, a print plan, and a bookbinding plan are determined with respect to the determined combination of the joining points and the execution resources, and a series of operations are completed and return to an original operation.

On the other hand, when it is determined in step S338 that the operations are not completed with respect to all the combinations (i.e., No in step S338), an operation of step S304 is performed.

Hereinafter, the operation of the present embodiment will be described.

Figures 14, 15:
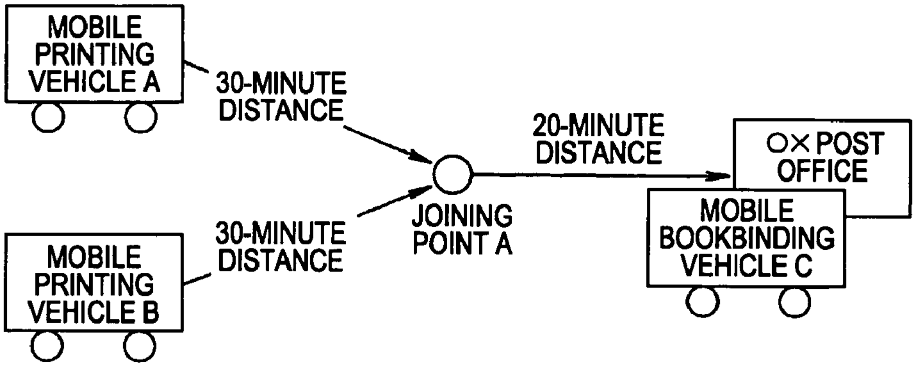
FIG. 14 is a diagram showing present locations of the execution resources.
FIG. 15 is a diagram showing a calculation result of a print end time and a bookbinding end time with respect to each of the combinations for the allocation of the printing operation and the bookbinding operation.

FIG. 14 is a diagram showing present locations of the execution resources.

As shown in FIG. 14, it is assumed that the joining point A is set at a 20-minute distance from the delivery destination, the mobile printing vehicles A and B are located at a 30-minute distance from the joining point A, and the mobile bookbinding vehicle C is located at the delivery destination.

The management server 100 has acquired the print job through step S100. In the present embodiment, it is assumed that the print job of FIG. 4 is acquired. In addition, the execution resource capable of performing the printing operation and the bookbinding operation is retrieved through step S102.

The analysis of the print job of FIG. 4 shows that the print job requires two printing operations and one bookbinding operation. As shown in FIG. 9, two mobile printing vehicles A and B and single mobile bookbinding vehicle C are obtained as a retrieval result of the execution resource capable of performing the printing operations and the bookbinding operation.

Then, through steps S300 to S338, the movement time, the print end time and the bookbinding end time are calculated with respect to all the combinations of a plurality of joining points and the execution resources among the target execution resources to which the printing operation or the bookbinding operation is allocated. In the present embodiment, the joining point A and the delivery destination are selected as candidates for the joining point.

FIG. 15 is a diagram showing a calculation result of a print end time and a bookbinding end time with respect to each of the combinations for the allocation of the printing operation and the bookbinding operation.

In the example of FIG. 15, the print start time and the bookbinding start time are set and the print end time and the bookbinding end time are calculated with respect to each of the cases: a case where the printing operation 1 is allocated to the mobile printing vehicle A, the printing operation 2 is allocated to the mobile printing vehicle B, the bookbinding operation is allocated to the mobile bookbinding vehicle C, and the joining point A is selected as the joining point, and a case where the printing operation 1 is allocated to the mobile printing vehicle A, the printing operation 2 is allocated to the mobile printing vehicle B, the bookbinding operation is allocated to the mobile bookbinding vehicle C, and the delivery destination is selected as the joining point.

Then, through step S340, the combination of the joining points and the execution resources capable of completing the printing operation and the bookbinding operation before the product delivery deadline is determined among each of the combinations of the execution resources, and the movement plan, the print plan and the bookbinding plan are determined with respect to the determined combination of the joining points and the execution resources.

Analysis of the print job of FIG. 4 shows that the product delivery deadline is 2005-12-20 12:00. Referring to FIG. 15, since the candidate in the first row can completes the printing operation and the bookbinding operation before the delivery deadline, the candidate in the first row is determined as the combination of the joining points and the execution resources.

Then, the contents are acquired through steps S106 and S108 from the contents server and print data is produced on the basis of the acquired contents. In addition, through steps S110 to S120, the movement plan information, the print plan information and the bookbinding plan information are produced and sent to the execution resources together with the print data.

In the mobile printing vehicles A and B, when the movement plan information is received at the movement plan information receiving unit 60, the movement guiding unit 62 performs a movement guiding operation on the basis of the received movement plan information. Then, operators drive the mobile printing vehicles A and B to the joining point A in accordance with the movement guiding operation. When the print plan information and the print data are received at the print plan information receiving unit 64, the printing control unit 68 controls the printing device 66 to perform the printing operations 1 and 2 on the basis of the received print plan information and the received print data. The printing operations 1 and 2 are performed during the movement of the mobile printing vehicles A and B.

In the mobile bookbinding vehicle C, when the movement plan information is received at the movement plan information receiving unit 70, the movement guiding unit 72 performs a movement guiding operation on the basis of the received movement plan information. Then, an operator drives the mobile bookbinding vehicle C to the joining point A in accordance with the movement guiding operation. When receiving results of the printing operation in the mobile printing vehicles A and B at the joining point A, the operator further drives the mobile bookbinding vehicle C from the joining point A to the delivery destination in accordance with the movement guiding operation. When the bookbinding plan information is received at the bookbinding plan information receiving unit 74, the bookbinding control unit 78 controls the bookbinding device 76 to perform the bookbinding operation on the basis of the received bookbinding plan information. The bookbinding operation is performed during the movement of the mobile bookbinding vehicle C.

In the present embodiment, the movement time required for the mobile printing vehicle 200 to move to the joining point is calculated, the print processing time required for the mobile printing vehicle 200 to complete the printing operation is calculated, the movement time required for the mobile bookbinding vehicle 210 to move to the joining point is calculated, the movement time required for the mobile bookbinding vehicle 210 to move from the joining point to the delivery destination is calculated, the bookbinding processing time required for the mobile bookbinding vehicle 210 to complete the bookbinding operation is calculated, the calculation results of the movement time, the print processing time and the bookbinding processing time are acquired with respect to all the combination of a plurality of joining points and the execution resources to which the printing operation or the bookbinding operation is allocated, the combination of the joining points and the execution resources capable of completing the printing operation and the bookbinding operation before the delivery deadline is determined on the basis of the acquired calculation result and the acquired print job, and the movement plan, the print plan and the bookbinding plan are determined with respect to the determined combination of the joining points and the execution resources.

Therefore, since it is possible to more delicately make the movement plan, the print plan and the bookbinding plan, it is possible to further efficiently perform the printing operation and the bookbinding operation.

In the second embodiment, the print, job corresponds to the delivery instruction information in Forms 1 to 4, Forms 6 to 10, Forms 12 to 16 or Aspect 18, the mobile printing vehicle 200 and the mobile bookbinding vehicle 210 correspond to the mobile object in Aspect 1, 7 or 13, the mobile printing vehicle 200 corresponds to the first mobile object in Forms 2 to 4, Aspect 6, Forms 8 to 10, Aspect 12, Forms 14 to 16 or Aspect 18, and the mobile bookbinding vehicle 210 corresponds to the second mobile object in Forms 2 to 4, Aspect 6, Forms 8 to 10, Aspect 12, Forms 14 to 16 or Aspect 18. The print job acquisition unit 22 and step S100 correspond to the delivery instruction information acquisition unit in Aspect 1 or 2, and step S100 corresponds to the delivery instruction information acquisition step in Aspect 7, 8, 13 or 14.

In addition, in the second embodiment, the units 26 to 48 and step S104 correspond to the management unit in Forms 1 to 4 or Aspect 6, step S104 corresponds to the management step in Forms 7 to 10, Forms 12 to 16 or Aspect 18, the processing capability information acquisition unit 26 and steps S318 and S334 correspond to the processing capability information acquisition unit in Aspect 3. In addition, steps S318 and S334 correspond to the processing capability information acquisition step in Aspect 9 or 15, the location information acquisition unit 28 and steps S310 and S324 correspond to the location information acquisition unit in Aspect 3, and steps S310 and S324 correspond to the location information acquisition step in Aspect 9 or 15.

In addition, in the second embodiment, the map information acquisition unit 32 and step S300 correspond to the map information acquisition unit in Aspect 4, step S300 corresponds to the map information acquisition step in Aspect 10 or 16, and the print processing time calculating unit 36 and step S320 correspond to the first operation processing time calculating unit in Aspect 6. In addition, step S320 corresponds to the first operation processing time calculating step in Aspect 12 or 18, the bookbinding processing time calculating unit 38 and step S336 correspond to the second operation processing time calculating unit in Aspect 6, and step S336 corresponds to the second operation processing time calculating step in Aspect 12 or 18.

In addition, in the second embodiment, the movement time calculating unit 40 and step S314 correspond to the first movement time calculating unit in Aspect 6, step S314 corresponds to the first movement time calculating step in Aspect 12 or 18, the movement time calculating unit 42 and step S328 correspond to the second movement time calculating unit in Aspect 6, step S328 corresponds to the second movement time calculating step in Aspect 12 or 18, the movement time calculating unit 44 and step S330 correspond to the third movement time calculating unit in Aspect 6, and step S330 corresponds to the third movement time calculating step in Aspect 12 or 18.

In addition, in the second embodiment, the calculation result acquisition unit 46 and steps S304 and S338 correspond to the calculation result acquisition unit in Aspect 6, and steps S304 and S338 correspond to the calculation result acquisition step in Aspect 12 or 18. The plan determining unit 48 and step S340 correspond to the plan determining unit in Aspect 6, and step S340 corresponds to the plan determining step in Aspect 12 or 18.

Although in the first and second embodiments, the descriptions have been made to the case where there is only single bookbinding operation, the invention is not limited to this case. However, when there is a plurality of bookbinding operations, the plurality of bookbinding operations may be iteratively performed in the plan determining operation in FIGS. 7 and 13 similar to the case of the printing operation. Specifically, the operations corresponding to steps S208 and S222 in the first embodiment or the operations corresponding to steps S308 and S322 in the second embodiment may be included in order to perform the plurality of bookbinding operations.

In addition, although the executable information is previously stored in the storage device 92 in the first and second embodiments, the invention is not limited to this case. However, the executable information may be acquired by the execution resources according to need. Similarly, the location information, the processing capability information and the movement capability information may be acquired by the execution resources according to need.

In addition, although the movement times of the execution resources are calculated in the first and second embodiments, the invention is not limited to this case. However, the movement time from one place to another place may be included in the map information and the movement time may be acquired by the map information on the basis of the location information.

In addition, although the print end time and the bookbinding end time are calculated with respect to all the combinations of the execution resources to which the printing operation or the bookbinding operation is allocated at the first and second embodiments, the invention is not limited to this case. However, when two different operations are successively performed by a same execution resource, switching time between the two operations may be predicted. Moreover, when a semi-finished product has to be received during the operations, the time for receiving the semi-finished product may be predicted.

In addition, although the first and second embodiments have been described to the case where the order receiving date is same as the contents delivery deadline, the invention is not limited to this case. However, when the order receiving date is earlier than the contents delivery deadline, the execution resources may be disposed in advance so that the execution resources are placed at an optimal place at the time of the contents delivery deadline. In this case, the optimal place means a place where a combination capable of providing a quickest delivery can be obtained.

In addition, although the printing operation and the bookbinding operation were performed in the first and second embodiments, the invention is not limited to this case. However, when there is a plurality of operations related to printing or post-printing operations, the plurality of operations may be performed in arbitrary order, separation and combination thereof. Examples of the operations related to the printing or post-printing operation include printing, overprinting, foil stamping, varnishing, laminating, folding, binding, sheet gathering, trimming and case sealing.

More specifically, in the case of producing a direct mail, an operation of printing backgrounds in color is first performed using a printer capable of color printing, an overprinting operation such as a variable printing (recipient of the direct mail or individual contents of an invoice) is performed using a digital monochrome printer, a folding operation is performed to put in an envelope, a case sealing operation is performed using a case sealing machine. As a result of the series of operations, a preprinted and pre-sealed direct mail is produced. As another example, in the case of producing a book having a mixture of color pages and black/white pages, an operation of printing color pages is performed using a color printer, an operation of printing black/white pages is performed using a monochrome printer, a sheet gathering operation of gathering printed pages in the order of a page number is performed, a binding operation of binding gathered pages is performed, whereby a book is produced.

In addition, although the execution resources are configured as cars in the first and second embodiments, the invention is not limited to this case. However, the invention may be applied to the case where the printing device 66 or the bookbinding device 76 is configured as a movable cradle so as to move along a rail laid down in a printing plant so that the printing device 66 and the bookbinding device 76 can be disposed at an optimal place in accordance with the print job.

In addition, although the print data is produced by the management server 100 in the first and second embodiment, the invention is not limited to this case. However, the print data may be produced by the printing control unit 68.

In addition, although the first and second embodiments were described to the case where the operations shown in the flowcharts of FIGS. 6, 7 and 13 are performed in accordance with the control program stored in the ROM 82 in advance, the invention is not limited to this case. However, a program showing these procedures may be read into the RAM 84 from a storage medium storing the program therein and may be also executed.

In the invention, examples of the storage medium include a semiconductor storage medium, such as RAM and ROM, a magnetic storage medium such as FD and HD, an optically-read storage medium such as CD, CDV, LD and DVD, or a magnetic/optically-read storage medium such as MO. Regardless of the reading method such as electronic, magnetic, or optical reading, the storage medium includes any type of storage medium as long as it is a computer-readable storage medium.

In addition, although in the first and second embodiments, the mobile print planning system, the mobile print planning program and the mobile print planning method in accordance with the invention were applied to the case where the printing operation and the bookbinding operation are performed by a plurality of execution resources while moving cooperative with each other, the invention is not limited to this case. However, the invention may also be applied to the case where only the printing operation is performed by a plurality of mobile printing vehicles 200 while moving cooperative with each other or only the bookbinding operation is performed by a plurality of mobile bookbinding vehicles 210 while moving cooperative with each other.

Hereinafter, a third embodiment of the invention will be described with reference to drawings. FIGS. 16 to 24 show a mobile print planning system, a mobile print planning program and a mobile print planning method in accordance with the third embodiment of the invention.

First, an outline of the present embodiment will be described with reference to FIG. 16.

Figure 16:
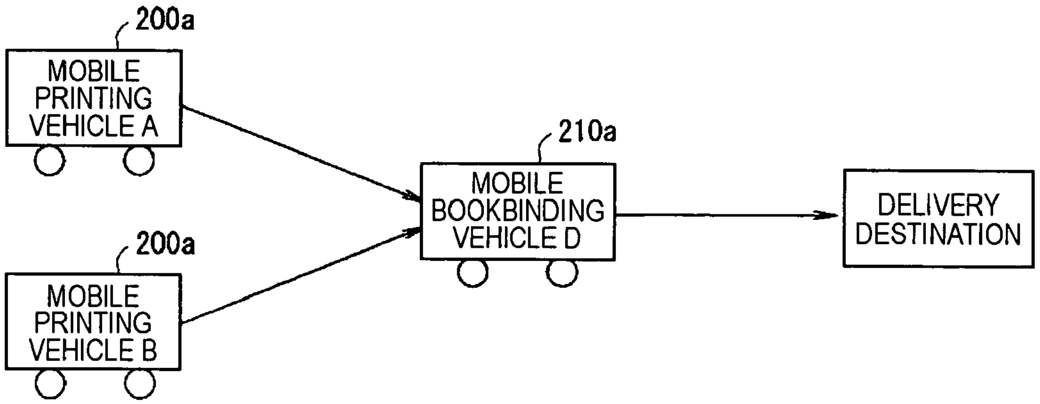
FIG. 16 is a diagram for explaining an outline of a third embodiment of the invention.

The present embodiment provides a mobile printing service by the use of a mobile printing vehicle 200*a* having a printing device thereon and a mobile bookbinding vehicle 210*a* having a bookbinding device thereon, as shown in FIG. 16. In the mobile printing service, a plurality of mobile printing vehicles 200*a* performs printing operations during movement, and results of the printing operations in the mobile printing vehicles 200*a* are sent to the mobile bookbinding vehicle 210*a*. Then, the mobile bookbinding vehicle 210*a* performs a bookbinding operation during movement, and result of the bookbinding operation in the mobile bookbinding vehicle 210*a* is delivered to a predetermined delivery destination. In the present embodiment, a location of the mobile bookbinding vehicle 210*a* is considered as a joining point.

Then, an outline of functions of a network system to which the invention is applied will be described with reference to FIG. 17 which is a schematic block diagram showing functions of the network system.

Figure 17:
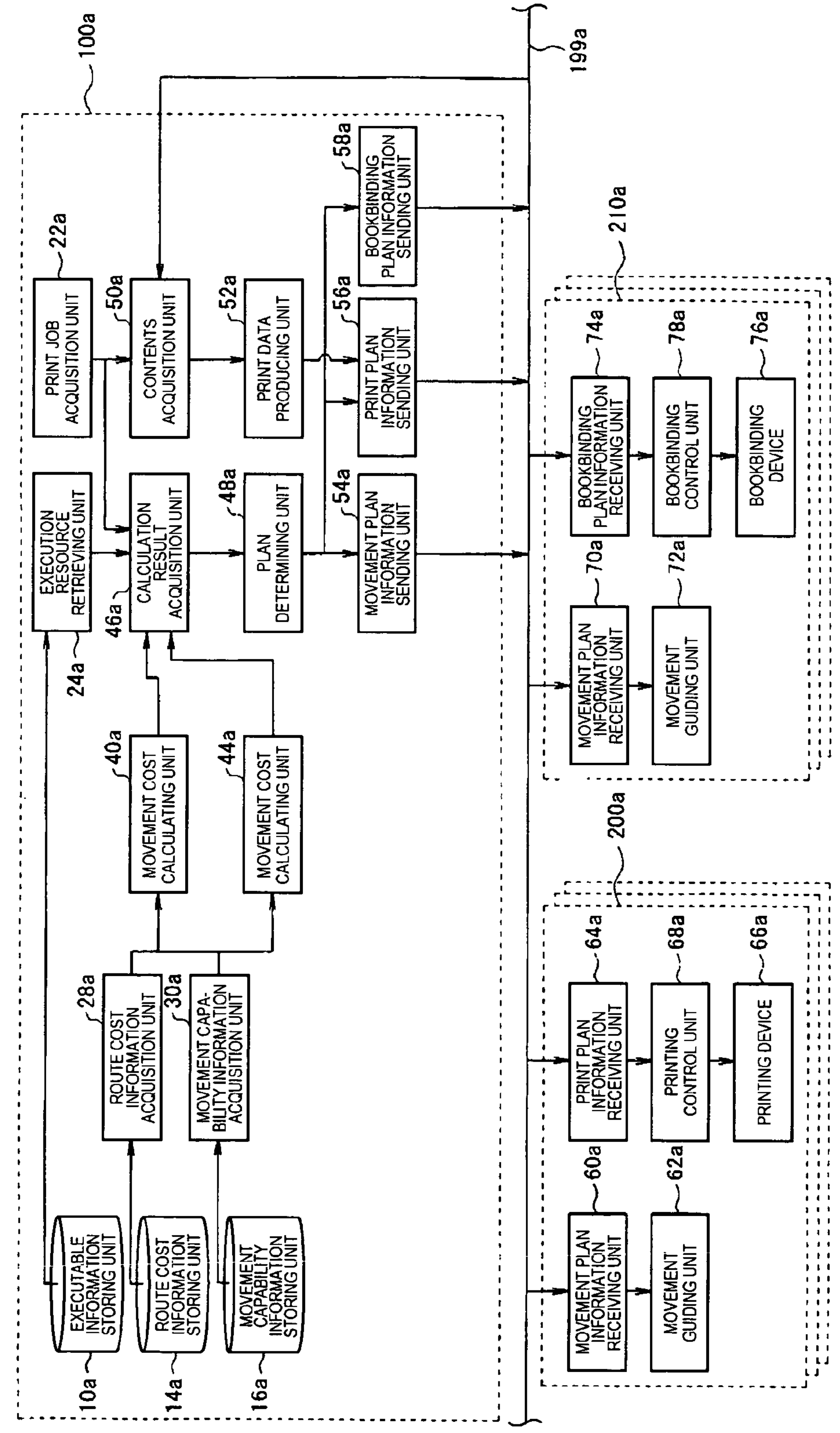
FIG. 17 is a schematic block diagram showing functions of a network system.

As shown in FIG. 17, the network 199*a* is connected to the mobile printing vehicles 200*a*, the mobile bookbinding vehicles 210*a*, a management server 100*a* managing the mobile printing vehicles 200*a* and the mobile bookbinding vehicles 210*a* (hereinafter, both vehicles 200*a* and 210*a* will be collectively referred to as an execution resource unless those vehicles are explicitly differentiated to each other), and a plurality of contents servers (not shown).

The management server 100*a* includes an executable information storing unit 10*a* storing executable information representing whether the execution resource can perform the printing operation or the bookbinding operation, a route cost information storing unit 14*a* storing route cost information representing the route cost, and a movement capability information storing unit 16*a* storing movement capability information representing the movement capability of the execution resource.

The management server 100*a* further includes a print job acquisition unit 22*a* acquiring a print job including a specification of the printing and bookbinding, location of the delivery destination, deadline of the delivery, and address of contents acquisition site, and an execution resource retrieving unit 24*a* retrieving for the execution resource capable of performing the printing operation and the bookbinding operation.

The execution resource retrieving unit 24*a* analyzes the print job (including a specification of the printing and bookbinding) acquired by the print job acquisition unit 22*a*, determines the required printing operation and the required bookbinding operation, and retrieves execution resource capable of performing the determined printing operation and the determined bookbinding operation on the basis of the executable information of the executable information storing unit 10*a*.

The management server 100*a* further includes a route cost information acquisition unit 28*a* acquiring, from the route cost information storing unit 14*a*, the route cost information representing a route cost required for movement along the distribution route from the location of the mobile printing vehicle 200*a* to a joining point and a route cost required for movement along the distribution route from the join point to the delivery destination, and a movement capability information acquisition unit 30*a* acquiring, from the movement capability information storing unit 16*a*, the movement capability information of the execution resource (hereinafter will be referred to as a target execution resource) retrieved by the execution resource retrieving unit 24*a*.

The management server 100*a* further includes a movement cost calculating unit 40*a* calculating a movement cost required for the mobile printing vehicle 200*a*, one of the target execution resources, to move to the joining point on the basis of the route cost information and the movement capability information acquired by the route cost information acquisition unit 28*a* and the movement capability information acquisition unit 30*a*, and a movement cost calculating unit 44*a* calculating a movement cost required for the mobile bookbinding vehicle 210*a*, one of the target execution resources, to move from the joining point to the delivery destination on the basis of the route cost information and the movement capability information acquired by the route cost information acquisition unit 28*a* and the movement capability information acquisition unit 30*a*.

The management server 100*a* further includes a calculation result acquisition unit 46*a* acquiring calculation results with respect to all the combinations of the execution resources among the target execution resources to which the printing operation or the bookbinding operation is allocated, from the movement cost calculating units 40*a* and 44, and a plan determining unit 48*a* determining the combination of the execution resources capable of producing a minimum sum of the movement cost, on the basis of the calculation result acquired by the calculation result acquisition unit 46*a* and making a movement plan, a print plan and a bookbinding plan with respect to the determined combination of the execution resources.

The management server 100*a* further includes a contents acquisition unit 50*a* acquiring contents from the contents server on the basis of the address of the contents acquisition site included in the print job acquired by the print job acquisition unit 22*a*, and a print data producing unit 52*a* producing print data on the basis of the contents acquired by the contents acquisition unit 50*a*.

The management server 100*a* further includes a movement plan information sending unit 54*a* sending movement plan information representing the movement plan determined by the plan determining unit 48*a* to the execution resource to which the printing operation or the bookbinding operation is allocated, a print plan information sending unit 56*a* sending print plan information representing the print plan determined by the plan determining unit 48*a* and print data produced by the print data producing unit 52*a* to the mobile printing vehicle 200*a* to which the printing operation is allocated, and a bookbinding plan information sending unit 58*a* sending bookbinding plan information representing the bookbinding plan determined by the plan determining unit 48*a* to the mobile bookbinding vehicle 210*a* to which the bookbinding operation is allocated.

Then, an outline of functions of the mobile printing vehicle 200*a* will be described.

The mobile printing vehicle 200*a* is a one-box-type or trailer-type car, for example. Although not depicted in drawing, the mobile printing vehicle 200*a* has a moving mechanism including a main vehicle body, a plurality of axles rotatably mounted under the main vehicle body, a plurality of wheels mounted on both ends of the axles, an engine, and a power transmission mechanism transmitting power from the engine to the axles. The mobile printing vehicle 200*a* may be a container towed by another car.

As shown in FIG. 17, a movement plan information receiving unit 60*a* receiving the movement plan information, a movement guiding unit 62*a*, such as a car navigation system, guiding the movement on the basis of the movement plan information received from the movement plan information receiving unit 60*a*, a print plan information receiving unit 64*a* receiving the print plan information and the print data, a printing device 66*a*, a printing control unit 68*a* controlling the printing device 66*a* on the basis of the print plan information and the print data received from the print plan information receiving unit 64*a* are mounted on the main vehicle body. Besides, a sheet tray containing print sheets, a discharge tray containing printed sheets and an ink container containing ink used in printing are mounted on the main vehicle body. In addition, in the main vehicle body, a space for an operator to perform the printing operation is reserved within the internal space of the mobile printing vehicle 200*a*.

It is desirable that the mobile printing vehicle 200*a* is equipped with an electric power generating unit or a battery so as to attract power from internal sources of the mobile printing vehicle 200*a*. However, the mobile printing vehicle 200*a* may attract power from external sources by plugging into a socket such as on other buildings during stopovers. In addition, if the printing device 66*a* is a printer that requires water for an offset printing, for example, equipments for supplying water may be incorporated in the mobile printing vehicle 200*a*, or piping equipments for connection with external water lines may be installed in the mobile printing vehicle 200*a*.

The mobile printing vehicle 200*a* is constructed in such a manner that a door is provided in the vicinity of the discharge tray of the printing device 66*a* so as to easily pick out the printed matter as the printing result from the mobile printing vehicle 200*a*. In other words, it is desirable to dispose the door to face the discharge tray of the printing device 66*a* so as to facilitate an access from outside.

Then, an outline of functions of the moving bookbinding vehicle 210*a* will be described.

The moving bookbinding vehicle 210*a* has the same moving mechanism as the mobile printing vehicle 200*a*.

As shown in FIG. 17, a movement plan information receiving unit 70*a* receiving the movement plan information, a movement guiding unit 72*a*, such as a car navigation system, guiding the movement on the basis of the movement plan information received from the movement plan information receiving unit 70*a*, a bookbinding plan information receiving unit 74*a* receiving the bookbinding plan information, a bookbinding device 76*a*, a bookbinding control unit 78*a* controlling the bookbinding device 76*a* on the basis of the bookbinding plan information received from the bookbinding plan information receiving unit 74*a* are mounted on the main vehicle body. In addition, in the main vehicle body, a space for an operator to perform the bookbinding operation is reserved within the internal space of the mobile bookbinding vehicle 210*a*.

Examples of a general bookbinding machine includes a folding machine, a saddle-stitch binding machine, an unsewn binding machine, a case binding machine, a trimming machine, and a case sealing machine, but the bookbinding device 76*a* of the present embodiment may include all types of such machines.

It is desirable that the mobile bookbinding vehicle 210*a* is equipped with an electric power generating unit or a battery so as to attract power from internal sources of the mobile bookbinding vehicle 210*a*. However, the mobile bookbinding vehicle 210*a* may attract power from external sources by plugging into a socket such as on other buildings during stopovers.

The mobile bookbinding vehicle 210*a* is constructed in such a manner that a door is provided in the vicinity of the discharge tray of the bookbinding device 76*a* so as to easily pick out the bookbinded product as the bookbinding result from the mobile bookbinding vehicle 210*a*. In other words, it is desirable to dispose the door to face the discharge tray of the bookbinding device 76*a* so as to facilitate an access from outside.

Then, the structure of the management server 100*a* will be described with reference to FIG. 18 which shows a hardware structure of the management server 100*a*.

Figure 18:
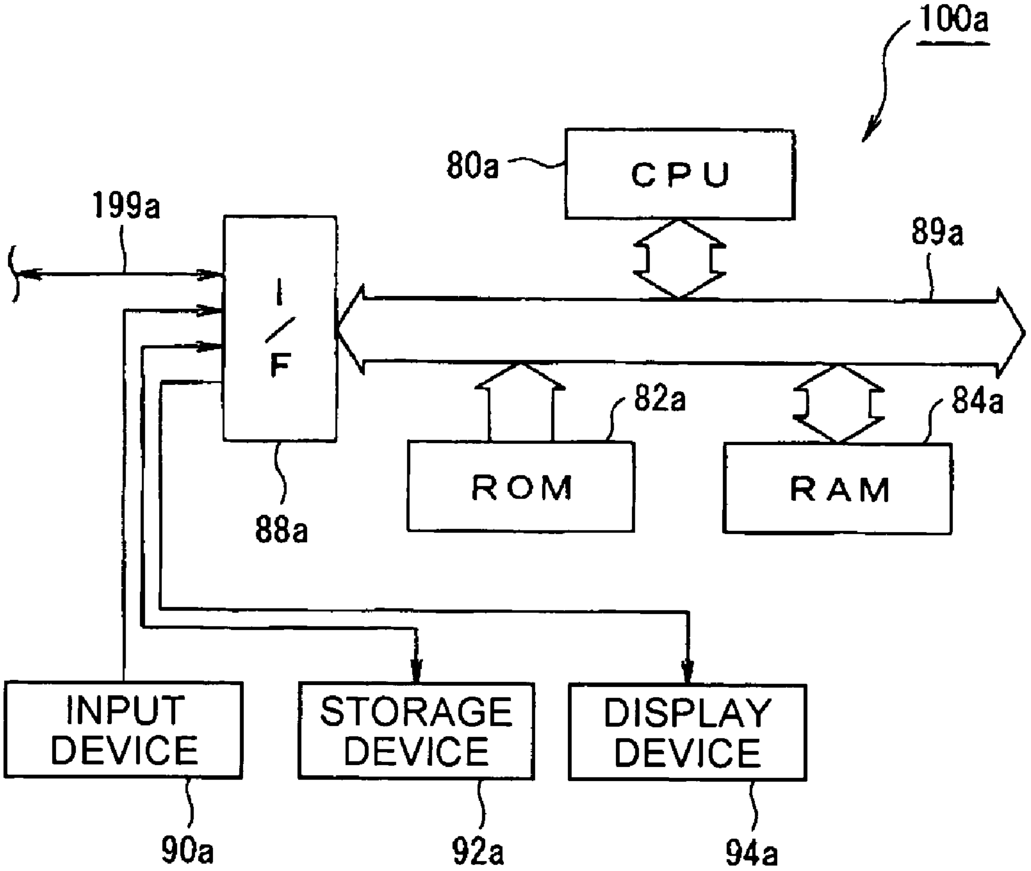
FIG. 18 is a diagram showing a hardware structure of a management server 100*a*.

As shown in FIG. 18, the management server 100*a* has a CPU 80*a* performing computation on the basis of a control program and controlling the entire system, an ROM 82*a* storing the control program and the like of the CPU 80*a* in a predetermined region, an RAM 84*a* for storing data read from the ROM 82*a* and the like and computation results required in the process of the computation in the CPU 80*a*, and an I/F 88*a* interfacing input and output of data with external devices, which are connected to a bus 89*a* as a signal line for data transmission so as to exchange data to each other.

The I/F 88*a* is connected to an input device 90*a*, as an external device, including a keyboard or a mouse, as a human interface, for inputting data, a storage device 92*a* storing data or tables as a file, a display device 94*a* displaying a screen on the basis of an image signal, and signal lines for connection to the network 199*a*.

Then, a data structure of the print job will be described with reference to FIG. 19.

As shown in FIG. 19, the print job is expressed in a manner that tag sets such as a starting tag and an ending tag are inserted between a prescribed starting tag 500*a* and a prescribed ending tag 502*a*, whereby the delivery specification, the printing operation and the bookbinding operation are set.

Tag sets 504*a* for setting the delivery specification are described between the starting tag 500*a* and the ending tag 502*a*.

In the tag sets 504*a*, an order receiving date, a contents delivery deadline as the delivery deadline of the contents, a product delivery deadline as the delivery deadline of the product, location of the delivery destination, and the amount of the product are described by corresponding tag sets.

Tag sets 506*a* and 508*a* for setting the printing operation and tag sets 510*a* for setting the bookbinding operation are also described between the starting tag 500*a* and the ending tag 502*a*.

In the tag sets 506*a* and 508*a*, details of the printing operation, a sheet size, a sheet type, a finishing size, an address of the contents acquisition site, and an output destination of the printed matter are described by corresponding tag sets.

In the tag sets 510*a*, details of the bookbinding operation, an envelope size corresponding to the sheet size, an envelope destination corresponding to output destination of the printed matter, a content size corresponding to the sheet size, a content destination corresponding to output destination of the printed matter, and an output destination of the bookbinded product are described by corresponding tag sets.

In the example of FIG. 19, it is defined as a printing operation 1 to acquire contents from a contents server specified by a URL, "http://some.server/content.pdf" and perform printing on a thick glossy A6 size sheet in addition, it is defined as a printing operation 2 to acquire CSV (comma separated value) format contents from a contents server specified by a URL, "http://some.server/addressing.csv" and perform variable printing on an A6 size sheet. In addition, it is defined in the printing operation 1 and the printing operation 2 that the contents are prepared on the contents server from 2005-12-20 10:00. In addition, it is described as a binding operation to seal the content printed in the printing operation 1 in the envelope printed in the printing operation 2 and deliver the resulting product in an amount of 400 sets to an OX post office before 2005-12-20 12:00.

Although two printing operations and one bookbinding operation were set in the example of FIG. 19, the number of the printing operation and the bookbinding operation is not limited to this and an arbitrary number of the printing operation and the bookbinding operation may be set in the print job.

Then, the data structure of the storage device 92*a* will be described.

The storage device 92*a* constitutes the executable information storing unit 10*a*, and an executable information table (not shown) in which executable information is registered for each of the execution resources is stored in the storage device 92*a*.

The storage device 92*a* further constitutes the route cost information storing unit 14*a*, and the route cost information representing a route cost required for movement along the distribution route from the location of the mobile printing vehicle 200*a* to a joining point and a route cost required for movement along the distribution route from the join point to the delivery destination is stored in the storage device 92*a*. The route cost information is a numeric value (hereinafter will be referred to as a route cost constant) calculated on the basis of a distribution route distance, a congestion condition, a slope and the like, wherein a greater route cost constant means a higher the route cost. In the invention, the distribution route distance from the location of the mobile printing vehicle 200*a* to the joining point can be calculated on the basis of the location information of the mobile printing vehicle 200*a*, the location information of the joining point and the map information. Moreover, the distribution route distance from the joining point to the delivery destination can be calculated on the basis of the location information of the joining point, the print job (the location of the delivery destination) and the map information. In addition, the slope and the congestion condition can be calculated on the basis of the map information and the road information, respectively. The road information may be acquired, for example, from a VICS (Vehicle Information and Communication System) center.

In addition, the storage device 92*a* constitutes the movement capability information storing unit 16*a*, and the movement capability information for each of the execution resources is stored in the storage device 92*a*. The movement capability information is a numeric value (hereinafter will be referred to as a movement capability constant) calculated on the basis of a fuel cost, a maintenance cost, depreciation cost and the like for the execution resources, wherein a smaller movement capability constant means an excellent movement capability.

Then, operations performed in the CPU 80*a* will be described.

Figure 20:
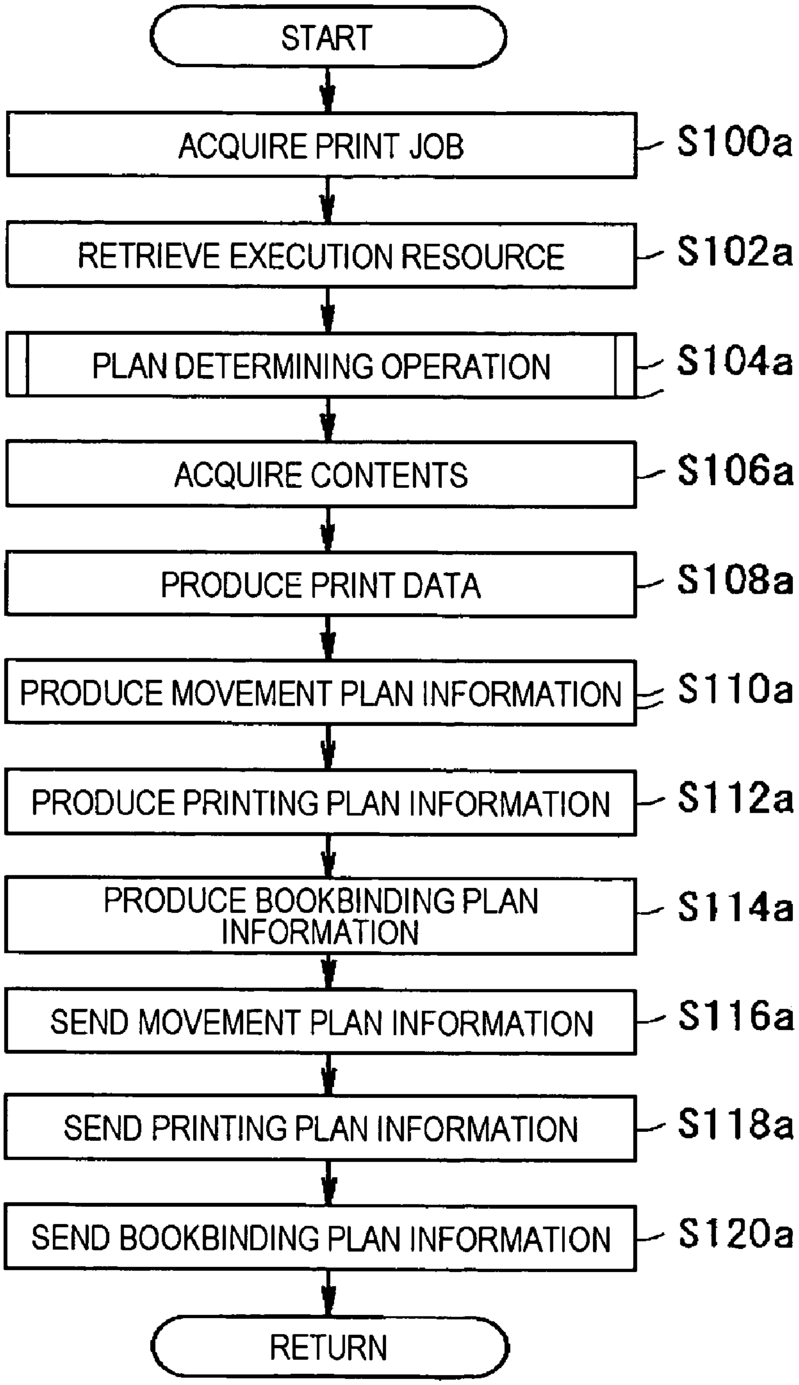
FIG. 20 is a flowchart showing an operation of providing a mobile printing service.

The CPU 80*a* is constituted by a micro-processing unit and the like, and activates a predetermined program stored in a prescribed region of the ROM 82*a*, thereby performing an operation of providing a mobile printing service shown in the flowchart of FIG. 20 in accordance with the program.

FIG. 20 is a flowchart showing an operation of providing the mobile printing service.

The operation of providing the mobile printing service, when executed by the CPU 80*a*, advances to step S100*a*, as shown in FIG. 20.

A print job is acquired in step S100*a*, and then in step S102*a*, the acquired print job is analyzed and the printing operation and the bookbinding operation required are determined so as to retrieve the execution resource capable of performing the determined printing operation and the determined bookbinding operation on the basis of the executable information table. Then, an operation of step S104*a* is performed.

In step S104*a*, a plan determining operation in which a movement plan, a print plan and a bookbinding plan are determined with respect to the combination of the execution resources to which the printing operation or the bookbinding operation is allocated among the retrieved target execution resources. Then, an operation of step S106*a* is performed.

In step S106*a*, contents are acquired by the contents server on the basis of the address of the acquisition site included in the acquired print job, and then in step S108*a*, print data is produced on the basis of the acquired contents. Then, an operation of step S110*a* is performed.

In step S110*a*, movement plan information representing the movement plan determined in the plan determining operation in step S104*a* is produced. For example, the movement plan information includes guide information for guiding the execution resource along the distribution route to joining points or the delivery destination and schedule information representing a departure time and an arrival time. In the invention, the movement plan information may be produced for a plurality of execution resources, or may be produced for each of the execution resources.

Then, in step S112*a*, print plan information representing the print plan determined in the plan determining operation in step S104*a* is produced. For example, the print plan information includes setting information described by tag sets 506*a* and 508*a* of the print job and schedule information representing a print start time and a print end time. The print plan information may be produced for a plurality of mobile printing vehicles 200*a*, or may be produced for each of the mobile printing vehicles 200*a*.

Then, in step S114*a*, bookbinding plan information representing the bookbinding plan determined in the plan determining operation in step S104*a* is produced. For example, the bookbinding plan information includes setting information described by tag sets 510*a* of the print job and schedule information representing a bookbinding start time and a bookbinding end time. The bookbinding plan information may be produced for a plurality of mobile bookbinding vehicles 210*a*, or may be produced for each of the mobile bookbinding vehicles 210*a*.

Then, in step S116*a*, the produced movement plan information is sent to the execution resource to which the printing operation or the bookbinding operation is allocated, and then in step S118*a*, the print plan information and the print data produced are sent to the mobile printing vehicle 200*a* to which the printing operation is allocated. Then, in step S120*a*, the produced bookbinding plan information is sent to the mobile bookbinding vehicle 210*a* to which the bookbinding operation is allocated, and a series of operations are completed and return to an original operation.

Then, the plan determination operation performed in step S104*a* will be described with reference to FIG. 21 which shows a flowchart for the plan determination operation in step S104*a*.

Figure 21:
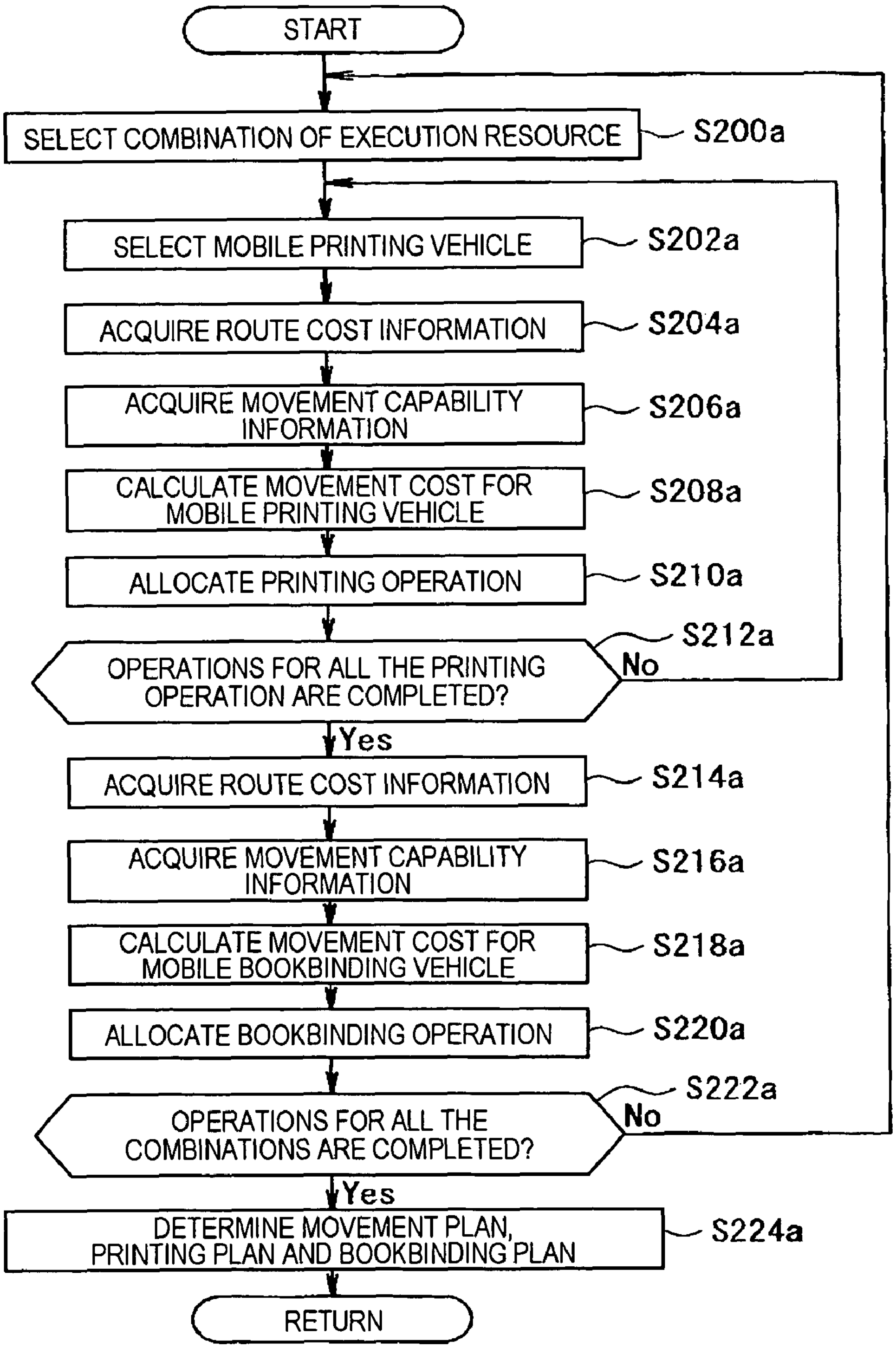
FIG. 21 is a flowchart showing a plan determining operation in step S104*a*.

First, the plan determining operation, when executed in step S104*a*, advances to step S200*a*, as shown in FIG. 21.

In step S200*a*, a combination of the execution resources to which the printing operation or the bookbinding operation is allocated is selected from the target execution resources, and then in step S202*a*, one of the mobile printing vehicles 200*a* relating to the selected combination (hereinafter will be referred to as a selected mobile printing vehicle 200*a*) is selected. Then, an operation of step S204*a* is performed.

In step S204*a*, the route cost information representing the route cost required for movement along the distribution route from the location of the selected mobile printing vehicle 200*a* to the joining point is acquired by the storage device 92*a*, and then in step S206*a*, the movement capability information of the selected mobile printing vehicle 200*a* is acquired by the storage device 92*a*. Then, an operation of step S208*a* is performed.

In step S208*a*, the movement cost required for the selected mobile printing vehicle 200*a* to move to the joining point is calculated on the basis of the route cost information and the movement capability information, acquired in steps S204*a* and S206*a*. The movement cost is calculated by multiplying the route cost constant by the movement capability constant. Therefore, as the route cost constant or the movement capability constant increases, the movement cost increases and the entire cost increases. In subsequent steps, the movement cost is calculated in the same manner.

Then, in step S210*a*, one of unallocated printing operations is allocated to the selected mobile printing vehicle 200*a*, and then in step S212*a*, it is determined whether the operations in steps S202*a* to S210*a* are completed with respect to all the printing operations. When it is determined in step S212*a* that all the printing operations are completed (i.e., Yes in step S212*a*), an operation of step S214*a* is performed.

In step S214*a*, the route cost information representing the route cost required for movement along the distribution route from the joining point to the delivery destination is acquired by the storage device 92*a*, and then in step. S216*a*, the movement capability information of the mobile bookbinding vehicle 210*a* relating to the combination selected in step S200*a* (hereinafter will be referred to as a selected mobile bookbinding vehicle 210*a*) is acquired by the storage device 92*a*. Then, an operation of step S218*a* is performed.

In step S218*a*, the movement cost required for the selected mobile bookbinding vehicle 210*a* to move to the delivery destination is calculated on the basis of the movement cost information and the movement capability information, acquired by steps S214*a* and S216*a*, and then in step S220*a*, the bookbinding operation is allocated to the selected mobile printing vehicle 200*a*. Then, an operation of step S222*a* is performed.

Then, in step S222*a*, it is determined whether the operations in steps S200*a* to S220*a* are completed with respect to all the combinations of the execution resources to which the printing operation or the bookbinding operation is allocated. When it is determined in step S222*a* that the operations are completed with respect to all the combinations (i.e., Yes in step S222*a*), an operation of step S224*a* is performed.

In step S224*a*, the combination of the execution resources capable of producing a minimum sum of the movement cost is determined on the basis of the calculation results in steps S208*a* and S218*a*, a movement plan, a print plan, and a bookbinding plan are determined with respect to the determined combination of the execution resources, and a series of operations are completed and return to an original operation.

On the other hand, when it is determined in step S222*a* that the operations are not completed with respect to all the combinations (i.e., No in step S222*a*), an operation of step S200*a* is performed.

On the other hand, when it is determined in step S212*a* that all the printing operations are not completed (i.e., No in step S212*a*), an operation of step S202*a* is performed.

Hereinafter, the operation of the present embodiment will be described.

FIG. 22 is a diagram showing present locations of the execution resources.

As shown in FIG. 22, it is assumed that the mobile printing vehicles A to C are located at a distance from the mobile bookbinding vehicle D, and the route cost constants with respect to the distribution routes from the mobile printing vehicles A to C to the joining point (present location of the mobile bookbinding vehicle D) are equally 3. Moreover, it is assumed that the mobile bookbinding vehicle D is located at a distance from the delivery destination, and the route cost constant with respect to the distribution route from the mobile bookbinding vehicle D to the delivery destination is 2 in addition, it is assumed that the movement capability constants for the mobile printing vehicles A to C and the mobile bookbinding vehicle D are respectively 1, 1, 2 and 1.5, and the excellence of the movement capability is ranked in the order of the mobile printing vehicle A, the mobile printing vehicle B, the mobile bookbinding vehicle D and the mobile printing vehicle C.

The management server 100*a* has acquired the print job through step S100*a*. In the present embodiment, it is assumed that the print job of FIG. 19 is acquired. In addition, the execution resource capable of performing the printing operation and the bookbinding operation is retrieved through step S102*a*.

FIG. 23 is a diagram showing a list of execution resources capable of performing the printing operation and the bookbinding operation.

The analysis of the print job of FIG. 19 shows that the print job requires two printing operations and one bookbinding operation. Therefore, it is assumed that three mobile printing vehicles A to C and single mobile bookbinding vehicle D are obtained as a retrieval result of the execution resource capable of performing the printing operations and the bookbinding operation. In the present embodiment, there are six combinations of the execution resources, (A, B, D), (B, A, D), (A, C, D), (C, A, D), (B, C, D) and (C, B, D), to which the printing operations 1 and 2 and the bookbinding operation are allocated. Symbols in parenthesis represent any one of the mobile printing vehicles A to C and the mobile bookbinding vehicle D, and the first, second and third elements in the parenthesis respectively represent each execution resource to which the printing operation 1, the printing operation 2 and the bookbinding operation are allocated. Hereinafter, the combination of the execution resources to which the printing operation or the bookbinding operation is allocated will be denoted in the same manner.

Then, through steps S200*a* to S222*a*, the movement cost is calculated with respect to all the combinations of the execution resources among the target execution resources to which the printing operation or the bookbinding operation is allocated.

FIG. 24 is a diagram showing a result of movement cost calculation with respect to each of the combinations of the execution resources to which the printing operation or the bookbinding operation is allocated.

In the combination of the execution resources (A, B, D), since the mobile printing vehicles A and B have to move to the joining point, both movement cost for the mobile printing vehicles A and B become 3 (=3×1), as shown in FIG. 24. Since the mobile bookbinding vehicle D has to move to the delivery destination, the movement cost for the mobile bookbinding vehicle D becomes 3 (=2×1.5). Therefore, the sum of the movement cost becomes 9 (=3+3+3).

Through the same calculation, the sum of the movement cost with respect to each of the combinations of the execution resources (B, A, D), (A, C, D), (C, A, D), (B, C, D) and (C, B, D) becomes 9, 12, 12, 12, 12, respectively.

Then, through step S224*a*, the combination of the execution resources capable of producing a minimum sum of the movement cost is determined among each of the combinations of the execution resources, and the movement plan, the print plan and the bookbinding plan are determined with respect to the determined combination of the execution resources. In the example of FIG. 24, the combination of the execution resources (A, B, D) or (B, A, D) is determined.

Then, the contents are acquired through steps S106*a* and S108*a* from the contents server and print data is produced on the basis of the acquired contents. In addition, through steps S110*a* to S120*a*, the movement plan information, the print plan information and the bookbinding plan information are produced and sent to the execution resources together with the print data.

In the mobile printing vehicles A and B, when the movement plan information is received at the movement plan information receiving unit 60*a*, the movement guiding unit 62*a* performs a movement guiding operation on the basis of the received movement plan information. Then, operators drive the mobile printing vehicles A and B to the joining point in accordance with the movement guiding operation. When the print plan information and the print data are received at the print plan information receiving unit 64*a*, the printing control unit 68*a* controls the printing device 66*a* to perform the printing operations 1 and 2 on the basis of the received print plan information and the received print data. The printing operations 1 and 2 are performed during the movement of the mobile printing vehicles A and B.

In the mobile bookbinding vehicle D, when results of the printing operations in the mobile printing vehicles A and B are received at the joining point and the movement plan information is received at the movement plan information receiving unit 70*a*, the movement guiding unit 72*a* performs a movement guiding operation on the basis of the received movement plan information. Then, an operator drives the mobile bookbinding vehicle D from the joining point to the delivery destination in accordance with the movement guiding operation. When the bookbinding plan information is received at the bookbinding plan information receiving unit 74*a*, the bookbinding control unit 78*a* controls the bookbinding device 76*a* to perform the bookbinding operation on the basis of the received bookbinding plan information. The bookbinding operation is performed during the movement of the mobile bookbinding vehicle D.

In the present embodiment, the print job including the specification of the printing operation and the bookbinding operation and the location of the delivery destination is acquired, the movement cost of the execution resources are calculated, and the movement plan for the execution resources, the print plan for the mobile printing vehicle 200*a* and the bookbinding plan for the mobile bookbinding vehicle 210*a* are made on the basis of the acquired print job and the calculated movement cost so that the sum of the movement cost becomes small.

Therefore, since the printing operation and the bookbinding operation are performed by the execution resources while moving cooperative with each other on the basis of the movement plan, the print plan and the bookbinding plan, it is possible to perform the printing operation and the bookbinding operation more efficiently than before. In addition, since a plurality of execution resources having the printing device 66*a* or the bookbinding device 76*a* is used rather than using an execution resource having a plurality of printing devices 66*a* or a plurality of bookbinding devices 76*a*, it is only necessary to provide a required number of execution resources in accordance with the content of the delivery instruction. When a number of distribution works are performed in parallel with each other, it is possible to reduce cost and efficiently manage the execution resources. In addition, since the movement plan, the print plan and the bookbinding plan are determined so that the sum of the movement cost becomes small, it is possible to reduce the movement cost.

In addition, in the present embodiment, the movement cost required for the mobile printing vehicle 200*a* to move to the joining point is calculated, the movement cost required for the mobile bookbinding vehicle 210*a* to move from the joining point to the delivery destination is calculated, the calculation result of the movement cost with respect to all the combinations of the execution resources to which the printing operation or the bookbinding operation is allocated is acquired, the combination of the execution resources capable of producing a minimum sum of the movement cost is determined on the basis of the acquired calculation result, and the movement plan, the print plan and the bookbinding plan are determined with respect to the determined combination of the execution resources.

Therefore, since the movement plan, the print plan and the bookbinding plan are determined with respect to the combination of the execution resources capable of producing a minimum sum of the movement cost, it is possible to further efficiently reduce the movement cost.

In addition, in the present embodiment, the movement cost of the execution resources are calculated on the basis of the route cost information representing the route cost required for movement along the distribution route and the movement capability information representing the movement capability of the execution resources.

Therefore, since it is possible to more delicately calculate the movement cost, it is possible to further efficiently reduce the movement cost.

In the third embodiment, the mobile printing vehicle 200*a* and the mobile bookbinding vehicle 210*a* correspond to the mobile object in Aspect 19, 25 or 31, the mobile printing vehicle 200*a* corresponds to the first mobile object in Forms 20 to 22, Forms 26 to 28 and Forms 32 to 34, and the mobile bookbinding vehicle 210*a* corresponds to the second mobile object in Forms 20 to 22, Forms 26 to 28 and Forms 32 to 34. The print job acquisition unit 22*a* and step S100*a* correspond to the delivery instruction information acquisition unit in Aspect 19 or 20, step S100*a* corresponds to the delivery instruction information acquisition step in Aspect 25, 26, 31 or 32, and the route cost information acquisition unit 28*a* and step S204*a* correspond to the first route cost information acquisition unit in Aspect 22.

In addition, in the third embodiment, step S204*a* represents the first route cost information acquisition step in Aspect 28 or 34, the route cost information acquisition unit 28*a* and step S214*a* correspond to the second route cost information acquisition unit in Aspect 22, and step S214*a* corresponds to the second route cost information acquisition step in Aspect 28 or 34. In addition, the movement capability information acquisition unit 30*a* and step S206*a* correspond to the first movement capability information acquisition unit in Aspect 22, step S206*a* corresponds to the first movement capability information acquisition step in Aspect 28 or 34, and the movement capability information acquisition unit 30*a* and step S216*a* correspond to the second movement capability information acquisition unit in Aspect 22.

In addition, in the third embodiment, step S216*a* corresponds to the second movement capability information acquisition step in Aspect 28 or 34, the movement cost calculating units 40*a* and 44*a* and steps S208*a* and S218*a* correspond to the movement cost calculating unit in Forms 19 to 21, and steps S208*a* and S218*a* correspond to the movement cost calculating step in Forms 25 to 27 and Forms 31 to 33. In addition, the movement cost calculating unit 40*a* and step S208*a* correspond to the first movement cost calculating unit in Aspect 21 or 22, step S208*a* corresponds to the first movement cost calculating step in Aspect 27, 28, 33 or 34, and the movement cost calculating unit 44*a* and step S218*a* correspond to the second movement cost calculating unit in Aspect 21 or 22.

In addition, in the third embodiment, step S218*a* corresponds to the second movement cost calculating step in Aspect 27, 28, 33 or 34, and the calculation result acquisition unit 46*a*, the plan determining unit 48*a* and steps S200*a*, S222*a* and S224*a* correspond to the management unit in Forms 19 to 21. In addition, steps S200*a*, S222*a* and S224*a* correspond to the management step in Forms 25 to 27 and Forms 31 to 33, the calculation result acquisition unit 46*a* and steps S200*a* and S222*a* correspond to the calculation result acquisition unit in Aspect 21, and steps S200*a* and S222*a* correspond to the calculation result acquisition step in Aspect 27 or 33.

In addition, in the third embodiment, the plan determining unit 48*a* and step S224*a* correspond to the plan determining unit in Aspect 21, step S224*a* corresponds to the plan determining step in Aspect 27 or 33, and the print job corresponds to the delivery instruction information in Aspect 19, 20, 25, 26, 31 or 32.

Hereinafter, a fourth embodiment of the invention will be described with reference to drawings. FIGS. 25 to 29 show a mobile print planning system, a mobile print planning program and a mobile print planning method in accordance with the fourth embodiment of the invention. In addition, only those parts different from the third embodiment will be described, and the same parts as the third embodiment are denoted by the same reference numerals and will not be described.

First, an outline of the present embodiment will be described with reference to FIG. 25.

As shown in FIG. 25, the present embodiment is different from the third embodiment in that a predetermined place other than the location of the mobile bookbinding vehicle 210*a* is set as the joining point. The joining point may include the location of the delivery destination.

Then, an outline of functions of a network system to which the invention is applied will be described with reference to FIG. 26 which is a schematic block diagram showing functions of the network system.

Figure 26:
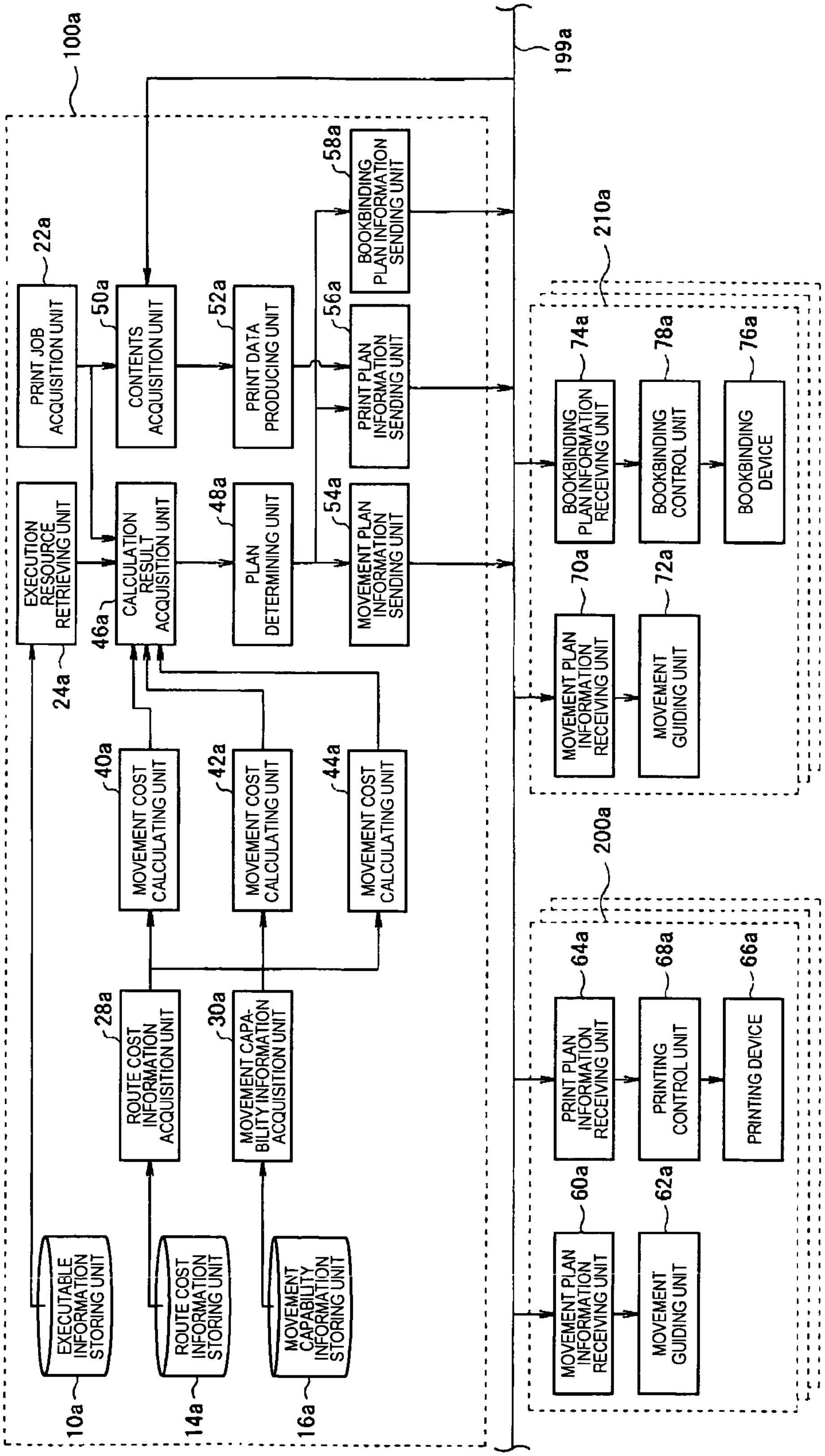
FIG. 26 is a schematic block diagram showing functions of a network system.

As shown in FIG. 26, the management server 100*a* includes the executable information storing unit 10*a*, the route cost information storing unit 14*a*, the movement capability information storing unit 16*a*, the print job acquisition unit 22*a*, the execution resource retrieving unit 24*a*, the route cost information acquisition unit 28*a* and the movement capability information acquisition unit 30*a*.

The management server 100*a* further includes the movement cost calculating units 40*a* and 44*a*, the calculation result acquisition unit 46*a*, the plan determining unit 48*a*, the contents acquisition unit 50*a*, the print data producing unit 52*a*, the movement plan information sending unit 54*a*, the print plan information sending unit 56*a* and the bookbinding plan information sending unit 58*a*.

The management server 110*a* further includes a movement cost calculating unit 42*a* calculating the movement cost required for the mobile bookbinding vehicle 210*a*, which is one of the target execution resources, to move to the joining point on the basis of the route cost information and the movement capability information, acquired by the route cost information acquisition unit 28*a* and the movement capability information acquisition unit 30*a*.

The calculation result acquisition unit 46*a* acquires calculation results from the movement cost calculating units 40*a* and 44*a*, with respect to all the combinations of a plurality of joining points and the execution resources among the target execution resources to which the printing operation or the bookbinding operation is allocated.

The plan determining unit 48*a* determines the combination of the joining points and the execution resource capable of producing a minimum sum of the movement cost, on the basis of the calculation result acquired by the calculation result acquisition unit 46*a* and determines the movement plan, the print plan, and the bookbinding plan with respect to the determined combination of the joining points and the execution resources.

Then, operations performed in the CPU 80*a* of the management server 100*a* will be described.

Figure 27:
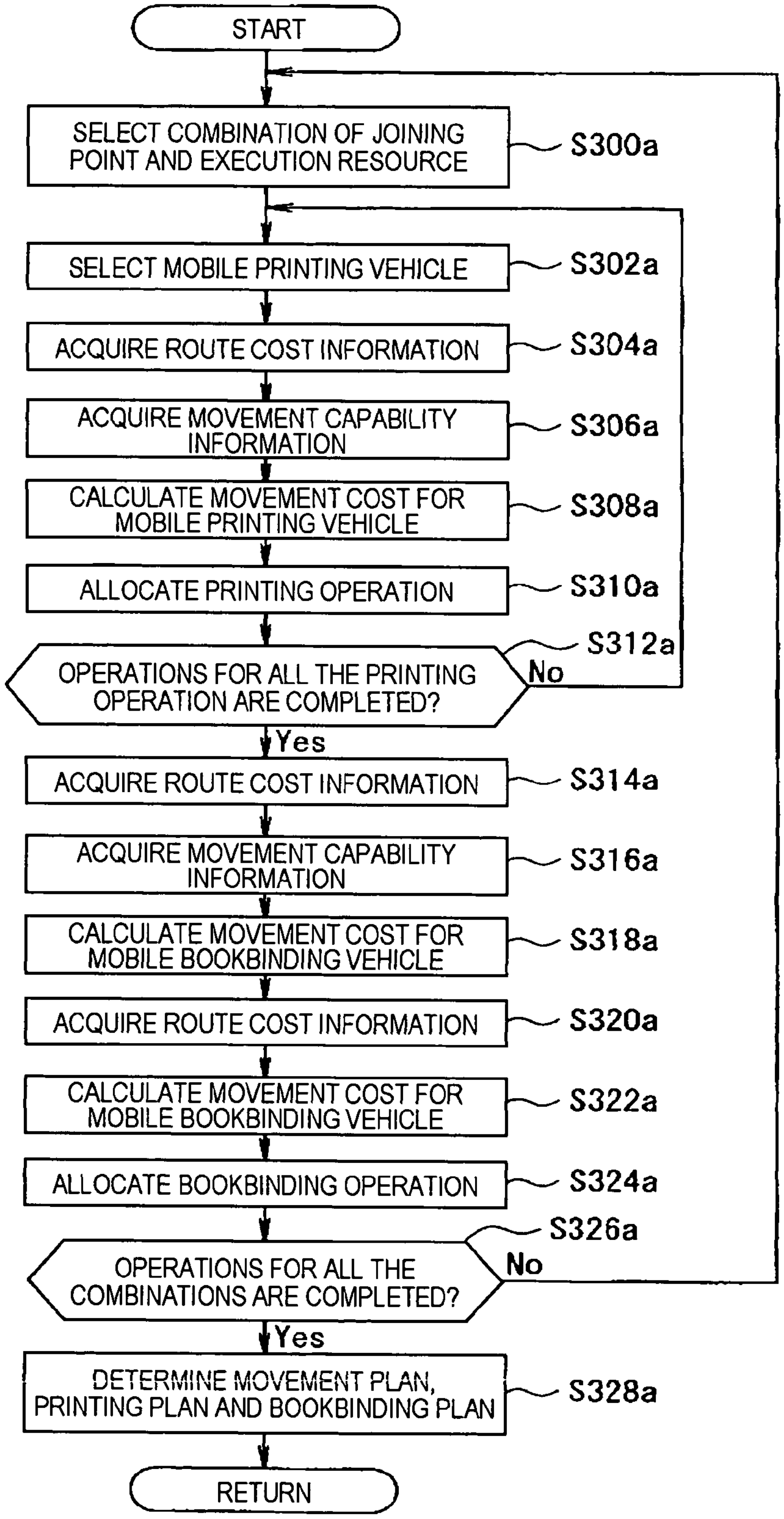
FIG. 27 is a flowchart showing a plan determining operation in step S104*a*.

The CPU 80*a* performs a plan determining operation shown in the flowchart of FIG. 27 in place of the plan determining operation shown in FIG. 21.

FIG. 27 is a flowchart showing the plan determination operation in step S104*a*.

First, the plan determining operation, when executed in step S104*a*, advances to step S300*a*, as shown in FIG. 27.

In step S300*a*, a combination of the joining points and the execution resources to which the printing operation or the bookbinding operation is allocated is selected from the target execution resources and a plurality of joining points, and then in step S302*a*, the same operation as step S202*a* is performed. Then, an operation of step S304*a* is performed.

In step S304*a*, the route cost information representing the route cost required for movement along the distribution route from the location of the selected mobile printing vehicle 200*a* to the joining point relating to the combination (hereinafter will be referred to as a selected joining point) selected in step S300*a* is acquired by the storage device 92*a*. Then, in step S306*a*, the movement capability information of the selected mobile printing vehicle 200*a* is acquired by the storage device 92*a*. Then, an operation of step S308*a* is performed.

In step S308*a*, the movement cost required for the selected mobile printing vehicle 200*a* to move to the selected joining point is calculated on the basis of the route cost information and the movement capability information acquired in steps S304*a* and S306*a*. Then, an operation of step S310*a* is performed.

Then, the same operations as steps S210a and S212a are performed in steps S310a and S312a. When it is determined in step S312a that all the printing operations are completed (i.e., Yes in step S312a), an operation of step S314a is performed.

In step S314a, the route cost information representing the route cost required for movement along the distribution route from the location of the selected mobile bookbinding vehicle 210a to the selected joining point is acquired by the storage device 92a, and then in step S316a, the movement capability information of the selected mobile bookbinding vehicle 210a is acquired by the storage device 92a. Then, an operation of step S318a is performed.

In step S318a, the movement cost required for the selected mobile bookbinding vehicle 210a to move to the selected joining point is calculated on the basis of the route cost information and the movement capability information acquired in steps S314a and S316a. Then, an operation of step S320a is performed.

In step S320a, the route cost information representing the route cost required for movement along the distribution route from the selected joining point to the delivery destination is acquired by the storage device 92a, and then in step S322a, the movement cost required for the selected mobile bookbinding vehicle 210a to move from the selected joining point to the delivery destination is calculated on the basis of the route cost information and the movement capability information acquired in steps S320a and S316a. Then, an operation of step S324a is performed.

Then, the same operations as steps S220a and S222a are performed in steps S324a and S326a. When it is determined in step S326a that all the operations are completed with respect to all the combinations (i.e., Yes in step S326a), an operation of step S328a is performed.

In step S328a, the combination of the joining points and the execution resources capable of producing a minimum sum of the movement cost is determined on the basis of the calculation result in steps S308a, S318a and S322a, a movement plan, a print plan, and a bookbinding plan are determined with respect to the determined combination of the joining points and the execution resources, and a series of operations are completed and return to an original operation.

On the other hand, when it is determined in step S326a that the operations are not completed with respect to all the combinations (i.e., No in step S326a), an operation of step S300a is performed.

On the other hand, when it is determined in step S312a that all the printing operations are not completed (i.e., No in step S312a), an operation of step S302a is performed.

Hereinafter, the operation of the present embodiment will be described.

Figures 28, 29:
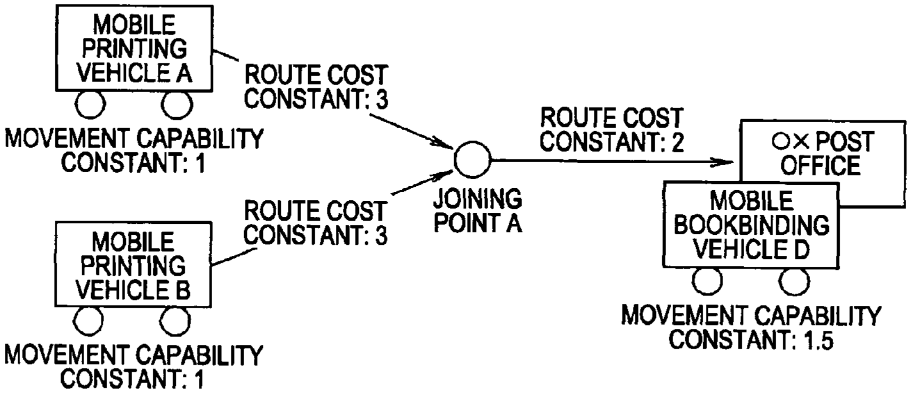
FIG. 28 is a diagram showing present locations of the execution resources.
FIG. 29 is a diagram showing a result of movement cost calculation with respect to each of the combinations of the execution resources to which the printing operation or the bookbinding operation is allocated.

FIG. 28 is a diagram showing present locations of the execution resources.

As shown in FIG. 28, it is assumed that the mobile printing vehicles A and B are located at a distance from the joining point A, and the route cost constants with respect to the distribution routes from the mobile printing vehicles A and B to the joining point A are equally 3. Moreover, it is assumed that the mobile bookbinding vehicle D is located at the delivery destination, and the route cost constant with respect to the distribution route from the delivery destination to the joining point A is 2. In addition, it is assumed that the movement capability constants for the mobile printing vehicles A and B and the mobile bookbinding vehicle D are respectively 1, 1 and 1.5, and the excellence of the movement capability is ranked in the order of the mobile printing vehicle A, the mobile printing vehicle B and the mobile bookbinding vehicle D.

The management server 100a has acquired the print job through step S100a. In the present embodiment, it is assumed that the print job of FIG. 19 is acquired. In addition, the execution resource capable of performing the printing operation and the bookbinding operation is retrieved through step S102a.

The analysis of the print job of FIG. 19 shows that the print job requires two printing operations and one bookbinding operation. Therefore, it is assumed that two mobile printing vehicles A and B and single mobile bookbinding vehicle D are obtained as a retrieval result of the execution resource capable of performing the printing operations and the bookbinding operation.

Then, through steps S300a to S326a, the movement cost is calculated with respect to all the combinations of the joining point and the execution resources among the target execution resources to which the printing operation or the bookbinding operation is allocated. In the present embodiment, the joining point A and the delivery destination are selected as candidates for the joining point. In the present embodiment, there are four combinations of the joining point and the execution resources, (A, B, D, joining point A), (B, A, D, joining point A), (A, B, D, delivery destination) and (B, A, D, delivery destination), to which the printing operations 1 and 2 and the bookbinding operation are allocated. The fourth symbol in parenthesis represents a joining point. Since the calculation results of the movement cost with respect to two of the combinations are identical to those of the third embodiment, descriptions will be made only to two combinations (A, B, D, joining point A) and (A, B, D, delivery destination).

FIG. 29 is a diagram showing a result of movement cost calculation with respect to each of the combinations of the execution resources to which the printing operation or the bookbinding operation is allocated.

In the combination of the joining points and the execution resources (A, B, D, joining point A), since the mobile printing vehicles A and B have to move to the joining point A, both movement cost for the mobile printing vehicles A and B become 3 (=3×1), as shown in FIG. 29. Since the mobile bookbinding vehicle D has to move between the joining point A and the delivery destination, the movement cost for the mobile bookbinding vehicle D becomes 6 (=2×1.5×2). Therefore, the sum of the movement cost becomes 12 (=3+3+6).

In the combination of the joining points and the execution resources (A, B, D, delivery destination), since the mobile printing vehicles A and B have to move to the delivery destination, both movement cost for the mobile printing vehicles A and B become 5 (=(3+2)×1). Since the mobile bookbinding vehicle D does not have to move, the movement cost for the mobile bookbinding vehicle D becomes 0. Therefore, the sum of the movement cost becomes 10 (=5+5+0).

Then, through step S328a, the combination of the joining points and the execution resources capable of producing a minimum sum of the movement cost is determined among each of the combinations of the joining point and the execution resources, and the movement plan, the print plan and the bookbinding plan are determined with respect to the determined combination. In the example of FIG. 29, the combination of the joining points and the execution resource (A, B, D, delivery destination) is determined.

Then, the contents are acquired through steps S106a and S108a from the contents server and print data is produced on the basis of the acquired contents. In addition, through steps S110a to S120a, the movement plan information, the print plan information and the bookbinding plan information are produced and sent to the execution resources together with the print data.

In the mobile printing vehicles A and B, when the movement plan information is received at the movement plan information receiving unit 60*a*, the movement guiding unit 62*a* performs a movement guiding operation on the basis of the received movement plan information. Then, operators drive the mobile printing vehicles A and B to the delivery destination in accordance with the movement guiding operation. When the print plan information and the print data are received at the print plan information receiving unit 64*a*, the printing control unit 68*a* controls the printing device 66*a* to perform the printing operations 1 and 2 on the basis of the received print plan information and the received print data. The printing operations 1 and 2 are performed during the movement of the mobile printing vehicles A and B.

In the mobile bookbinding vehicle D, when results of the printing operations in the mobile printing vehicles A and B are received at the delivery destination and the bookbinding plan information is received at the bookbinding plan information receiving unit 74*a*, the bookbinding control unit 78*a* controls the bookbinding device 76*a* to perform the bookbinding operation on the basis of the received bookbinding plan information. The bookbinding operation is performed at the delivery destination.

In addition, in the present embodiment, the movement cost required for the mobile printing vehicle 200*a* to move to the joining point is calculated, the movement cost required for the mobile bookbinding vehicle 210*a* to move to the joining point is calculated, the movement cost required for the mobile bookbinding vehicle 210*a* to move from the joining point to the delivery destination is calculated, the calculation result of the movement cost with respect to all the combinations of the joining point and the execution resources to which the printing operation or the bookbinding operation is allocated is acquired, the combination of the joining points and the execution resource capable of producing a minimum sum of the movement cost is determined on the basis of the acquired calculation result, and the movement plan, the print plan and the bookbinding plan are determined with respect to the determined combination of the execution resources.

Therefore, since the movement plan, the print plan and the bookbinding plan are determined with respect to the combination of the joining points and the execution resources capable of producing a minimum sum of the movement cost, it is possible to further efficiently reduce the movement cost.

In the fourth embodiment, the route cost information acquisition unit 28*a* and step S304*a* correspond to the first route cost information acquisition unit in Aspect 24, step S304*a* corresponds to the first route cost information acquisition step in Aspect 30 or 36, the route cost information acquisition unit 28*a* and step S314*a* correspond to the second route cost information acquisition unit in Aspect 24, and step S314*a* corresponds to the second route cost information acquisition step in Aspect 30 or 36. The route cost information acquisition unit 28*a* and step S320*a* correspond to the third route cost information acquisition unit in Aspect 24, step S320*a* corresponds to the third route cost information acquisition step in Aspect 30 or 36.

In addition, in the fourth embodiment, the movement capability information acquisition unit 30*a* and step S306*a* correspond to the first movement capability information acquisition unit in Aspect 24, step S306*a* corresponds to the first movement capability information acquisition step in Aspect 30 or 36, and the movement capability information acquisition unit 30*a* and step S316*a* correspond to the second movement capability information acquisition unit in Aspect 24. In addition, step S316*a* corresponds to the second movement capability information acquisition step in Aspect 30 or 36, the movement cost calculating units 40*a* to 44*a* and steps S308*a*, S318*a* and S322*a* correspond to the movement cost calculating unit in Aspect 23, and steps S308*a*, S318*a* and S322*a* correspond to the movement cost calculating step in Aspect 29 or 35.

In addition, in the fourth embodiment, the movement cost calculating unit 40*a* and step S308*a* correspond to the first movement cost calculating unit in Aspect 23 or 24, step S308*a* corresponds to the first movement cost calculating step in Aspect 29, 30, 35 or 36, the movement cost calculating unit 42*a* and step S318*a* correspond to the second movement cost calculating unit in Aspect 23 or 24, and step S318*a* corresponds to the second movement cost calculating step in Aspect 29, 30, 35 or 36. In addition, the movement cost calculating unit 44*a* and step S322*a* correspond to the third movement cost calculating unit in Aspect 23 or 24, and step S322*a* corresponds to the third movement cost calculating step in Aspect 29, 30, 35 or 36.

In addition, the calculation result acquisition unit 46*a*, the plan determining unit 48*a* and steps S300*a*, S326*a* and S328*a* correspond to the management unit in Aspect 23, steps S300*a*, S326*a* and S328*a* correspond to the management step in Aspect 29 or 35, and the calculation result acquisition unit 46*a* and steps S300*a* and S326*a* correspond to the calculation result acquisition unit in Aspect 23, and steps S300*a* and S326*a* correspond to the calculation result acquisition step in Aspect 29 or 35. The plan determining unit 48*a* and step S328*a* correspond to the plan determining unit in Aspect 23, and step S328*a* corresponds to the plan determining step in Aspect 29 or 35.

Although in the third and fourth embodiments, the descriptions have been made to the case where the movement cost is calculated on the basis of the route cost information, the invention is not limited to this case. However, the movement cost may be calculated on the basis of the location information of the execution resources, the joining point and the delivery destination, the map information including slope or route, and the road information representing road conditions such as congestion, construction work and traffic regulations. In this case, a location information storing unit storing location information, a location information acquisition unit acquiring the location information from the location information storing unit, a map information storing unit storing map information, a map information acquisition unit acquiring the map information from the map information storing unit, a road information storing unit storing road information, and a road information acquisition unit acquiring the road information from the road information storing unit may be added to the third and fourth embodiments.

In addition, although the route cost information is simply acquired by the storage device 92*a* in the third and fourth embodiments, the invention is not limited to this case. However, the route cost information for each of a plurality of routes may be stored in the storage device 92*a* and the operations in steps S204*a*, S214*a*, S304*a*, S314*a* and S320*a* may be modified in the following manner.

In steps S204*a* and S304*a*, the location information of the mobile printing vehicle 200*a* and the location information of the joining point are acquired, and the route cost information representing the route cost required for movement along the distribution route from the location of the mobile printing vehicle 200*a* to the joining point is acquired by the storage device 92*a* on the basis of the acquired location information.

In step S314*a*, the location information of the mobile bookbinding vehicle 210*a* and the location information of the joining point are acquired, and the route cost information representing the route cost required for movement along the distribution route from the location of the mobile bookbinding vehicle 210*a* to the joining point is acquired by the storage device 92*a* on the basis of the acquired location information.

In steps S214*a* and S320*a*, the location information of the joining point is acquired, and the route cost information representing the route cost required for movement along the distribution route from the joining point to the delivery destination is acquired by the storage device 92*a* on the basis of the acquired location information and the acquired print job (the location of the delivery destination).

In addition, although in the fourth embodiment, the route cost information representing the route cost required for movement along the distribution route from the location of the mobile bookbinding vehicle 210*a* to the joining point, and the route cost information-representing the route cost required for movement along the distribution route from the joining point to the delivery destination are respectively acquired in steps S314*a* and S320*a*, the invention is not limited to this case. However, the operations may be collected as a single operation so as to acquire the route cost information representing the route cost required for movement along the distribution route from the location of the mobile bookbinding vehicle 210*a* to the delivery destination via the joining point.

In addition, although in the fourth embodiment, the movement cost required for the mobile bookbinding vehicle 210*a* to move to the joining point, and the movement cost required for the mobile bookbinding vehicle 210*a* to move from the joining point to the delivery destination are respectively acquired in steps S318*a* and S322*a*, the invention is not limited to this case. However, the operations may be collected as a single operation so as to acquire the movement cost required for the mobile bookbinding vehicle 210*a* to move to the delivery destination via the joining point.

In addition, although the combination of the execution resources capable of producing a minimum sum of the movement cost is determined in the third and fourth embodiments, the invention is not limited to this case. However, it may be possible to determine the combination of the execution resources not only capable of completing the printing operation and the bookbinding operation before the delivery deadline and but also capable of producing a minimum sum of the movement cost.

In addition, although the execution resource capable of performing the printing operation and the bookbinding operation defined by the print job is retrieved in the third and fourth embodiments, the invention is not limited to this case. However, among the execution resource capable of performing the printing operation and the bookbinding operation, the execution resource occupied by other printing operation may be excluded from the object of retrieval.

In addition, although an indicator of the movement cost were not explicitly described in the third and fourth embodiments, cost required for the movement or environmental load incurred in connection with the movement may be used as the indicator of the movement cost.

Although in the third and fourth embodiments, the descriptions have been made to the case where there is only single bookbinding operation, the invention is not limited to this case. However, when there is a plurality of bookbinding operations, the plurality of bookbinding operations may be iteratively performed in the plan determining operation in FIGS. 21 and 27 similar to the case of the printing operation. Specifically, the operations corresponding to steps S202*a* and S212*a* in the third embodiment or the operations corresponding to steps S302*a* and S312*a* in the fourth embodiment may be included in order to perform the plurality of bookbinding operations.

In addition, although the executable information is previously stored in the storage device 92*a* in the third and fourth embodiments, the invention is not limited to this case. However, the executable information may be acquired by the execution resources according to need. Similarly, the route cost information and the movement capability information may be acquired by the execution resources according to need.

In addition, although the third and fourth embodiments have been described to the case where the order receiving date is same as the contents delivery deadline, the invention is not limited to this case. However, when the order receiving date is earlier than the contents delivery deadline, the execution resources may be disposed in advance so that the execution resources are placed at an optimal place at the time of the contents delivery deadline. In this case, the optimal place means a place where a combination capable of providing a quickest delivery can be obtained.

In addition, although the printing operation and the bookbinding operation were performed in the third and fourth embodiments, the invention is not limited to this case. However, when there is a plurality of operations related to printing or post-printing operations, the plurality of operations may be performed in arbitrary order, separation and combination thereof. Examples of the operations related to the printing or post-printing operation include printing, overprinting, foil stamping, varnishing, laminating, folding, binding, sheet gathering, trimming and case sealing.

More specifically, in the case of producing a direct mail, an operation of printing backgrounds in color is first performed using a printer capable of color printing, an overprinting operation such as a variable printing (recipient of the direct mail or individual contents of an invoice) is performed using a digital monochrome printer, a folding operation is performed to put in an envelope, a case sealing operation is performed using a case sealing machine. As a result of the series of operations, a preprinted and pre-sealed direct mail is produced. As another example, in the case of producing a book having a mixture of color pages and lack/white pages, an operation of printing color pages is performed using a color printer, an operation of printing black/white pages is performed using a monochrome printer, a sheet gathering operation of gathering respective printed pages in the order of a page number is performed, a binding operation of binding gathered pages is performed, whereby a book is produced.

In addition, although the execution resources are configured as cars in the third and fourth embodiments, the invention is not limited to this case. However, the invention may be applied to the case where the printing device 66*a* or the bookbinding device 76*a* is configured as a movable cradle so as to move along a rail laid down in a printing plant so that the printing device 66*a* and the bookbinding device 76*a* can be disposed at an optimal place in accordance with the print job.

In addition, although the print data is produced by the management server 100*a* in the third and fourth embodiment, the invention is not limited to this case. However, the print data may be produced by the printing control unit 68*a*.

In addition, although the third and fourth embodiments were described to the case where the operations shown in the flowcharts of FIGS. 20, 21 and 27 are performed in accordance with the control program stored in the ROM 82*a* in advance, the invention is not limited to this case. However, a program showing these procedures may be read into the RAM 84*a* from a storage medium storing the program therein and may be also executed.

In the invention, examples of the storage medium include a semiconductor storage medium, such as RAM and ROM, a magnetic storage medium such as FD and HD, an optically-read storage medium such as CD, CDV, LD and DVD, or a magnetic/optically-read storage medium such as MO. Regardless of the reading method such as electronic, magnetic, or optical reading, the storage medium includes any type of storage medium as long as it is a computer-readable storage medium.

In addition, although in the third and fourth embodiments, the mobile print planning system, the mobile print planning program and the mobile print planning method in accordance with the invention were applied to the case where the printing operation and the bookbinding operation are performed by a plurality of execution resources while moving cooperative with each other, the invention is not limited to this case. However, the invention may also be applied to the case where only the printing operation is performed by a plurality of mobile printing vehicles 200*a* while moving cooperative with each other or only the bookbinding operation is performed by a plurality of mobile bookbinding vehicles 210*a* while moving cooperative with each other.

Hereinafter, a fifth embodiment of the invention will be described with reference to drawings. FIGS. 30 to 39 show a mobile-print planning system, a mobile print planning program and a mobile print planning method in accordance with the fifth embodiment of the invention.

First, an outline of the present embodiment will be described with reference to FIG. 30.

Figure 30:
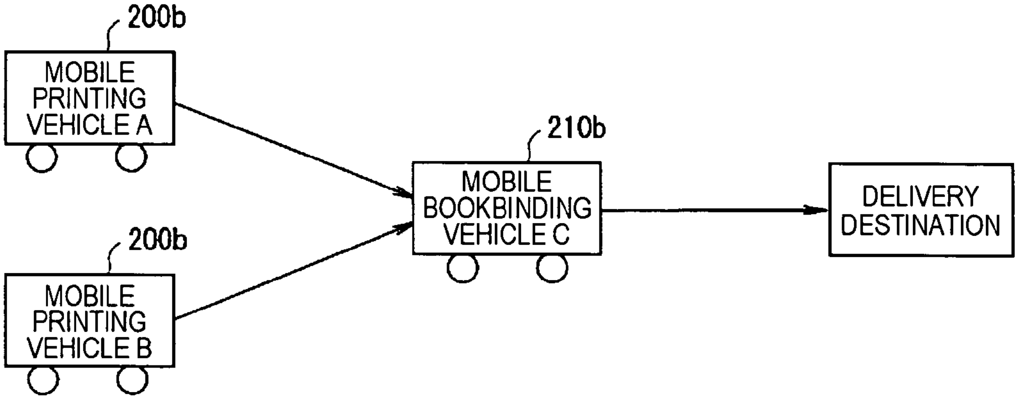
FIG. 30 is a diagram for explaining an outline of a fifth embodiment of the invention.

The present embodiment provides a mobile printing service by the use of a mobile printing vehicle 200*b* having a printing device thereon and a mobile bookbinding vehicle 210*b* having a bookbinding device thereon, as shown in FIG. 30. In the mobile printing service, a plurality of mobile printing vehicles 200*b* performs printing operations during movement, and results of the printing operations in the mobile printing vehicles 200*b* are sent to the mobile bookbinding vehicle 211*b*. Then, the mobile bookbinding vehicle 210*b* performs a bookbinding operation during movement, and the result of the bookbinding operation in the mobile bookbinding vehicle 210*b* is delivered to a predetermined delivery destination. In the present embodiment, a location of the mobile bookbinding vehicle 210*b* is considered as a joining point.

Then, an outline of functions of a network system to which the invention is applied will be described with reference to FIG. 31 which is a schematic block diagram showing functions of the network system.

Figure 31:
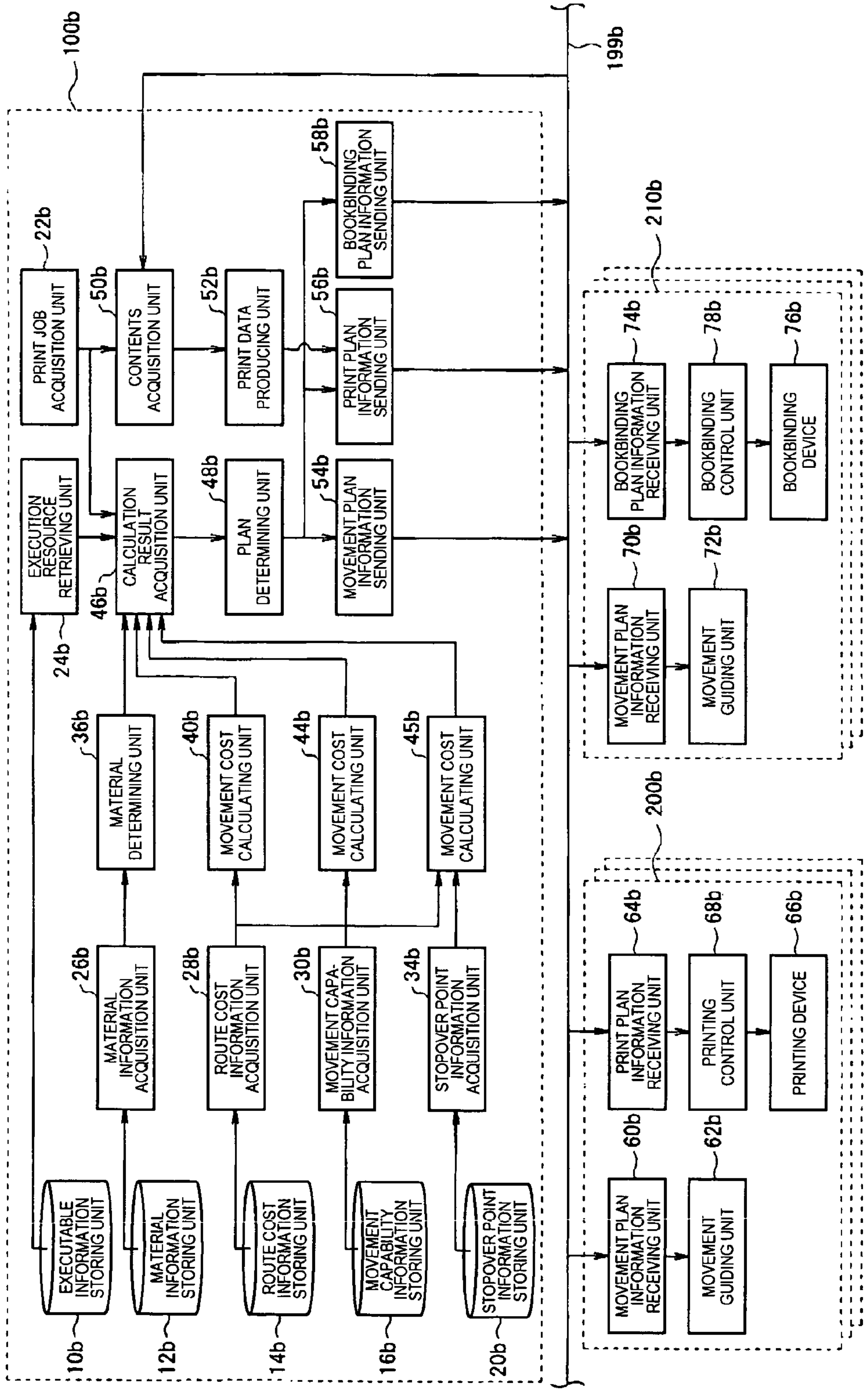
FIG. 31 is a schematic block diagram showing functions of a network system.

As shown in FIG. 31, the network 199*b* is connected to the mobile printing vehicles 200*b*, the mobile bookbinding vehicles 210*b*, a management server 100*b* managing the mobile printing vehicles 200*b* and the mobile bookbinding vehicles 210*b* (hereinafter, both vehicles 200*b* and 210*b* will be collectively referred to as an execution resource unless those vehicles are explicitly differentiated to each other), and a plurality of contents servers (not shown).

The management server 100*b* includes an executable information storing unit 10*b* storing executable information representing whether the execution resource can perform the printing operation or the bookbinding operation, a material information storing unit 12*b* storing information about the material retained by the mobile printing vehicle 200*b*, and a route cost information storing unit 14*b* storing route cost information representing the route cost.

The management server 100*b* further includes a movement capability information storing unit 16*b* storing movement capability information representing the movement capability of the execution resource, and a stopover point information storing unit 20*b* storing stopover point information about the stopover point where the material required for the printing operation is supplied.

The management server 100*b* further includes a print job acquisition unit 22*b* acquiring a print job including a specification of the printing and bookbinding, location of the delivery destination, deadline of the delivery, and address of contents acquisition site, and an execution resource retrieving unit 24*b* retrieving for the execution resource capable of performing the printing operation and the bookbinding operation.

The execution resource retrieving unit 24*b* analyzes the print job (including a specification of the printing and bookbinding) acquired by the print job acquisition unit 22*b*, determines the required printing operation and the required bookbinding operation, and retrieves execution resource capable of performing the determined printing operation and the determined bookbinding operation on the basis of the executable information of the executable information storing unit 10*b*.

The management server 100*b* further includes a material information acquisition unit 26*b* acquiring the material information from the material information storing unit 12*b*, and a material determining unit 36*b* determining whether the mobile printing vehicle 200*b* retains the material required for the printing operation on the basis of the material information acquired by the material information acquisition unit 26*b*.

The management server 100*b* further includes a route cost information acquisition unit 28*b* acquiring, from the route cost information storing unit 14*b*, the route cost information representing a route cost required for movement along the distribution route from the location of the mobile printing vehicle 200*b* to a joining point, a route cost required for movement along the distribution route from the location of the mobile printing vehicle 200*b* to the joining point via the stopover point, and a route cost required for movement along the distribution route from the join point to the delivery destination, and a movement capability information acquisition unit 30*b* acquiring, from the movement capability information storing unit 16*b*, the movement capability information of the execution resource (hereinafter will be referred to as a target execution resource) retrieved by the execution resource retrieving unit 24*b*.

The management server 100*b* further includes a movement cost calculating unit 40*b* calculating a movement cost required for the mobile printing vehicle 200*b*, one of the target execution resources, to move to the joining point on the basis of the route cost information and the movement capability information acquired by the route cost information acquisition unit 28*b* and the movement capability information acquisition unit 30*b*, and a movement cost calculating unit 44*b* calculating a movement cost required for the mobile bookbinding vehicle 210*b*, one of the target execution resources, to move from the joining point to the delivery destination on the basis of the acquired by the route cost information acquisition unit 28*b* and the movement capability information acquisition unit 30*b*.

The management server 100*b* further includes a stopover point information acquisition 34*b* acquiring the stop over point information from the stopover point information storing unit 20*b*, and a movement cost calculating unit 45*b* calculating a movement cost required for the mobile printing vehicle 200*b*, one of the target execution resources, to move to the joining point via the stopover point on the basis of the stopover point information, the route cost information and the movement capability information, acquired by the stopover point information acquisition unit 34*b*, the route cost information acquisition unit 28*b* and the movement capability information acquisition unit 30*b*.

The management server 100*b* further includes a calculation result acquisition unit 46*b* acquiring calculation results with respect to all the combinations of the execution resources among the target execution resources to which the printing operation or the bookbinding operation is allocated, from the movement cost calculating units 40*b* and 44*b* when the material determining unit 36*b* has determined that the required material is contained and from the movement cost calculating units 45*b* and 44*b* when the material determining unit 36*b* has determined that the required material is not contained.

The management server 100*b* further includes a plan determining unit 48*b* determining the combination of the execution resources capable of producing a minimum sum of the movement cost, on the basis of the calculation result acquired by the calculation result acquisition unit 46*b* and making a movement plan, a print plan and a bookbinding plan with respect to the determined combination of the execution resources.

The management server 100*b* further includes a contents acquisition unit 50*b* acquiring contents from the contents server on the basis of the address of the contents acquisition site included in the print job acquired by the print job acquisition unit 22*b*, and a print data producing unit 52*b* producing print data on the basis of the contents acquired by the contents acquisition unit 50*b*.

The management server 100*b* further includes a movement plan information sending unit 54*b* sending movement plan information representing the movement plan determined by the plan determining unit 48*b* to the execution resource to which the printing operation or the bookbinding operation is allocated, a print plan information sending unit 56*b* sending print plan information representing the print plan determined by the plan determining unit 48*b* and print data produced by the print data producing unit 52*b* to the mobile printing vehicle 200*b* to which the printing operation is allocated, and a bookbinding plan information sending unit 58*b* sending bookbinding plan information representing the bookbinding plan determined by the plan determining unit 48*b* to the mobile bookbinding vehicle 210*b* to which the bookbinding operation is allocated.

Then, an outline of functions of the mobile printing vehicle 200*b* will be described.

The mobile printing vehicle 200*b* is a one-box-type or trailer-type car, for example. Although not depicted in drawing, the mobile printing vehicle 200*b* has a moving mechanism including a main vehicle body, a plurality of axles rotatably mounted under the main vehicle body, a plurality of wheels mounted on both ends of the axles, an engine, and a power transmission mechanism transmitting power from the engine to the axles. The mobile printing vehicle 200*b* may be a container towed by another car.

As shown in FIG. 31, a movement plan information receiving unit 60*b* receiving the movement plan information, a movement guiding unit 62*b*, such as a car navigation system, guiding the movement on the basis of the movement plan information received from the movement plan information receiving unit 60*b*, a print plan information receiving unit 64*b* receiving the print plan information and the print data, a printing device 66*b*, a printing control unit 68*b* controlling the printing device 66*b* on the basis of the print plan information and the print data received from the print plan information receiving unit 64*b* are mounted on the main vehicle body. Besides, a sheet tray containing print sheets, a discharge tray containing printed sheets and an ink container containing ink used in printing are mounted on the main vehicle body. In addition, in the main vehicle body, a space for an operator to perform the printing operation is reserved within the internal space of the mobile printing vehicle 200*b*.

It is desirable that the mobile printing vehicle 20*b* is equipped with an electric power generating unit or a battery so as to attract power from internal sources of the mobile printing vehicle 200*b*. However, the mobile printing vehicle 200*b* may attract power from external sources by plugging into a socket such as on other buildings during stopovers. In addition, if the printing device 66*b* is a printer that requires water for an offset printing, for example, equipments for supplying water may be incorporated in the mobile printing vehicle 200*b*, or piping equipments for connection with external water lines may be installed in the mobile printing vehicle 200*b*.

The mobile printing vehicle 200*b* is constructed in such a manner that a door is provided in the vicinity of the discharge tray of the printing device 66*b* so as to easily pick out the printed matter as the printing result from the mobile printing vehicle 200*b*. In other words, it is desirable to dispose the door to face the discharge tray of the printing device 66*b* so as to facilitate an access from outside.

Then, an outline of functions of the moving bookbinding vehicle 210*b* will be described.

The moving bookbinding vehicle 210*b* has the same moving mechanism as the mobile printing vehicle 200*b*.

As shown in FIG. 31, a movement plan information receiving unit 70*b* receiving the movement plan information, a movement guiding unit 72*b*, such as a car navigation system, guiding the movement on the basis of the movement plan information received from the movement plan information receiving unit 70*b*, a bookbinding plan information receiving unit 74*b* receiving the bookbinding plan information, a bookbinding device 76*b*, a bookbinding control unit 78*b* controlling the bookbinding device 76*b* on the basis of the bookbinding plan information received from the bookbinding plan information receiving unit 74*b* are mounted on the main vehicle body. In addition, in the main vehicle body, a space for an operator to perform the bookbinding operation is reserved within the internal space of the mobile bookbinding vehicle 210*b*.

Examples of a general bookbinding machine includes a folding machine, a saddle-stitch binding machine, an unsewn binding machine, a case binding machine, a trimming machine, and a case sealing machine, but the bookbinding device 76*b* of the present embodiment may include all types of such machines.

It is desirable that the mobile bookbinding vehicle 210*b* is equipped with an electric power generating unit or a battery so as to attract power from internal sources of the mobile bookbinding vehicle 210*b*. However, the mobile bookbinding vehicle 210*b* may attract power from external sources by plugging into a socket such as on other buildings during stopovers.

The mobile bookbinding vehicle 210*b* is constructed in such a manner that a door is provided in the vicinity of the discharge tray of the bookbinding device 76*b* so as to easily pick out the bookbinded product as the bookbinding result from the mobile bookbinding vehicle 210*b*. In other words, it is desirable to dispose the door to face the discharge tray of the bookbinding device 76*b* so as to facilitate an access from outside.

Then, the structure of the management server 100*b* will be described with reference to FIG. 32 which shows a hardware structure of the management server 100*b*.

Figure 32:
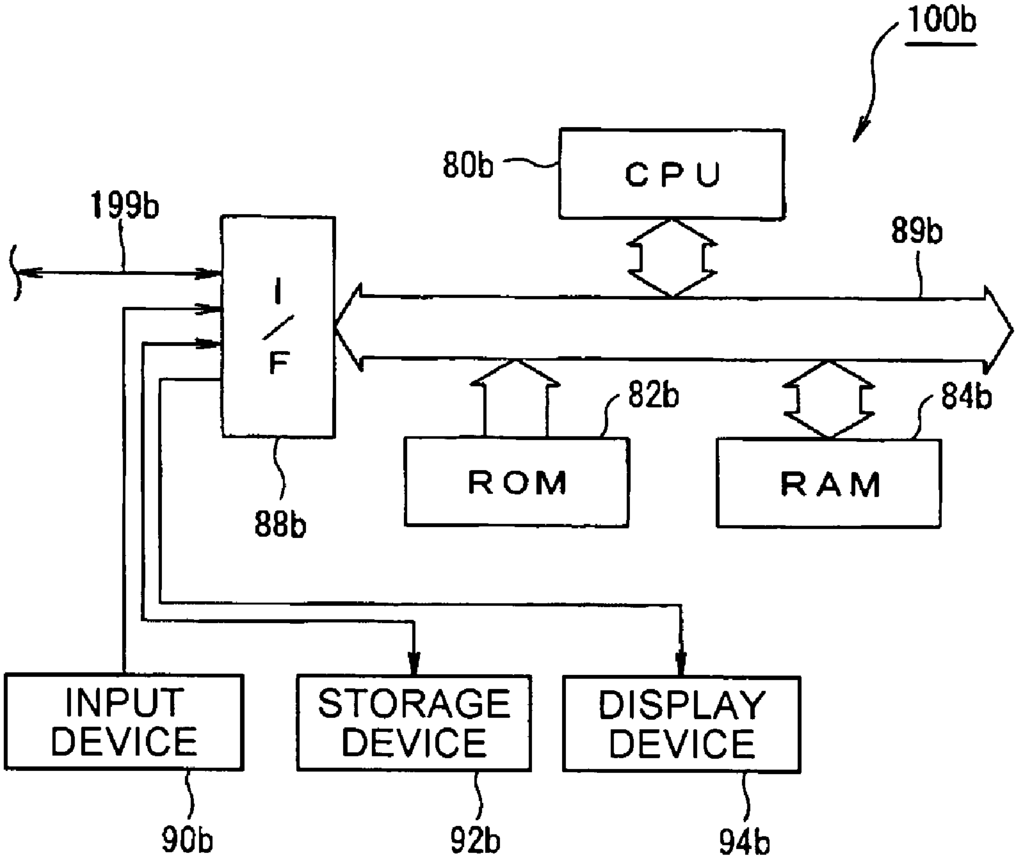
FIG. 32 is a diagram showing a hardware structure of a management server 100*b*.

As shown in FIG. 32, the management server 100*b* has a CPU 80*b* performing computation on the basis of a control program and controlling the entire system, an ROM 82*b* storing the control program and the like of the CPU 80*b* in a predetermined region, an RAM 84*b* for storing data read from the ROM 82*b* and the like and computation results required in the process of the computation in the CPU 80*b*, and an I/F 88*b* interfacing input and output of data with external devices, which are connected to a bus 89*b* as a signal line for data transmission so as to exchange data to each other.

The I/F 88*b* is connected to an input device 90*b*, as an external device, including a keyboard or a mouse, as a human interface, for inputting data, a storage device 92*b* storing data or tables as a file, a display device 94*b* displaying a screen on the basis of an image signal, and signal lines for connection to the network 199*b*.

Then, a data structure of the print job will be described with reference to FIG. 33.

As shown in FIG. 33, the print job is expressed in a manner that tag sets such as a starting tag and an ending tag are inserted between a prescribed starting tag 500*b* and a prescribed ending tag 502*b*, whereby the delivery specification, the printing operation and the bookbinding operation are set.

Tag sets 504*b* for setting the delivery specification are described between the starting tag 500*b* and the ending tag 502*b*.

In the tag sets 504*b*, an order receiving date, a contents delivery deadline as the delivery deadline of the contents, a product delivery deadline as the delivery deadline of the product, location of the delivery destination, and the amount of the product are described by corresponding tag sets.

Tag sets 506*b* and 508*b* for setting the printing operation and tag sets 510*b* for setting the bookbinding operation are also described between the starting tag 500*b* and the ending tag 502*b*.

In the tag sets 506*b* and 508*b*, details of the printing operation, a sheet size, a sheet type, a finishing size, an address of the contents acquisition site, and an output destination of the printed matter are described by corresponding tag sets.

In the tag sets 510*b*, details of the bookbinding operation, an envelope size corresponding to the sheet size, an envelope destination corresponding to output destination of the printed matter, a content size corresponding to the sheet size, a content destination corresponding to output destination of the printed matter, and an output destination of the bookbinded product are described by corresponding tag sets.

In the example of FIG. 33, it is defined as a printing operation 1 to acquire contents from a contents server specified by a URL, "http://some.server/content.pdf" and perform printing on a thick glossy A6 size sheet. In addition, it is defined as a printing operation 2 to acquire CSV (comma separated value) format contents from a contents server specified by a URL, "http://some.server/addressing.csv" and perform variable printing on an A6 size sheet. In addition, it is defined in the printing operation 1 and the printing operation 2 that the contents are prepared on the contents server from 2005-12-20 10:00. In addition, it is described as a bookbinding operation to seal the content printed in the printing operation 1 in the envelope printed in the printing operation 2 and deliver the resulting product in an amount of 400 sets to an OX post office before 2005-12-20 12:00.

Although two printing operations and one bookbinding operation were set in the example of FIG. 33, the number of the printing operation and the bookbinding operation is not limited to this and an arbitrary number of the printing operation and the bookbinding operation may be set in the print job.

Then, the data structure of the storage device 92*b* will be described.

The storage device 92*b* constitutes the executable information storing unit 10*b*, and an executable information table (not shown) in which executable information is registered for each of the execution resources is stored in the storage device 92*b*.

The storage device 92*b* further constitutes the material information storing unit 12*b*, and a material information table 400*b* in which material information is registered for each of the execution resources is stored in the storage device 92*b*.

FIG. 34 is a diagram showing a data structure of material information table 400*b*.

As shown in FIG. 34, in the material information table 400*b*, a set of records are registered for each of the mobile printing vehicles 200*b*. Each record includes a field in which the number of print sheets such as thick glossy A6 size sheet, high quality A6 size envelope, A3 size mat sheet and A4 size mat sheet is registered for every print sheet type. The print sheet is merely an example of the material and ink, toner or other consumable supplies may also be considered as the material.

The storage device 92*b* further constitutes the route cost information storing unit 14*b*, and the route cost information representing a route cost required for movement along the distribution route from the location of the mobile printing vehicle 200*b* to a joining point, a route cost required for movement along the distribution route from the location of the mobile printing vehicle 200*b* to the joining point via the stopover point, and a route cost required for movement along the distribution route from the join point to the delivery destination is stored in the storage device 92*b*.

The route cost information is a numeric value (hereinafter will be referred to as a route cost constant) calculated on the basis of a distribution route distance, a congestion condition, a slope and the like, wherein a greater route cost constant means a higher the route cost. In the invention, the distribution route distance from the location of the mobile printing vehicle 200*b* to the joining point can be calculated on the basis of the location information of the mobile printing vehicle 200*b*, the location information of the joining point and the map information. Further, the distribution route distance from the mobile printing vehicle 200*b* to the joining point via the stopover point can be calculated on the basis of the location information of the mobile printing vehicle 200*b*, the stopover point information (location of the stopover point), the location information of the joining point, and the map information. Moreover, the distribution route distance from the joining point to the delivery destination can be calculated on the basis of the location information of the joining point, the print job (the location of the delivery destination) and the map information. In addition, the slope and the congestion condition can be calculated on the basis of the map information and the road information, respectively. The road information may be acquired, for example, from a VICS (Vehicle Information and Communication System) center.

In addition, the storage device 92*b* constitutes the movement capability information storing unit 16*b*, and the movement capability information for each of the execution resources is stored in the storage device 92*b*. The movement capability information is a numeric value (hereinafter will be referred to as a movement capability constant) calculated on the basis of a fuel cost, a maintenance cost, depreciation cost and the like for the execution resources, wherein a smaller movement capability constant means an excellent movement capability.

The storage device 92b further constitutes the stopover point information storing unit 20b, and the stopover point information for each of the stopover points is stored in the storage device 92b. The stopover point information includes the type of the material retained at the stopover point, the quantity for every material type and the location of the stopover point.

Then, operations performed in the CPU 80b will be described.

Figure 35:
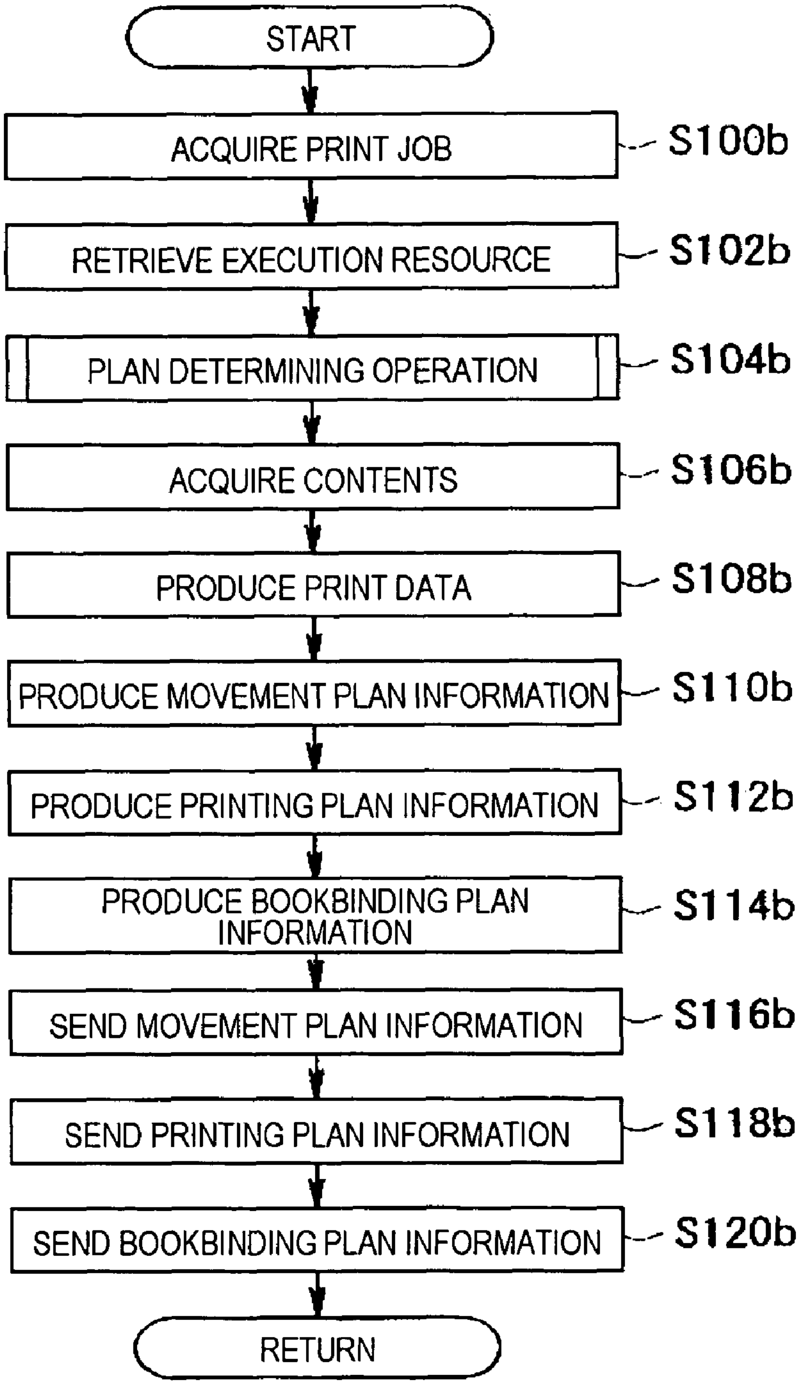
FIG. 35 is a flowchart showing an operation of providing a mobile printing service.

The CPU 80b is constituted by a micro-processing unit and the like, and activates a predetermined program stored in a prescribed region of the ROM 82b, thereby performing an operation of providing a mobile printing service shown in the flowchart of FIG. 35 in accordance with the program.

FIG. 35 is a flowchart showing an operation of providing the mobile printing service.

The operation of providing the mobile printing service, when executed by the CPU 80b, advances to step S100b, as shown in FIG. 35.

A print job is acquired in step S100b, and then in step S102b, the acquired print job is analyzed and the printing operation and the bookbinding operation required are determined so as to retrieve the execution resource capable of performing the determined printing operation and the determined bookbinding operation on the basis of the executable information table. Then, an operation of step S104b is performed.

In step S104b, a plan determining operation in which a movement plan, a print plan and a bookbinding plan are determined with respect to the combination of the execution resources to which the printing operation or the bookbinding operation is allocated among the retrieved target execution resources. Then, an operation of step S106b is performed.

In step S106b, contents are acquired by the contents server on the basis of the address of the acquisition site included in the acquired print job, and then in step S108b, print data is produced on the basis of the acquired contents. Then, an operation of step S110b is performed.

In step S110b, movement plan information representing the movement plan determined in the plan determining operation in step S104b is produced. For example, the movement plan information includes guide information for guiding the execution resource along the distribution route to joining points or the delivery destination and schedule information representing a departure time and an arrival time. In the invention, the movement plan information may be produced for a plurality of execution resources, or may be produced for each of the execution resources.

Then, in step S112b, print plan information representing the print plan determined in the plan determining operation in step S104b is produced. For example, the print plan information includes setting information described by tag sets 506b and 508b of the print job and schedule information representing a print start time and a print end time. The print plan information may be produced for a plurality of mobile printing vehicles 200b, or may be produced for each of the mobile printing vehicles 200b.

Then, in step S114b, bookbinding plan information representing the bookbinding plan determined in the plan determining operation in step S104b is produced. For example, the bookbinding plan information includes setting information described by tag sets 510b of the print job and schedule information representing a bookbinding start time and a bookbinding end time. The bookbinding plan information may be produced for a plurality of mobile bookbinding vehicles 210b, or may be produced for each of the mobile bookbinding vehicles 210b.

Then, in step S116b, the produced movement plan information is sent to the execution resource to which the printing operation or the bookbinding operation is allocated, and then in step S118b, the print plan information and the print data produced are sent to the mobile printing vehicle 200b to which the printing operation is allocated. Then, in step S120b, the produced bookbinding plan information is sent to the mobile bookbinding vehicle 210b to which the bookbinding operation is allocated, and a series of operations are completed and return to an original operation.

Then, the plan determination operation performed in step S104b will be described with reference to FIG. 36 which shows a flowchart for the plan determination operation in step S104b.

Figure 36:
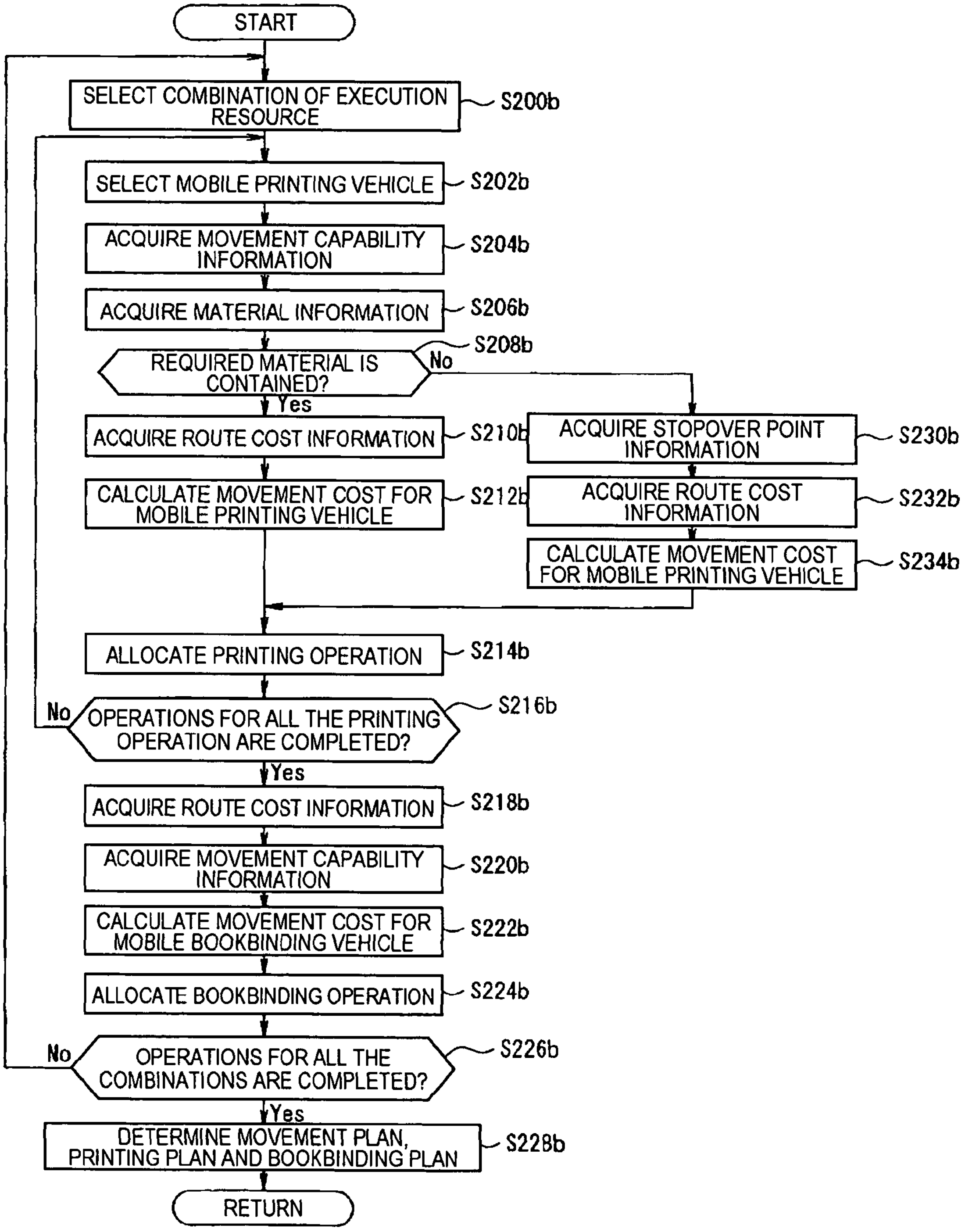
FIG. 36 is a flowchart showing a plan determining operation in step S104*b*.

First, the plan determining operation, when executed in step S104b, advances to step S200b, as shown in FIG. 36.

In step S200b, a combination of the execution resources to which the printing operation or the bookbinding operation is allocated is selected from the target execution resources, and then in step S202b, one of the mobile printing vehicles 200b relating to the selected combination (hereinafter will be referred to as a selected mobile printing vehicle 200b) is selected. Then, an operation of step S204b is performed.

In step S204b, the movement capability information of the selected mobile printing vehicle 200b is acquired by the storage device 92b, and then in step S206b, the material information of the selected mobile printing vehicle 200b is acquired by the storage device 92b. Then, an operation of step S208b is performed.

In step S208b, it is determined whether the selected mobile printing vehicle 200b contains the material required for the printing operation on the basis of the acquired material information. When it is determined that the required material is contained by the selected mobile printing vehicle 200b (i.e., Yes in step S208), the operation proceeds to step S210b, where the route cost information representing the route cost required for movement along the distribution route from the location of the selected mobile printing vehicle 200b to the joining point is acquired by the storage device 92b. Then, an operation of step S212b is performed.

In step S212b, the movement cost required for the selected mobile printing vehicle 200b to move to the joining point is calculated on the basis of the movement capability information and the route cost information, acquired in steps S204b and S210b. The movement cost is calculated by multiplying the route cost constant by the movement capability constant. Therefore, as the route cost constant or the movement capability constant increases, the movement cost increases and the entire cost increases. In subsequent steps, the movement cost is calculated in the same manner.

Then, in step S214b, one of unallocated printing operations is allocated to the selected mobile printing vehicle 200b, and then in step S216b, it is determined whether the operations in steps S202b to S214b and steps S230b to S234b are completed with respect to all the printing operations. When it is determined in step S214b that all the printing operations are completed (i.e., Yes in step S214b), an operation of step S218b is performed.

In step S218b, the route cost information representing the route cost required for movement along the distribution route from the joining point to the delivery destination is acquired by the storage device 92b, and then in step S220b, the movement capability information of the mobile bookbinding vehicle 210b relating to the combination selected in step S200b (hereinafter will be referred to as a selected mobile bookbinding vehicle 210b) is acquired by the storage device 92b. Then, an operation of step S222b is performed.

In step S222*b*, the movement cost required for the selected mobile bookbinding vehicle 210*b* to move to the delivery destination is calculated on the basis of the route cost information and the movement capability information, acquired by steps S218*b* and S220*b*, and then in step S224*b*, the bookbinding operation is allocated to the selected mobile bookbinding vehicle 210*b*. Then, an operation of step S226*b* is performed.

Then, in step S226*b*, it is determined whether the operations in steps S200*b* to S224*b* and steps S230*b* to S234*b* are completed with respect to all the combinations of the execution resources to which the printing operation or the bookbinding operation is allocated. When it is determined in step S226*b* that the operations are completed with respect to all the combinations (i.e., Yes in step S226*b*), an operation of step S228*b* is performed.

In step S228*b*, the combination of the execution resources capable of producing a minimum sum of the movement cost is determined on the basis of the calculation results in steps S212*b*, S222*b* and S234*b*, a movement plan, a print plan, and a bookbinding plan are determined with respect to the determined combination of the execution resources, and a series of operations are completed and return to an original operation.

On the other hand, when it is determined in step S226*b* that the operations are not completed with respect to all the combinations (i.e., No in step S226*b*), an operation of step S200*b* is performed.

On the other hand, when it is determined in step S216*b* that all the printing operations are not completed (i.e., No in step S216*b*), an operation of step S202*b* is performed.

On the other hand, when it is determined in step S208*b* that the required material is not contained (i.e., No in step S208*b*), the stopover point information is acquired by the storage device 92*b* in step S230*b*. Then, an operation of step S232*b* is performed.

In step S232*b*, the route cost information representing the route cost required for movement along the distribution route from the location of the selected mobile printing vehicle 200*b* to the joining point via the stopover point is acquired by the storage device 92*b*, and then in step S234*b*, the movement cost required for the selected mobile printing vehicle 200*b* to move to the joining point via the stopover point is calculated on the basis of the movement capability information, the stopover point information and the route cost information, acquired in steps S204*b*, S230*b* and S232*b*. Then, an operation of step S214*b* is performed.

Hereinafter, the operation of the present embodiment will be described.

FIG. 37 is a diagram showing present locations of the execution resources.

As shown in FIG. 37, it is assumed that the mobile printing vehicles A and B are located at a distance from the mobile bookbinding vehicle C, and the route cost constants with respect to the distribution routes from the mobile printing vehicles A and B to the joining point (present location of the mobile bookbinding vehicle C) are equally 3. Moreover, it is assumed that the stopover point is located at a distance from the joining point, and the route cost with respect to the distribution route from the stopover point to the location of the mobile printing vehicle A or the joining point is equally 2. Moreover, it is assumed that the mobile bookbinding vehicle C is located at a distance from the delivery destination, and the route cost constant with respect to the distribution route from the location of the mobile bookbinding vehicle C to the delivery destination is 2. In addition, it is assumed that the movement capability constants for the mobile printing vehicles A and B and the mobile bookbinding vehicle C are respectively 1, 1 and 1.5, and the excellence of the movement capability is ranked in the order of the mobile printing vehicle A, the mobile printing vehicle B and the mobile bookbinding vehicle C.

The management server 100*b* has acquired the print job through step S100*b*. In the present embodiment, it is assumed that the print job of FIG. 33 is acquired. In addition, the execution resource capable of performing the printing operation and the bookbinding operation is retrieved through step S102*b*.

FIG. 38 is a diagram showing a list of execution resources capable of performing the printing operation and the bookbinding operation.

The analysis of the print job of FIG. 33 shows that the print job requires two printing operations and one bookbinding operation. Therefore, it is assumed that two mobile printing vehicles A and B and single mobile bookbinding vehicle C are obtained as a retrieval result of the execution resource capable of performing the printing operations and the bookbinding operation. In the present embodiment, there are four combinations of the execution resources, (A, A, C), (A, B, C), (B, A, C) and (B, B, C), to which the printing operations 1 and 2 and the bookbinding operation are allocated. Symbols in parenthesis represent any one of the mobile printing vehicles A and B and the mobile bookbinding vehicle C, and the first, second and third elements in the parenthesis respectively represent each execution resource to which the printing operation 1, the printing operation 2 and the bookbinding operation are allocated. Hereinafter, the combination of the execution resources to which the printing operation or the bookbinding operation is allocated will be denoted in the same manner.

When the execution resource is retrieved, it is determined in step S208*b* whether the mobile printing vehicles A and B contain the material required for the printing operation. For example, when the analysis of the print job of FIG. 33 shows that 400 pages of printing operation has to be performed on a thick glossy A6 size sheet and the material information table 400*b* has the same contents as those shown in FIG. 34, it is determined that the mobile printing vehicle A does not contain the material required for the printing operation since the mobile printing vehicle A is deficient in the thick glossy A6 size sheet by 100 copies.

Then, in accordance with the determination result in step S208*b*, the movement cost is calculated, through steps S200*b* to S226*b* and steps S230*b* to S234*b*, with respect to all the combinations of the execution resources among the target execution resources to which the printing operation or the bookbinding operation is allocated.

FIG. 39 is a diagram showing a result of movement cost calculation with respect to each of the combinations of the execution resources to which the printing operation or the bookbinding operation is allocated.

In the combination of the execution resources (A, A, C), since the mobile printing vehicle A has to move to the joining point via the stopover point, the movement cost for the mobile printing vehicle A becomes 4 (=(2+2)×1), as shown in FIG. 39. Since the mobile bookbinding vehicle C has to move to the delivery destination, the movement cost for the mobile bookbinding vehicle C becomes 3 (=2×1.5). Therefore, the sum of the movement cost becomes 7 (=4+3).

Through the same calculation, the sum of the movement cost with respect to each of the combinations of the execution resources (A, B, C), (B, A, C) and (B, B, C) becomes 10, 10 and 6, respectively.

Then, through step S228*b*, the combination of the execution resources capable of producing a minimum sum of the movement cost is determined among each of the combinations of the execution resources, and the movement plan, the print plan and the bookbinding plan are determined with respect to the determined combination of the execution resources. In the example of FIG. 39, the combination of the execution resources (B, B, C) is determined.

Then, the contents are acquired through steps S106*b* and S108*b* from the contents server and print data is produced on the basis of the acquired contents. In addition, through steps S110*b* to S120*b*, the movement plan information, the print plan information and the bookbinding plan information are produced and sent to the execution resources together with the print data.

In the mobile printing vehicle B, when the movement plan information is received at the movement plan information receiving unit 60*b*, the movement guiding unit 62*b* performs a movement guiding operation on the basis of the received movement plan information. Then, an operator drives the mobile printing vehicle B to the joining point in accordance with the movement guiding operation. When the print plan information and the print data are received at the print plan information receiving unit 64*b*, the printing control unit 68*b* controls the printing device 66*b* to perform the printing operations 1 and 2 on the basis of the received print plan information and the received print data. The printing operations 1 and 2 are performed during the movement of the mobile printing vehicle B.

In the mobile bookbinding vehicle C, when results of the printing operations in the mobile printing vehicle B is received at the joining point and the movement plan information is received at the movement plan information receiving unit 70*b*, the movement guiding unit 72*b* performs a movement guiding operation on the basis of the received movement plan information. Then, an operator drives the mobile bookbinding vehicle C from the joining point to the delivery destination in accordance with the movement guiding operation. When the bookbinding plan information is received at the bookbinding plan information receiving unit 74*b*, the bookbinding control unit 78*b* controls the bookbinding device 76*b* to perform the bookbinding operation on the basis of the received bookbinding plan information. The bookbinding operation is performed during the movement of the mobile bookbinding vehicle C.

When the stopover point is not considered, it is likely that the combination of the execution resources (A, A, C) is selected since the combinations of the execution resources (A, A, C) and (B, B, C) output a minimum movement cost. However, when the printing operation and the bookbinding operation are performed with respect to the combination of the execution resources (A, A, C), it is likely that the mobile printing vehicle A becomes short of the print sheet during the printing operation and has to move to the stopover point. In this case, the sum of the movement cost is likely to become 7 or greater.

In the present embodiment, the print job including the specification of the printing operation and the bookbinding operation and the location of the delivery destination is acquired, whether the mobile printing vehicle 200*b* retains the material required for the printing operation is determined, the movement plan for the execution resources is made on the basis of the determination result and the acquired print job, and the print plan and the bookbinding plan for the execution resource are made on the basis of the acquired print job.

Therefore, since the printing operation and the bookbinding operation are performed by the execution resources while moving cooperative with each other on the basis of the movement plan, the print plan and the bookbinding plan, it is possible to perform the printing operation and the bookbinding operation more efficiently than before. In addition, since a plurality of execution resources having the printing device 66*b* or the bookbinding device 76*b* is used rather than using an execution resource having a plurality of printing devices 66*b* or a plurality of bookbinding devices 76*b*, it is only necessary to provide a required number of execution resources in accordance with the content of the delivery instruction. When a number of distribution works are performed in parallel with each other, it is possible to reduce cost and efficiently manage the execution resources. In addition, since the movement plan is made in consideration of whether the mobile printing vehicle 200*b* has to move to the stopover point, it is possible to efficiently make the movement plan when the mobile printing vehicle 200*b* does not contain the required material.

In addition, in the present embodiment, the movement cost required for the mobile printing vehicle 200*b* to move to the joining point, the movement cost required for the mobile bookbinding vehicle 210*b* to move from the joining point to the delivery destination and the movement cost required for the mobile printing vehicle 200*b* to move to the joining point via the stopover point are calculated, the calculation result of the movement cost with respect to all the combinations of the execution resources to which the printing operation or the bookbinding operation is allocated is acquired so that the movement cost required for movement without passing through the stopover point is acquired when it is determined that the required material is contained, and the movement cost required for movement with passing through the stopover point is acquired when it is determined that the required material is not contained, the combination of the execution resources capable of producing a minimum sum of the movement cost is determined on the basis of the acquired calculation result, and the movement plan, the print plan and the bookbinding plan are determined with respect to the determined combination of the execution resources.

Therefore, since the movement plan, the print plan and the bookbinding plan are determined with respect to the combination of the execution resources capable of producing a minimum sum of the movement cost, it is possible to further efficiently reduce the movement cost.

In addition, in the present embodiment, the movement cost of the execution resources are calculated on the basis of the route cost information representing the route cost required for movement along the distribution route and the movement capability information representing the movement capability of the execution resources.

Therefore, since it is possible to more delicately calculate the movement cost, it is possible to further efficiently reduce the movement cost.

In the fifth embodiment, the mobile printing vehicle 200*b* and the mobile bookbinding vehicle 210*b* correspond to the mobile object in Aspect 37, 45 or 53, the mobile printing vehicle 200*b* corresponds to the first mobile object in Forms 38 to 40, Forms 46 to 48 and Forms 54 to 56, and the mobile bookbinding vehicle 210*b* corresponds to the second mobile object in Aspect 38, 40, 46, 48, 54 or 56. The print job acquisition unit 22*b* and step S100*b* correspond to the delivery instruction information acquisition unit in Forms 37 to 39, step S100*b* corresponds to the delivery instruction information acquisition step in Forms 45 to 47, Forms 53 to 55, and the material information acquisition unit 26*b* and step S206*b* correspond to the material information acquisition unit in Aspect 39.

In addition, in the fifth embodiment, step S206*b* represents the material information acquisition step in Aspect 47 or 55, the material determining unit 36*b* and step S208*b* correspond to the stopover determining unit in Forms 37 to 40, and step S208*b* corresponds to the stopover determining step in Forms 45 to 48 and Forms 53 to 56. In addition, the movement cost calculating unit 40*b* and step S212*b* correspond to the first movement cost calculating unit in Aspect 40, step S212*b* corresponds to the first movement cost calculating step in Aspect 48 or 56, and the movement cost calculating unit 44*b* and step S222*b* correspond to the second movement cost calculating unit in Aspect 40.

In addition, in the fifth embodiment, step S222*b* corresponds to the second movement cost calculating step in Aspect 48 or 56, the movement cost calculating unit 45*b* and step S234*b* correspond to the third movement cost calculating unit in Aspect 40, and step S234*b* corresponds to the third movement cost calculating step in Aspect 48 or 56. In addition, the calculation result acquisition unit 46*b*, the plan determining unit 48*b* and steps S200*b*, S226*b* and S228*b* correspond to the management unit in Forms 37 to 40, and steps S200*b*, S226*b* and S228*b* correspond to the management step in Forms 45 to 48 and Forms 53 to 56.

In addition, in the fifth embodiment, the calculation result acquisition unit 46*b* and steps S200*b* and S226*b* correspond to the calculation result acquisition unit in Aspect 40, steps S200*b* and S226*b* correspond to the calculation result acquisition step in Aspect 48 or 56, and the plan determining unit 48*b* and step S228*b* correspond to the plan determining unit in Aspect 40. In addition, step S228*b* corresponds to the plan determining step in Aspect 48 or 56, and the print job corresponds to the delivery instruction information in Forms 37 to 39, Forms 45 to 47 and Forms 53 to 55.

Hereinafter, a sixth embodiment of the invention will be described with reference to drawings. FIGS. 40 to 44 show a mobile print planning system, a mobile print planning program and a mobile print planning method in accordance with the sixth embodiment of the invention. In addition, only those parts different from the fifth embodiment will be described, and the same parts as the fifth embodiment are denoted by the same reference numerals and will not be described.

First, an outline of the present embodiment will be described with reference to FIG. 40.

As shown in FIG. 40, the present embodiment is different from the fifth embodiment in that a predetermined place other than the location of the mobile bookbinding vehicle 210*b* is set as the joining point. The joining point may include the location of the delivery destination.

Then, an outline of functions of a network system to which the invention is applied will be described with reference to FIG. 41 which is a schematic block diagram showing functions of the network system.

Figure 41:
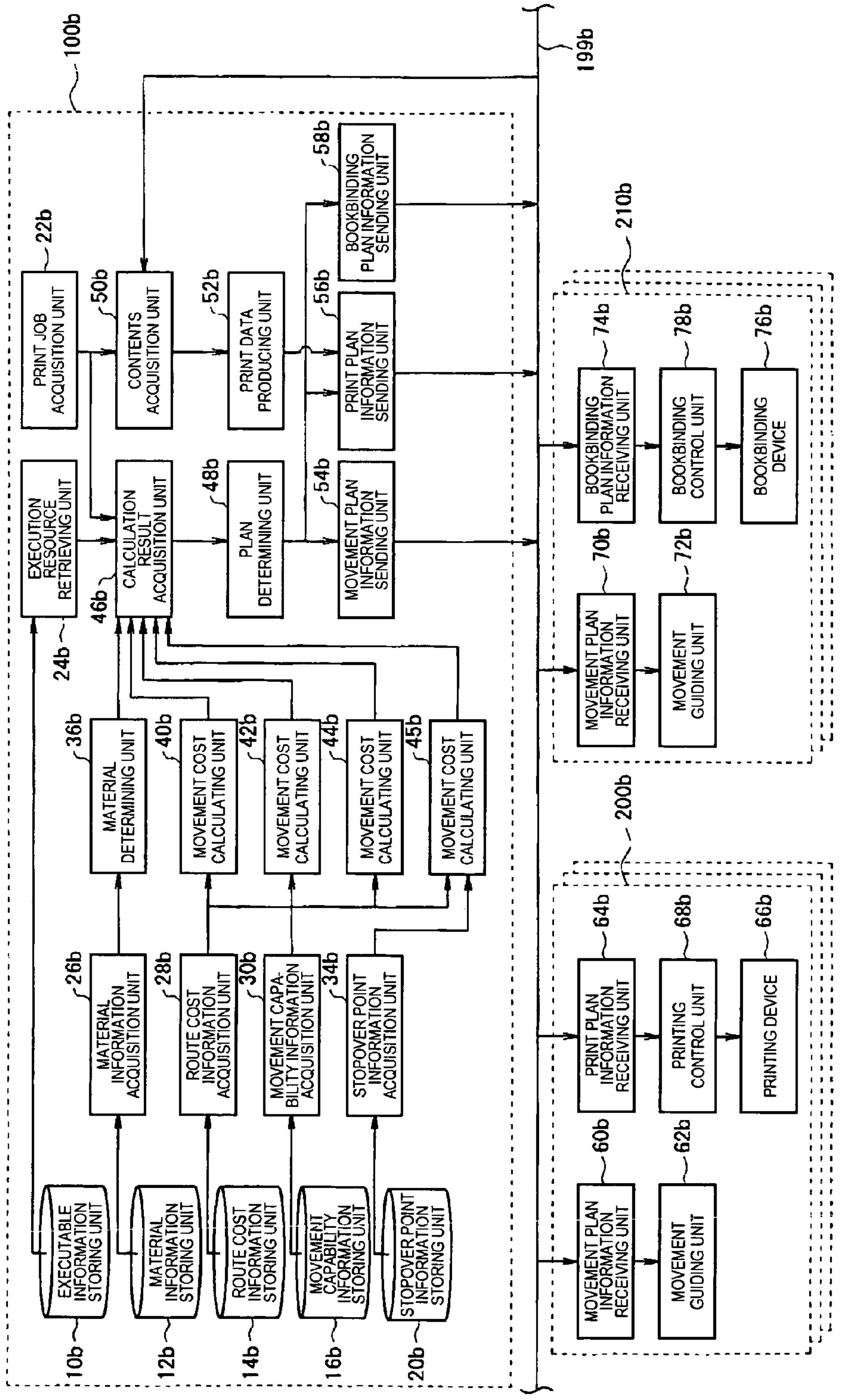
FIG. 41 is a schematic block diagram showing functions of a network system.

As shown in FIG. 41, the management server 100*b* includes the executable information storing unit 10*b*, the material information storing unit 12*b*, the route cost information storing unit 14*b*, the movement capability information storing unit 16*b*, the stopover point information storing unit 20*b*, the print job acquisition unit 22*b*, the execution resource retrieving unit 24*b*, the material information acquisition unit 26*b* and the material determining unit 36*b*.

The management server 100*b* further includes the route cost information acquisition unit 28*b*, the movement capability information acquisition unit 30*b*, the stopover point information acquisition unit 34*b*, the movement cost calculating units 40*b*, 44*b* and 45*b*, the calculation result acquisition unit 46*b*, the plan determining unit 48*b*, the contents acquisition unit 50*b*, the print data producing unit 52*b*, the movement plan information sending unit 54*b*, the print plan information sending unit 56*b* and the bookbinding plan information sending unit 58*b*.

The management server 100*b* further includes a movement cost calculating unit 42*b* calculating the movement cost required for the mobile bookbinding vehicle 210*b*, which is one of the target execution resources, to move to the joining point on the basis of the route cost information and the movement capability information, acquired by the route cost information acquisition unit 28*b* and the movement capability information acquisition unit 30*b*.

The calculation result acquisition unit 46*b* acquires calculation results, with respect to all the combinations of a plurality of joining points and the execution resources among the target execution resources to which the printing operation or the bookbinding operation is allocated, from the movement cost calculating units 40*b*, 42*b* and 44*b* when the material determining unit 36*b* has determined that the required material is contained and from the movement cost calculating units 45*b*, 42*b* and 44*b* when the material determining unit 36*b* has determined that the required material is not contained.

The plan determining unit 48*b* determines the combination of the joining points and the execution resource capable of producing a minimum sum of the movement cost, on the basis of the calculation result acquired by the calculation result acquisition unit 46*b* and determines the movement plan, the print plan, and the bookbinding plan with respect to the determined combination of the joining points and the execution resources.

Then, operations performed in the CPU 80*b* of the management server 100*b* will be described.

Figure 42:
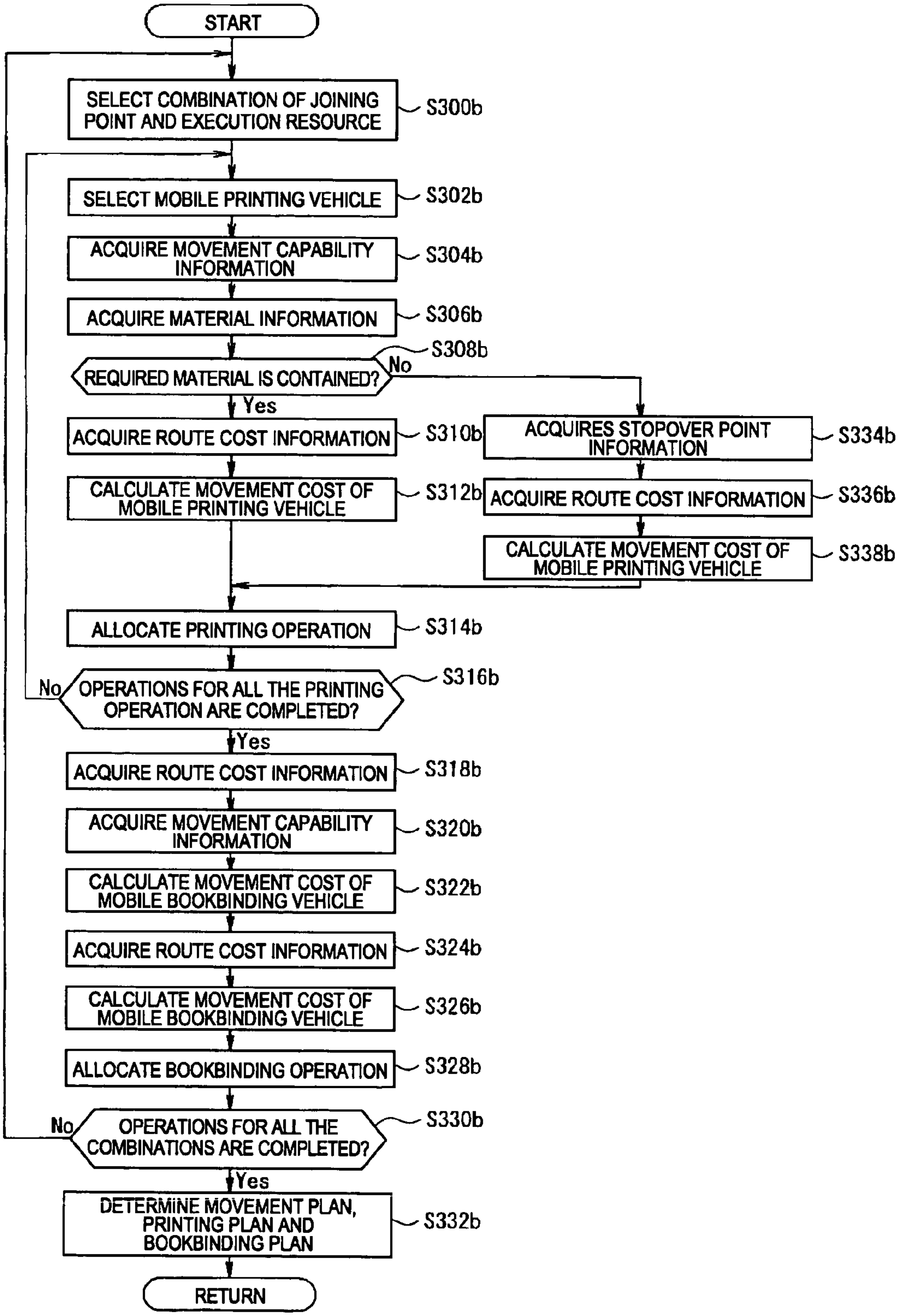
FIG. 42 is a flowchart showing a plan determining operation in step S104*b*.

The CPU 80*b* performs a plan determining operation shown in the flowchart of FIG. 42 in place of the plan determining operation shown in FIG. 36.

FIG. 42 is a flowchart showing the plan determination operation in step S104*b*.

First, the plan determining operation, when executed in step S104*b*, advances to step S300*b*, as shown in FIG. 42.

In step S300*b*, a combination of the joining points and the execution resources to which the printing operation or the bookbinding operation is allocated is selected from the target execution resources and a plurality of joining points, and then in steps S302*b* to S308*b*, the same operations as steps S202*b* to S208*b* is performed. When it is determined in S308*b* that the required material is contained (i.e., Yes in step S308*b*), an operation of step S310*b* is performed.

In step S310*b*, the route cost information representing the route cost required for movement along the distribution route from the location of the selected mobile printing vehicle 200*b* to the joining point relating to the combination (hereinafter will be referred to as a selected joining point) selected in step S300*b* is acquired by the storage device 92*b*. Then, in step S312*b*, the movement cost required for the selected mobile printing vehicle 200*b* to move to the selected joining point is calculated on the basis of the movement capability information and the route cost information, acquired in steps S304*b* and S310*b*. Then, an operation of step S314*b* is performed.

Then, the same operations as steps S214*b* and S216*b* are performed in steps S314*b* and S316*b*. When it is determined in step S316*b* that all the printing operations are completed (i.e., Yes in step S316*b*), an operation of step S318*b* is performed.

In step S318*b*, the route cost information representing the route cost required for movement along the distribution route from the location of the selected mobile bookbinding vehicle 210*b* to the selected joining point is acquired by the storage device 92*b*, and then in step S320*b*, the movement capability information of the selected mobile bookbinding vehicle 210*b* is acquired by the storage device 92*b*. Then, an operation of step S322*b* is performed.

In step S322*b*, the movement cost required for the selected mobile bookbinding vehicle 210*b* to move to the selected joining point is calculated on the basis of the route cost information and the movement capability information acquired in steps S318*b* and S320*b*. Then, an operation of step S324*b* is performed.

In step S324*b*, the route cost information representing the route cost required for movement along the distribution route from the selected joining point to the delivery destination is acquired by the storage device 92*b*, and then in step S326*b*, the movement cost required for the selected mobile bookbinding vehicle 210*b* to move from the selected joining point to the delivery destination is calculated on the basis of the route cost information and the movement capability information acquired in steps S324*b* and S320*b*. Then, an operation of step S328*b* is performed.

Then, the same operations as steps S224*b* and S226*b* are performed in steps S328*b* and S330*b*. When it is determined in step S330*b* that all the operations are completed with respect to all the combinations (i.e., Yes in step S330*b*), an operation of step S332*b* is performed.

In step S332*b*, the combination of the joining points and the execution resources capable of producing a minimum sum of the movement cost is determined on the basis of the calculation result in steps S312*b*, S322*b* and S326*b*, a movement plan, a print plan, and a bookbinding plan are determined with respect to the determined combination of the joining points and the execution resources, and a series of operations are completed and return to an original operation.

On the other hand, when it is determined in step S330*b* that the operations are not completed with respect to all the combinations (i.e., No in step S330*b*), an operation of step S300*b* is performed.

On the other hand, when it is determined in step S316*b* that all the printing operations are not completed (i.e., No in step S316*b*), an operation of step S302*b* is performed.

On the other hand, when it is determined in step S308*b* that the required material is not contained (i.e., No in step S308*b*), the same operation as step S230*b* is performed in step S334*b*. Then, an operation of step S336*b* is performed.

In step S336*b*, the route cost information representing the route cost required for movement along the distribution route from the location of the selected mobile printing vehicle 200*b* to the selected joining point via the stopover point is acquired by the storage device 92*b*, and then in step S3338*b*, the movement cost required for the selected mobile printing vehicle 200*b* to move to the selected joining point via the stopover point is calculated on the basis of the movement capability information, the stopover point information and the route cost information, acquired in steps S304*b*, S334*b* and S336*b*. Then, an operation of step S314*b* is performed.

Hereinafter, the operation of the present embodiment will be described.

FIG. 43 is a diagram showing present locations of the execution resources.

As shown in FIG. 43, it is assumed that the mobile printing vehicles A and B are located at a distance from the joining point A, and the route cost constants with respect to the distribution routes from the mobile printing vehicles A and B to the joining point A are equally 3. Moreover, it is assumed that the stopover point is located at a distance from the joining point A, and the route cost constant with respect to the distribution route from the stopover point to the mobile printing vehicle A or the joining point A is equally 2. In addition, it is assumed that the mobile bookbinding vehicle C is located at the delivery destination, and the route cost constant with respect to the distribution route from the delivery destination to the joining point A is 2. The present embodiment is similar to the fifth embodiment in that the mobile printing vehicles A and B and the mobile bookbinding vehicle C in the present embodiment have the same movement capability constant as the fifth embodiment and the mobile printing vehicle A does not contain the material required for the printing operation.

The management server 100*b* has acquired the print job through step S100*b*. In the present embodiment, it is assumed that the print job of FIG. 33 is acquired. In addition, the execution resource capable of performing the printing operation and the bookbinding operation is retrieved through step S102*b*.

The analysis of the print job of FIG. 33 shows that the print job requires two printing operations and one bookbinding operation. Therefore, it is assumed that two mobile printing vehicles A and B and single mobile bookbinding vehicle C are obtained as a retrieval result of the execution resource capable of performing the printing operations and the bookbinding operation.

Then, through steps S300*b* to S330*b* and steps S334*b* to S338*b*, the movement cost calculated with respect to all the combinations of the joining point and the execution resources among the target execution resources to which the printing operation or the bookbinding operation is allocated. In the present embodiment, the joining point A and the delivery destination are selected as candidates for the joining point. In the present embodiment, there are eight combinations of the joining point and the execution resources, (A, A, C, joining point A), (A, B, C, joining point A), (B, A, C, joining point A), (B, B, C, joining point A), (A, A, C, delivery destination), (A, B, C, delivery destination), (B, A, C, delivery destination) and (B, B, C, delivery destination), to which the printing operations 1 and 2 and the bookbinding operation are allocated. The fourth symbol in parenthesis represents a joining point. Since the calculation results of the movement cost with respect to the combinations (A, B, C) and (B, A, C) are identical to those of the fifth embodiment, descriptions will be made only to two combinations (A, B, C, joining point A) and (A, B, C, delivery destination).

FIG. 44 is a diagram showing a result of movement cost calculation with respect to each of the combinations of the execution resources to which the printing operation or the bookbinding operation is allocated.

In the combination of the joining points and the execution resources (A, A, C, joining point A), since the mobile printing vehicle A has to move to the joining point A via the stopover point, the movement cost for the mobile printing vehicle A becomes 4 (=(2+2)×1), as shown in FIG. 44. Since the mobile bookbinding vehicle C has to move between the joining point A and the delivery destination, the movement cost for the mobile bookbinding vehicle C becomes 6 (=2×1.5×2). Therefore, the sum of the movement cost becomes 10 (=4+6).

In the combination of the joining points and the execution resources (A, A, C, delivery destination), since the mobile printing vehicle A has to move to the delivery destination via the stopover point and the joining point A, the movement cost for the mobile printing vehicle A becomes 6 (=(2+2+2)×1). Since the mobile bookbinding vehicle C does not have to move, the movement cost for the mobile bookbinding vehicle C becomes 0. Therefore, the sum of the movement cost becomes 6 (=6+0).

Through the same calculation, the sum of the movement cost with respect to each of the combinations of the execution resources (A, B, C, joining point A), (B, B, C, joining point A), (A, B, C, delivery destination) and (B, B, C, delivery destination) becomes 13, 9, 11 and 5, respectively.

Then, through step S332*b*, the combination of the joining points and the execution resources capable of producing a minimum sum of the movement cost is determined among each of the combinations of the joining point and the execution resources, and the movement plan, the print plan and the bookbinding plan are determined with respect to the determined combination. In the example of FIG. 44, the combination of the joining points and the execution resource (B, B, C, delivery destination) is determined.

Then, the contents are acquired through steps S106*b* and S108*b* from the contents server and print data is produced on the basis of the acquired contents. In addition, through steps S110*b* to S120*b*, the movement plan information, the print plan information and the bookbinding plan information are produced and sent to the execution resources together with the print data.

In the mobile printing vehicle B, when the movement plan information is received at the movement plan information receiving unit 60*b*, the movement guiding unit 62*b* performs a movement guiding operation on the basis of the received movement plan information. Then, an operator drives the mobile printing vehicle B to the joining point in accordance with the movement guiding operation. When the print plan information and the print data are received at the print plan information receiving unit 64*b*, the printing control unit 68*b* controls the printing device 66*b* to perform the printing operations 1 and 2 on the basis of the received print plan information and the received print data. The printing operations 1 and 2 are performed during the movement of the mobile printing vehicle B.

In the mobile bookbinding vehicle C, when the result of the printing operation in the mobile printing vehicle B is received at the delivery destination and the bookbinding plan information is received at the bookbinding plan information receiving unit 74*a*, the bookbinding control unit 78*b* controls the bookbinding device 76*b* to perform the bookbinding operation on the basis of the received bookbinding plan information. The bookbinding operation is performed at the delivery destination.

In addition, in the present embodiment, the movement cost required for the mobile printing vehicle 200*b* to move to the joining point, the movement cost required for the mobile bookbinding vehicle 210*b* to move to the joining point, the movement cost required for the mobile bookbinding vehicle 210*b* to move from the joining point to the delivery destination, and the movement cost required for the mobile printing vehicle 200*b* to move to the joining point via the stopover point are calculated, the calculation result of the movement cost with respect to all the combinations of the joining points and the execution resources to which the printing operation or the bookbinding operation is allocated is acquired so that the movement cost required for movement without passing through the stopover point is acquired when it is determined that the required material is contained, and the movement cost required for movement with passing through the stopover point is acquired when it is determined that the required material is not contained, the combination of the joining points and the execution resources capable of producing a minimum sum of the movement cost is determined on the basis of the acquired calculation result, and the movement plan, the print plan and the bookbinding plan are determined with respect to the determined combination of the execution resources.

Therefore, since the movement plan, the print plan and the bookbinding plan are determined with respect to the combination of the joining points and the execution resources capable of producing a minimum sum of the movement cost, it is possible to further efficiently reduce the movement cost.

In the sixth embodiment, the material information acquisition unit 26*b* and step S306*b* correspond to the material information acquisition unit in Aspect 39, step S306*b* corresponds to the material information acquisition step in Aspect 47 or 55, and the material determining unit 36*b* and step S308*b* correspond to the stopover determining unit in Aspect 39 or 41. In addition, step S308*b* corresponds to the stopover determining step in Aspect 47, 49, 55 or 57, the movement cost calculating unit 40*b* and step S312*b* correspond to the first movement cost calculating unit in Aspect 41, and step S312*b* corresponds to the first movement cost calculating step in Aspect 49 or 57.

In addition, in the sixth embodiment, the movement cost calculating unit 42*b* and step S322*b* correspond to the second movement cost calculating unit in Aspect 41, step S322*b* corresponds to the second movement cost calculating step in Aspect 49 or 57, and the movement cost calculating unit 44*b* and step 326*b* correspond to the third movement cost calculating unit in Aspect 41. In addition, step S326*b* corresponds to the third movement cost calculating step in Aspect 49 or 57, the movement cost calculating unit 45*b* and step S338*b* correspond to the fourth movement cost calculating unit in Aspect 41, and step S338*b* corresponds to the fourth movement cost calculating step in Aspect 49 or 57.

In addition, in the sixth embodiment, the calculation result acquisition unit 46*b*, the plan determining unit 48*b* and steps S300*b*, S330*b* and S332*b* correspond to the management unit in Aspect 39 or 41, and steps S300*b*, S330*b* and S332*b* correspond to the management step in Aspect 47, 49, 55 or 57. In addition, the calculation result acquisition unit 46*b* and steps S300*b* and S330*b* correspond to the calculation result acquisition unit in Aspect 41, steps S300*b* and S330*b* correspond to the calculation result acquisition step in Aspect 49 or 57, and the plan determining unit 48*b* and step S332*b* correspond to the plan determining unit in Aspect 41.

In addition, in the sixth embodiment, step S332*b* corresponds to the plan determining step in Aspect 49 or 57.

Although in the fifth and six embodiments, the movement plan is made in consideration of whether the mobile printing vehicle 200*b* has to move to the stopover point, the invention is not limited to this case. However, the movement plan may be made in consideration of whether the mobile bookbinding vehicle 210*b* has to move to the stopover point. In this case, an operation of determining the presence or absence of the material is performed in the plan determining operation in FIGS. 36 and 42 similar to the case of the printing operation. Specifically, the operations corresponding to steps S208*b* and S230*b* to S234*b* in the fifth embodiment or the operations corresponding to steps S308*b* and S334*b* to S338*b* in the sixth embodiment may be included in order to perform the operation of determining the presence or absence of the material.

In addition, although in the fifth and sixth embodiments, the execution resources moved to the stopover point for material supply, the invention is not limited to this case. However, the execution resources may move to a stopover point for fuel supply, a stopover point for maintenance, a stopover point for checking or transferring the results of the printing operation and the bookbinding operation.

Although in the fifth and sixth embodiments, the descriptions have been made to the case where the movement cost is calculated on the basis of the route cost information, the invention is not limited to this case. However, the movement cost may be calculated on the basis of the location information of the execution resources, the joining point and the delivery destination, the map information including slope or route, and the road information representing road conditions such as congestion, construction work and traffic regulations. In this case, a location information storing unit storing location information, a location information acquisition unit acquiring the location information from the location information storing unit, a map information storing unit storing map information, a map information acquisition unit acquiring the map information from the map information storing unit, a road information storing unit storing road information, and a road information acquisition unit acquiring the road information from the road information storing unit may be added to the fifth and sixth embodiments.

In addition, although the route cost information is simply acquired by the storage device 92*b* in the fifth and sixth embodiments, the invention is not limited to this case. However, the route cost information for each of a plurality of routes may be stored in the storage device 92*b* and the operations in steps S210*b*, S218*b*, S232*b*, S310*b*, S318*b*, S324*b* and S336*b* may be modified in the following manner.

In steps S210*b* and S310*b*, the location information of the mobile printing vehicle 200*b* and the location information of the joining point are acquired, and the route cost information representing the route cost required for movement along the distribution route from the location of the mobile printing vehicle 200*b* to the joining point is acquired by the storage device 92*b* on the basis of the acquired location information.

In step S318*b*, the location information of the mobile bookbinding vehicle 210*b* and the location information of the joining point are acquired, and the route cost information representing the route cost required for movement along the distribution route from the location of the mobile bookbinding vehicle 210*b* to the joining point is acquired by the storage device 92*b* on the basis of the acquired location information.

In steps S218*b* and S324*b*, the location information of the joining point is acquired, and the route cost information representing the route cost required for movement along the distribution route from the joining point to the delivery destination is acquired by the storage device 92*b* on the basis of the acquired location information and the acquired print job (the location of the delivery destination).

In steps S232*b* and S336*b*, the location information of the mobile printing vehicle 200*b*, the stopover point information (the location of the stopover point) and the location information of the joining point are acquired, and the route cost information representing the route cost required for movement along the distribution route from the location of the mobile printing vehicle 200*b* to the joining point via the stopover point is acquired by the storage device 92*b* on the basis of the acquired location information.

In addition, although in the sixth embodiment, the route cost information representing the route cost required for movement along the distribution route from the location of the mobile bookbinding vehicle 210*b* to the joining point, and the route cost information representing the route cost required for movement along the distribution route from the joining point to the delivery destination are respectively acquired in steps S318*b* and S324*b*, the invention is not limited to this case. However, the operations may be collected as a single operation so as to acquire the route cost information representing the route cost required for movement along the distribution route from the location of the mobile bookbinding vehicle 210*b* to the delivery destination via the joining point.

In addition, although in the sixth embodiment, the movement cost required for the mobile bookbinding vehicle 210*b* to move to the joining point, and the movement cost required for the mobile bookbinding vehicle 210*b* to move from the joining point to the delivery destination are respectively acquired in steps S322*b* and S326*b*, the invention is not limited to this case. However, the operations may be collected as a single operation so as to acquire the movement cost required for the mobile bookbinding vehicle 210*b* to move to the delivery destination via the joining point.

In addition, although the combination of the execution resources capable of producing a minimum sum of the movement cost is determined in the fifth and sixth embodiments, the invention is not limited to this case. However, it may be possible to determine the combination of the execution resources not only capable of completing the printing operation and the bookbinding operation before the delivery deadline and but also capable of producing a minimum sum of the movement cost.

In addition, although the execution resource capable of performing the printing operation and the bookbinding operation defined by the print job is retrieved in the fifth and sixth embodiments, the invention is not limited to this case. However, among the execution resource capable of performing the printing operation and the bookbinding operation, the execution resource occupied by other printing operation may be excluded from the object of retrieval.

In addition, although an indicator of the movement cost were not explicitly described in the fifth and sixth embodiments, cost required for the movement or environmental load incurred in connection with the movement may be used as the indicator of the movement cost.

Although in the fifth and sixth embodiments, the descriptions have been made to the case where there is only single bookbinding operation, the invention is not limited to this case. However, when there is a plurality of bookbinding operations, the plurality of bookbinding operations may be iteratively performed in the plan determining operation in FIGS. 36 and 42 similar to the case of the printing operation. Specifically, the operations corresponding to steps S202*b* and S216*b* in the fifth embodiment or the operations corresponding to steps S302*b* and S316*b* in the sixth embodiment may be included in order to perform the plurality of bookbinding operations.

In addition, although the executable information is previously stored in the storage device 92*b* in the fifth and sixth embodiments, the invention is not limited to this case. However, the executable information may be acquired by the execution resources according to need. Similarly, the material information, the route cost information, the movement capability information and the stopover point information may be acquired by the execution resources according to need.

In addition, although the fifth and sixth embodiments have been described to the case where the order receiving date is same as the contents delivery deadline, the invention is not limited to this case. However, when the order receiving date is earlier than the contents delivery deadline, the execution resources may be disposed in advance so that the execution resources are placed at an optimal place at the time of the contents delivery deadline. In this case, the optimal place means a place where a combination capable of providing a quickest delivery can be obtained.

In addition, although the printing operation and the bookbinding operation were performed in the fifth and sixth embodiments, the invention is not limited to this case. However, when there is a plurality of operations related to printing or post-printing operations, the plurality of operations may be performed in arbitrary order, separation and combination thereof. Examples of the operations related to the printing or post-printing operation include printing, overprinting, foil stamping, varnishing, laminating, folding, binding, sheet gathering, trimming and case sealing.

More specifically, in the case of producing a direct mail, an operation of printing backgrounds in color is first performed using a printer capable of color printing, an overprinting operation such as a variable printing (recipient of the direct mail or individual contents of an invoice) is performed using a digital monochrome printer, a folding operation is performed to put in an envelope, a case sealing operation is performed using a case sealing machine. As a result of the series of operations, a preprinted and pre-sealed direct mail is produced. As another example, in the case of producing a book having a mixture of color pages and black/white pages, an operation of printing color pages is performed using a color printer, an operation of printing black/white pages is performed using a monochrome printer, a sheet gathering operation of gathering respective printed pages in the order of a page number is performed, a binding operation of binding gathered pages is performed, whereby a book is produced.

In addition, although the execution resources are configured as cars in the fifth and sixth embodiments, the invention is not limited to this case. However, the invention may be applied to the case where the printing device 66*b* or the bookbinding device 76*b* is configured as a movable cradle so as to move along a rail laid down in a printing plant so that the printing device 66*b* and the bookbinding device 76*b* can be disposed at an optimal place in accordance with the print job.

In addition, although the print data is produced by the management server 100*b* in the fifth and sixth embodiment, the invention is not limited to this case. However, the print data may be produced by the printing control unit 68*b*.

In addition, although the fifth and sixth embodiments were described to the case where the operations shown in the flowcharts of FIGS. 35, 36 and 42 are performed in accordance with the control program stored in the ROM 82*b* in advance, the invention is not limited to this case. However, a program showing these procedures may be read into the RAM 84*b* from a storage medium storing the program therein and may be also executed.

In the invention, examples of the storage medium include a semiconductor storage medium, such as RAM and ROM, a magnetic storage medium such as FD and HD, an optically-read storage medium such as CD, CDV, LD and DVD, or a magnetic/optically-read storage medium such as MO. Regardless of the reading method such as electronic, magnetic, or optical reading, the storage medium includes any type of storage medium as long as it is a computer-readable storage medium.

In addition, although in the fifth and sixth embodiments, the mobile print planning system, the mobile print planning program and the mobile print planning method in accordance with the invention were applied to the case where the printing operation and the bookbinding operation are performed by a plurality of execution resources while moving cooperative with each other, the invention is not limited to this case. However, the invention may also be applied to the case where only the printing operation is performed by a plurality of mobile printing vehicles 200*b* while moving cooperative with each other or only the bookbinding operation is performed by a plurality of mobile bookbinding vehicles 210*b* while moving cooperative with each other.

The entire disclosure of Japanese Patent Application Nos. 2005-377154, filed Dec. 28, 2005, 2006-31989, filed Feb. 9, 2006 and 2006-31994, filed Feb. 9, 2006 are expressly incorporated by reference herein.

What is claimed is:

1. A mobile print planning system for making a mobile print plan comprising:

a first mobile object having a first operation execution unit performing a printing operation of printing pages of a book;

a second mobile object communicably connected to the first mobile object, the second mobile object having a second operation execution unit performing a book-binding operation on printed pages of the book, the book-binding operation being performed subsequent to the printing operation, wherein the mobile print plan instructs the first mobile object to perform the printing operation and to transfer the pages of the book to the second mobile object and instructs the second mobile object to perform the book binding operation and to deliver the book resulting from the printing operation and the book binding operation to a predetermined delivery destination, wherein the first mobile object is a first vehicle that is configured to perform the printing operation and does not perform the book-binding operation, and the second object is a second vehicle that is configured to perform the book-binding operation and does not perform the printing operation;

the system further comprising:

a delivery instruction information acquisition unit acquiring delivery instruction information including a print job, the print job including specifications of the printing operation, the book-binding operation, a location of the delivery destination and a delivery deadline; and a management unit making a movement plan and an operation execution plan based on the delivery instruction information, the management unit determining a route for the first moving object, a route for the second moving object, and a joining point for the first moving object and the second moving object, wherein the joining point defines a location determined by the management unit where the first moving object and the second moving object meet, such that the pages of the book printed during the printing operation are transferred from the first moving object to the second moving object so that the book binding operation is performed on the printed pages, and wherein the location of the joining point is based on a location of the first moving object, a location of the second moving object, processing capabilities of the first moving object, and processing capabilities of the second moving object.

2. The mobile print planning system according to claim 1, further comprising, a location information acquisition unit acquiring location information representing the locations of the first mobile object and the second mobile object; and a processing capability information acquisition unit acquiring processing capability information representing the processing capabilities of the first and second operation execution units, wherein the management unit makes the movement plan and the operation execution plan, on the basis of the delivery instruction information, the location information acquired by the location information acquisition unit and the processing capability information acquired by the processing capability information acquisition unit.

3. The mobile print planning system according to claim 1, further comprising a map information acquisition unit acquiring map information including routes from the locations of the first mobile object and the second mobile object to the delivery destination, wherein the management unit makes the movement plan and the operation execution plan, on the basis of the delivery instruction information and the map information acquired by the map information acquisition unit.

4. The mobile print planning system according to claim 2, wherein a plurality of first mobile objects are communicably connected to each other, and wherein the management unit includes:

a first movement time calculating unit calculating a movement time required for the first mobile objects to move to the joining point with the second mobile object on the basis of the location information; a first operation execution processing time calculating unit calculating a first operation execution processing time required for the first mobile objects to complete the printing operation based on the processing capability information of the first mobile object;

a second movement time calculating unit calculating a movement time required for the second mobile object to move from the joining point to the delivery destination; a second operation execution processing time calculating unit calculating a second operation execution processing time required for the second mobile object to complete the book binding operation based on processing capability information of the second mobile object;

a calculation result acquisition unit acquiring the calculation results from the first movement time calculating unit, the first operation execution processing time calculating unit, the second movement time calculating unit and the second operation execution processing time calculating unit, with respect to all the combinations of the first mobile objects and the second mobile object to which the first operation execution process or the second operation execution process is allocated; and a plan determining unit determining the combination of the first mobile objects and the second mobile object capable of completing the first operation execution process and the second operation execution process before the delivery deadline on the basis of the calculation results acquired by the calculation result acquisition unit and the delivery instruction information and determining the movement plan and the operation execution plan with respect to the determined combination.

5. The mobile print planning system according to claim 2, wherein a plurality of first mobile objects are communicably connected to each other, and wherein the management unit includes:

a first movement time calculating unit calculating a movement time required for the first mobile objects to move to a joining point with the second mobile object on the basis of the location information;

a first operation execution processing time calculating unit calculating a first operation execution processing time required for the first mobile objects to complete the first operation execution process for obtaining the execution result of the first mobile objects on the basis of the processing capability information;

a second movement time calculating unit calculating a movement time required for the second mobile object to move to the joining point on the basis of the location information; a third movement time calculating unit calculating a movement time required for the second mobile object to move from the joining point to the delivery destination;

a second operation execution processing time calculating unit calculating a second operation execution processing time required for the second mobile object to complete the second operation execution process for obtaining the execution result of the second mobile object on the basis of the processing capability information;

a calculation result acquisition unit acquiring the calculation results from the first movement time calculating unit, the first operation execution processing time calculating unit, the second movement time calculating unit, the third movement time calculating unit and the second operation execution processing time calculating unit, with respect to all the combinations of a plurality of joining points and the first mobile objects and the second mobile object to which the first operation execution process or the second operation execution process is allocated; and a plan determining unit determining the combination of the plurality of the joining points and the first mobile objects and the second mobile object capable of completing the first operation execution process and the second operation execution process before the delivery deadline on the basis of the calculation results acquired by the calculation result acquisition unit and the delivery instruction information and determining the movement plan and the operation execution plan with respect to the determined combination.

6. The mobile print planning system according to claim 1, further comprising a movement cost calculating unit calculating movement cost for the first mobile object and the second mobile object, wherein the management unit makes the movement plan and the operation execution plan for the first mobile object and the second mobile object on the basis of the delivery instruction information acquired by the delivery instruction information acquisition unit and the movement cost calculated by the movement cost calculating unit, so that the sum of the movement cost becomes small.

7. The mobile print planning system according to claim 6, wherein a plurality of first mobile objects are communicably connected to each other, wherein the movement cost calculating unit includes:

a first movement cost calculating unit calculating the movement cost required for the first mobile objects to move to the joining point with the second-mobile object; and a second movement cost calculating unit calculating the movement cost required for the second mobile object to move from the joining point to the delivery destination, and wherein the management unit includes: a calculation result acquisition unit altering the calculation results from the first movement cost calculation unit and the second movement cost calculation unit with respect to all the combinations of the first mobile objects and the second mobile object to which the first operation execution process for obtaining the execution results of the first mobile objects or the second operation execution process for obtaining the execution result of the second mobile object is allocated; and a plan determining unit determining the combination of the first mobile objects and the second mobile object capable of producing a minimum sum of the movement cost, on the basis of the calculation result acquired by the calculation result acquisition unit and determining the movement plan and the operation execution plan with respect to the determined combination.

8. The mobile print planning system according to claim 6, wherein a plurality of first mobile objects are communicably connected to each other, wherein the movement cost calculating unit includes:

a first movement cost calculating unit calculating the movement cost required for the first mobile objects to move to the joining point with the second mobile object;

a second movement cost calculating unit calculating the movement cost required for the second mobile object to move to the joining point; and a third movement cost calculating unit calculating the movement cost required for the second mobile object to move from the joining point to the delivery destination, and wherein the management unit includes:

a calculation result acquisition unit acquiring the calculation result from the first movement cost calculation unit, the second movement cost calculation unit and the third movement cost calculation unit with respect to all the combinations of a plurality of joining points and the first mobile objects and the second mobile object to which the first operation execution process for obtaining the execution results of the first mobile objects or the second operation execution process for obtaining the execution result of the second mobile object is allocated; and a plan determining unit determining the combination of the joining points and the first mobile objects and the second mobile object capable of producing a minimum sum of the movement cost, on the basis of the calculation result acquired by the calculation result acquisition unit and determining the movement plan and the operation execution plan with respect to the determined combination.

9. The mobile print planning system according to claim 8, further comprising, a first route cost information acquisition unit acquiring route cost information representing the route cost required for movement along the route from the location of the first mobile objects to the joining point;

a second route cost information acquisition unit acquiring route cost information representing the route cost required for movement along the route from the joining point to the delivery destination;

a first movement capability information acquisition unit acquiring movement capability information representing the movement capability of the first mobile objects; and a second movement capability information acquisition unit acquiring movement capability information representing the movement capability of the second mobile object, wherein the first movement cost calculating unit calculates the movement cost for the first mobile objects on the basis of the route cost information acquired by the first route cost information acquisition unit and the movement capability information acquired by the first movement capability information acquisition unit, and wherein the second movement cost calculating unit calculates the movement cost for the second mobile object on the basis of the route cost information acquired by the second route cost information acquisition unit and the movement capability information acquired by the second movement capability information acquisition unit.

10. The mobile print planning system according to claim 8, further comprising, a first route cost information acquisition unit acquiring route cost information representing the route cost required for movement along the route from the location of the first mobile objects to the joining point;

a second route cost information acquisition unit acquiring route cost information representing the route cost required for movement along the route from the location of the second mobile object to the joining point;

a third route cost information acquisition unit acquiring route cost information representing the route cost required for movement along the route from the joining point to the delivery destination;

a first movement capability information acquisition unit acquiring the movement capability information representing the movement capability of the first mobile objects; and a second movement capability information acquisition unit acquiring the movement capability information representing the movement capability of the second mobile object, wherein the first movement cost calculating unit calculates the movement cost for the first mobile objects on the basis of the route cost information acquired by the first route cost information acquisition unit and the movement capability information acquired by the first movement capability information acquisition unit, wherein the second movement cost calculating unit calculates the movement cost for the second mobile object on the basis of the route cost information acquired by the second route cost information acquisition unit and the movement capability information acquired by the second movement capability information acquisition unit, and wherein the third movement cost calculating unit calculates the movement cost for the second mobile object on the basis of the route cost information acquired by the third route cost information acquisition unit and the movement capability information acquired by the second movement capability information acquisition unit.

11. The mobile print planning system according to claim 1, further comprising a stopover determining unit determining whether the first mobile object or the second mobile object has to move to a stopover point, wherein the management unit makes the operation execution plan for the first and second mobile objects on the basis of the delivery instruction information acquired by the delivery instruction information acquisition unit and makes the movement plan for the first and second mobile objects on the basis of the delivery instruction information acquired by the delivery instruction information acquisition unit and the determination result of the stopover determining unit.

12. The mobile print planning system according to claim 11, further comprising a material information acquisition unit acquiring material information about the material contained by the first mobile objects, wherein the stopover determining unit determines whether the first mobile objects contain the material required for execution of the first operation, on the basis of the delivery instruction information acquired by the delivery instruction information acquisition unit and the material information acquired by the material information acquisition unit, and wherein, when the stopover determining unit has determined that the required material is not contained, the management unit makes the movement plan for movement to the stopover point capable of supplying the required material.

13. The mobile print planning system according to claim 11, further comprising a material information acquisition unit acquiring material information about the material contained by the second mobile object, wherein the stopover determining unit determines whether the second mobile object contains the material required for execution of the second operation, on the basis of the delivery instruction information acquired by the delivery instruction information acquisition unit and the material information acquired by the material information acquisition unit, and wherein, when the stopover determining unit has determined that the required material is not contained, the management unit makes the movement plan for movement to the stopover point capable of supplying the required material.

* * * * *